United States Patent
Kubota et al.

(10) Patent No.: US 12,020,513 B2
(45) Date of Patent: Jun. 25, 2024

(54) ELECTRONIC DEVICE AND AUTHENTICATION METHOD OF ELECTRONIC DEVICE

(71) Applicant: SEMICONDUCTOR ENERGY LABORATORY CO., LTD., Atsugi (JP)

(72) Inventors: Daisuke Kubota, Kanagawa (JP); Koji Kusunoki, Kanagawa (JP); Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 17/925,878

(22) PCT Filed: May 18, 2021

(86) PCT No.: PCT/IB2021/054232
§ 371 (c)(1),
(2) Date: Nov. 17, 2022

(87) PCT Pub. No.: WO2021/240297
PCT Pub. Date: Dec. 2, 2021

(65) Prior Publication Data
US 2023/0196843 A1    Jun. 22, 2023

(30) Foreign Application Priority Data

May 29, 2020   (JP) ................................. 2020-094688

(51) Int. Cl.
*G06V 40/70*    (2022.01)
*G06F 3/042*    (2006.01)
(Continued)

(52) U.S. Cl.
CPC .............. *G06V 40/70* (2022.01); *G06F 3/042* (2013.01); *G06F 21/32* (2013.01); *G06V 40/1306* (2022.01); *G06V 40/1318* (2022.01)

(58) Field of Classification Search
CPC ........ G06F 21/32; G06F 3/042; G06F 1/1643; G06F 1/169
See application file for complete search history.

(56) References Cited

U.S. PATENT DOCUMENTS 9,904,863 B2    2/2018   Aoki
10,235,552 B2   3/2019   D'Souza et al.
(Continued)

FOREIGN PATENT DOCUMENTS

CN    104978509 A    10/2015
CN    108496181 A    9/2018
(Continued)

OTHER PUBLICATIONS

International Search Report (Application No. PCT/IB2021/054232) Dated Jul. 20, 2021.
(Continued)

*Primary Examiner* — Van N Chow
(74) *Attorney, Agent, or Firm* — NIXON PEABODY LLP; Jeffrey L. Costellia

(57) ABSTRACT

An electronic device having an authentication method with high security is provided. The electronic device includes a pixel portion, a sensor portion, and an authentication portion. The pixel portion includes a display element and a light-receiving element. The pixel portion includes a first region and has a function of making the display element of the first region emit light. The pixel portion has a function of obtaining first authentication information by capturing an image of an object that is in contact with the first region with the use of the light-receiving element. The sensor portion
(Continued)

includes a second region and has a function of obtaining second authentication information by capturing an image of an object that is in contact with the second region. The authentication portion has a function of performing first authentication processing using the first authentication information. The authentication portion has a function of performing second authentication processing using the second authentication information.

9 Claims, 32 Drawing Sheets

(51) Int. Cl.
  *G06F 21/32* (2013.01)
  *G06V 40/13* (2022.01)

(56) References Cited

U.S. PATENT DOCUMENTS

| | | | |
|---|---|---|---|
| 10,282,579 | B2 | 5/2019 | Thompson et al. |
| 10,592,717 | B2 | 3/2020 | Sheik-Nainar et al. |
| 10,733,409 | B2 | 8/2020 | D'Souza et al. |
| 10,984,086 | B1* | 4/2021 | Gorsica .................. G06F 3/167 |
| 11,302,112 | B1* | 4/2022 | Kumar Agrawal ... G06F 1/1641 |
| 11,394,014 | B2 | 7/2022 | Kubota et al. |
| 11,487,373 | B2* | 11/2022 | Kubota .............. G06V 40/1318 |
| 2014/0056493 | A1 | 2/2014 | Gozzini |
| 2015/0294172 | A1 | 10/2015 | Aoki |
| 2017/0220842 | A1 | 8/2017 | Thompson et al. |
| 2018/0101711 | A1 | 4/2018 | D'Souza et al. |
| 2019/0034020 | A1* | 1/2019 | He .................. H10K 59/12 |
| 2020/0160025 | A1 | 5/2020 | Dangy-caye |
| 2022/0253517 | A1 | 8/2022 | Yamazaki et al. |
| 2022/0292871 | A1 | 9/2022 | Kawashima et al. |
| 2022/0300589 | A1* | 9/2022 | Kumar Agrawal ... G06F 1/1637 |

FOREIGN PATENT DOCUMENTS

| | | |
|---|---|---|
| CN | 109791582 A | 5/2019 |
| CN | 111149103 A | 5/2020 |
| EP | 3408794 A | 12/2018 |
| EP | 3526715 A | 8/2019 |
| EP | 3622428 A | 3/2020 |
| EP | 3901823 A | 10/2021 |
| JP | 2000-315118 A | 11/2000 |
| JP | 2015-207275 A | 11/2015 |
| JP | 2018-170339 A | 11/2018 |
| JP | 2019-032640 A | 2/2019 |
| JP | 2019-512114 | 5/2019 |
| JP | 2019-532432 | 11/2019 |
| JP | 2020-525891 | 8/2020 |
| KR | 2018-0100147 A | 9/2018 |
| KR | 2019-0068534 A | 6/2019 |
| KR | 2020-0015710 A | 2/2020 |
| WO | WO-2017/132258 | 8/2017 |
| WO | WO-2018/071098 | 4/2018 |
| WO | WO-2019/007514 | 1/2019 |

OTHER PUBLICATIONS

Written Opinion (Application No. PCT/IB2021/054232) Dated Jul. 20, 2021.

* cited by examiner

451

453

FIG. 19A   FIG. 19B   FIG. 19C
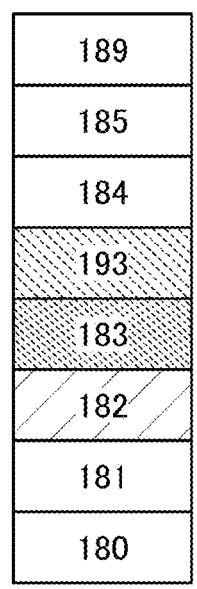 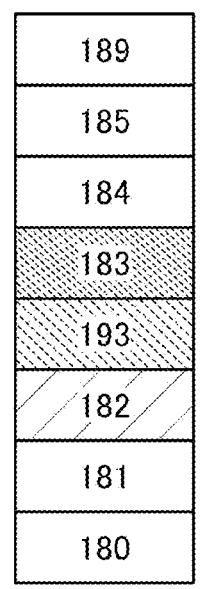 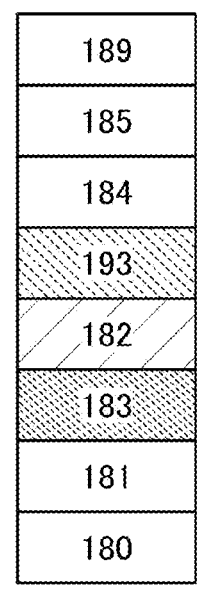
FIG. 19D   FIG. 19E
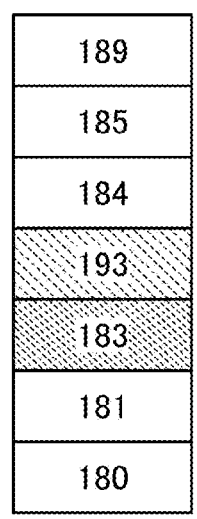 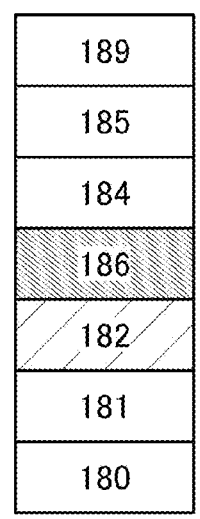

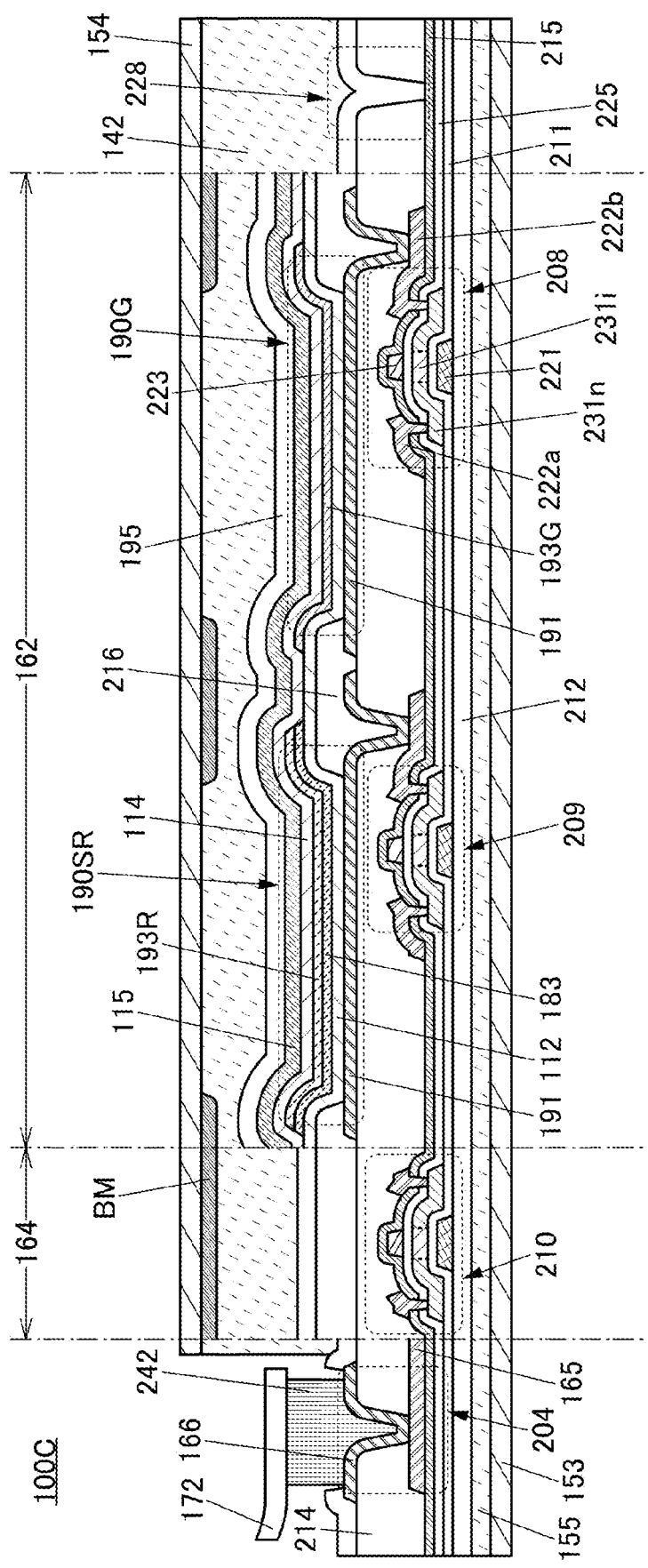
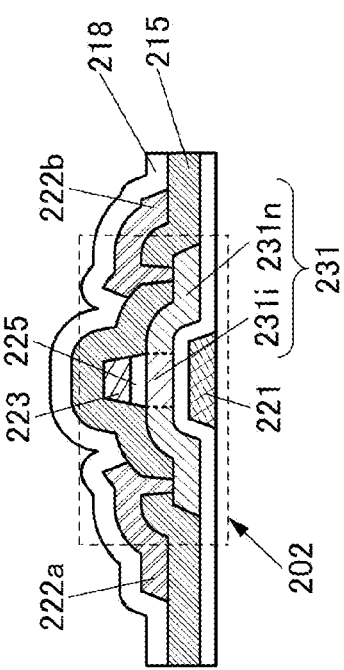
FIG. 28A
FIG. 28B

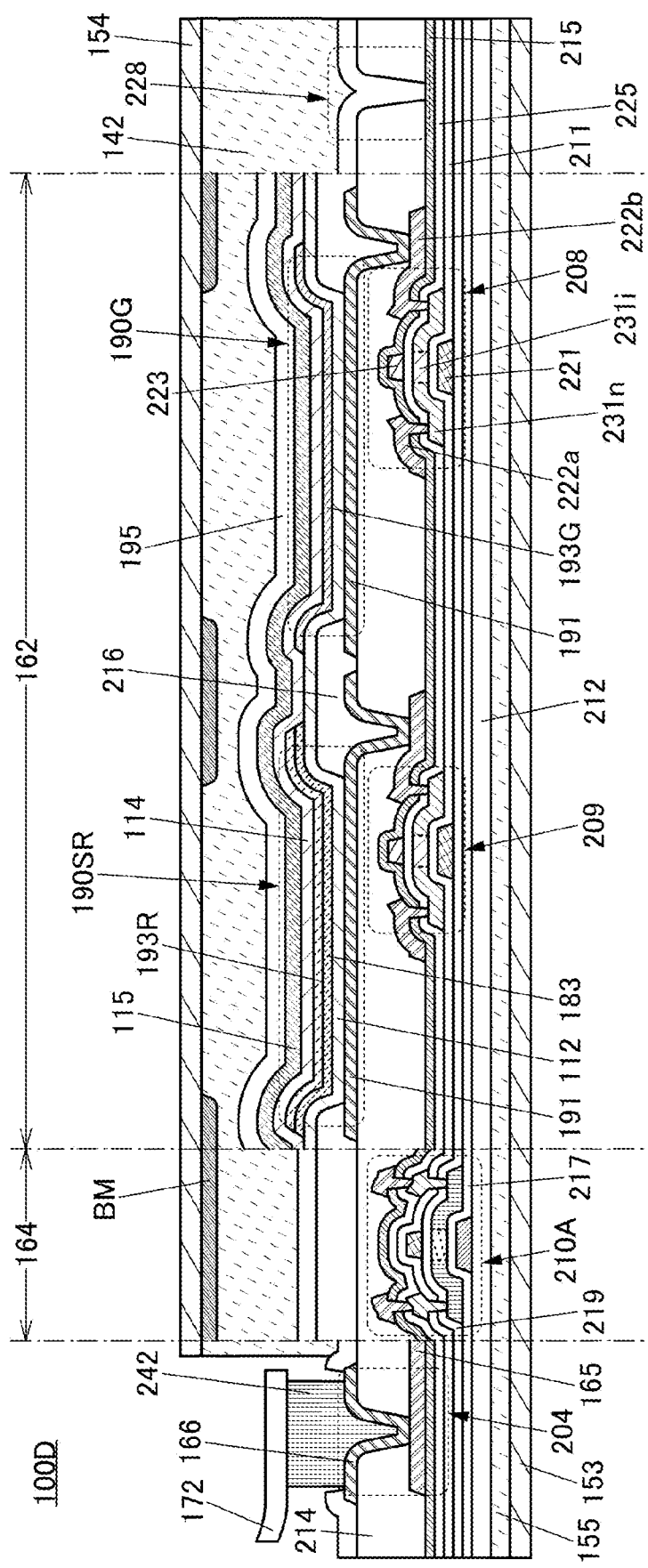

ELECTRONIC DEVICE AND AUTHENTICATION METHOD OF ELECTRONIC DEVICE

TECHNICAL FIELD

One embodiment of the present invention relates to a display device. One embodiment of the present invention relates to an authentication method of a display device. One embodiment of the present invention relates to an electronic device. One embodiment of the present invention relates to an authentication method of an electronic device.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof. A semiconductor device generally means a device that can function by utilizing semiconductor characteristics.

BACKGROUND ART

In recent years, information terminal devices, for example, mobile phones such as smartphones, tablet information terminals, and laptop PCs (personal computers) have been widely used. Such information terminal devices often include personal information or the like, and thus various authentication technologies for preventing abuse have been developed.

For example, Patent Document 1 discloses an electronic device including a fingerprint sensor in a push button switch portion.

REFERENCE

[Patent Document]
   [Patent Document 1] United States Published Patent Application No. 2014/0056493

SUMMARY OF THE INVENTION

Problems to be Solved by the Invention

An object of one embodiment of the present invention is to provide an electronic device having an authentication function typified by fingerprint authentication. Another object is to provide an electronic device with high security. Another object is to provide an electronic device with high operability. Another object is to provide a multi-function electronic device. Another object is to provide a novel electronic device. Another object is to provide an electronic device having an authentication method with high security. Another object is to provide an electronic device having a novel authentication method.

Note that the description of these objects does not preclude the existence of other objects. One embodiment of the present invention does not have to achieve all these objects. Objects other than these can be derived from the description of the specification, the drawings, the claims, and the like.

Means for Solving the Problems

One embodiment of the present invention is an electronic device including a pixel portion, a sensor portion, and an authentication portion. The pixel portion includes a display element and a light-receiving element. The pixel portion includes a first region and has a function of making the display element of the first region emit light. The pixel portion has a function of obtaining first authentication information by capturing an image of an object that is in contact with the first region with the use of the light-receiving element. The sensor portion includes a second region and has a function of obtaining second authentication information by capturing an image of an object that is in contact with the second region. The authentication portion has a function of performing first authentication processing using the first authentication information. The authentication portion has a function of performing second authentication processing using the second authentication information.

In the above-described electronic device, the sensor portion is preferably an ultrasonic sensor.

In the above-described electronic device, the second region is preferably provided on the same surface as that of the pixel portion.

In the above-described electronic device, the second region is preferably provided on a surface opposite to the pixel portion.

In the above-described electronic device, the first region preferably includes a region overlapping with the second region.

In the above-described electronic device, it is preferable that the first region not include a region overlapping with the second region.

In the above-described electronic device, the pixel portion preferably includes a touch sensor. The touch sensor preferably has a function of sensing a position of an object that is in contact with the pixel portion. The position with which the object is in contact and a vicinity of the position are the first region and the pixel portion has a function of making the display element of the first region emit light.

In the above-described electronic device, the object is a finger.

One embodiment of the present invention is an authentication method of an electronic device including a pixel portion, a sensor portion, and an authentication portion, and the pixel portion includes a display element and a light-receiving element. The above-described electronic device includes: a step in which the pixel portion makes the display element of a first region emit light; a step in which the light-receiving element obtains first authentication information by capturing an image of an object that is in contact with the first region; a step in which the authentication portion performs first authentication processing using the first authentication information; a step in which the sensor portion obtains second authentication information by capturing an image of an object that is in contact with the sensor portion; and a step in which the authentication portion performs second authentication processing using the second authentication information.

One embodiment of the present invention is an authentication method of an electronic device including a pixel portion, a sensor portion, and an authentication portion, and the pixel portion includes a display element, a light-receiving element, and a touch sensor. The above-described electronic device includes: a step in which the touch sensor senses a position of an object that is in contact with the pixel portion; a step in which the pixel portion makes the display element at and in a vicinity of the position with which the object is in contact with emit light; a step in which the light-receiving element obtains first authentication information by capturing an image of the object that is in contact with the position and the vicinity; a step in which the authentication portion performs first authentication processing using the first authentication information; a step in which the sensor portion obtains second authentication information by capturing an image of an object that is in contact with the sensor portion; and a step in which the authentication portion performs second authentication processing using the second authentication information.

In the above-described authentication method of an electronic device, the sensor portion is preferably an ultrasonic sensor.

Effect of the Invention

With one embodiment of the present invention, an electronic device having an authentication function typified by fingerprint authentication can be provided. An electronic device with high security can be provided. An electronic device with high operability can be provided. A multifunction electronic device can be provided. A novel electronic device can be provided. An electronic device having an authentication method with high security can be provided. An electronic device having a novel authentication method can be provided.

Note that the description of these effects does not preclude the existence of other effects. One embodiment of the present invention does not have to have all these effects. Effects other than these can be derived from the description of the specification, the drawings, the claims, and the like.

BRIEF DESCRIPTION OF THE DRAWINGS

FIG. 19A to FIG. 19E are cross-sectional views illustrating examples of a light-emitting and light-receiving element.

FIG. 28A is a cross-sectional view illustrating an example of a display device. FIG. 28B is a cross-sectional view illustrating an example of a transistor.

FIG. 29A is a cross-sectional view illustrating an example of a display device. FIG. 29B is a cross-sectional view illustrating an example of a transistor.

MODE FOR CARRYING OUT THE INVENTION

Figure 1:
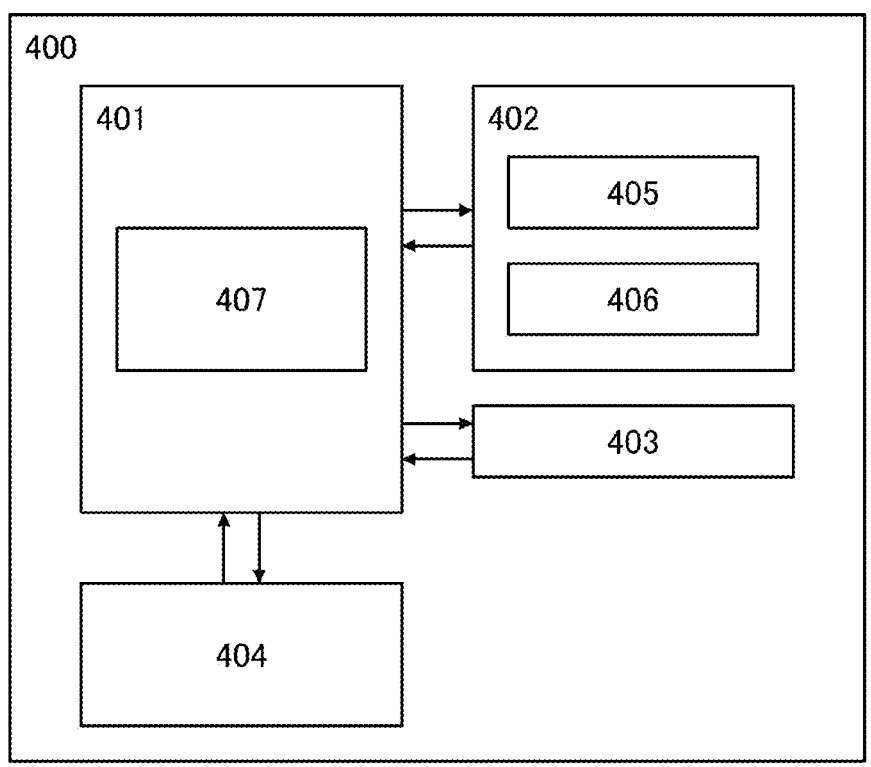
FIG. 1 is a diagram illustrating a structure example of a display device.

Hereinafter, embodiments will be described with reference to the drawings. Note that the embodiments can be implemented in many different modes, and it is readily understood by those skilled in the art that modes and details thereof can be changed in various ways without departing from the spirit and scope thereof. Thus, the present invention should not be construed as being limited to the following description of the embodiments.

Note that in structures of the invention described below, the same portions or portions having similar functions are denoted by the same reference numerals in different drawings, and the description thereof is not repeated. Furthermore, the same hatch pattern is used for the portions having similar functions, and the portions are not especially denoted by reference numerals in some cases.

Note that in each drawing described in this specification, the size, the layer thickness, or the region of each component is exaggerated for clarity in some cases. Therefore, they are not limited to the illustrated scale.

Note that in this specification and the like, the ordinal numbers such as "first" and "second" are used in order to avoid confusion among components and do not limit the number.

Note that the expressions indicating directions such as "over" and "under" are basically used to correspond to the directions of drawings. However, in some cases, the direction indicating "over" or "under" in the specification does not correspond to the direction in the drawings for the purpose of description simplicity or the like. For example, when a stacking order (or formation order) of a stacked body or the like is described, even in the case where a surface on which the stacked body is provided (e.g., a formation surface, a support surface, an adhesion surface, or a planar surface) is positioned above the stacked body in the drawings, the direction and the opposite direction are expressed using "under" and "over", respectively, in some cases.

In this specification and the like, a display panel that is one embodiment of a display device has a function of displaying (outputting) an image or the like on (to) a display surface. Therefore, the display panel is one embodiment of an output device.

In this specification and the like, a structure in which a connector such as an FPC (Flexible Printed Circuit) or a TCP (Tape Carrier Package) is attached to a substrate of a display panel, or a structure in which an IC is mounted on a substrate by a COG (Chip On Glass) method or the like is referred to as a display panel module or a display module, or simply as a display panel or the like in some cases.

Note that in this specification and the like, a touch panel that is one embodiment of a display device has a function of displaying an image or the like on a display surface and a function of a touch sensor that senses the contact, press, approach, or the like of a sensing target such as a finger or a stylus with or to the display surface. Thus, the touch panel is one embodiment of an input/output device.

A touch panel can be referred to as, for example, a display panel (or a display device) with a touch sensor, or a display panel (or a display device) having a touch sensor function. A touch panel can include a display panel and a touch sensor panel. Alternatively, a touch panel can have a function of a touch sensor in the display panel or on the surface of the display panel.

In this specification and the like, a structure in which a connector or an IC is mounted on a substrate of a touch panel is referred to as a touch panel module or a display module, or simply as a touch panel or the like in some cases.

Embodiment 1

In this embodiment, a display device and an electronic device that are embodiments of the present invention will be described.

The display device that is one embodiment of the present invention includes a pixel portion, a sensor portion, and an authentication portion.

The pixel portion includes display elements and light-receiving elements which are arranged in a matrix. Part of light emitted by the display elements is reflected by an object and the reflected light enters the light-receiving elements. The light-receiving elements can output electric signals in accordance with the intensity of incident light. By including the light-receiving elements arranged in a matrix, the pixel portion can obtain positional information or data on the shape (also referred to as capturing an image) of an object (subject) that is in contact with or approaching the pixel portion. In other words, the pixel portion can function as an image sensor panel or an optical sensor as well as having a function of displaying an image.

The pixel portion has a function of obtaining first authentication information by capturing an image of an object that is in contact with the pixel portion with the use of the light-receiving elements. The sensor portion has a function of obtaining second authentication information by capturing an image of an object that is in contact with the sensor portion. For the sensor portion, an ultrasonic sensor can be suitably used, for example. The authentication portion has a function of performing first authentication processing using the first authentication information. The authentication portion has a function of performing second authentication processing using the second authentication information. The display device that is one embodiment of the present invention can have an increased level of security by performing some different types of authentications.

The object whose image is captured can be a finger or a palm, for example. In the case where the object is a finger, fingerprint images can be used as the first authentication information and the second authentication information. In the case where the object is a palm, palm images can be used as the first authentication information and the second authentication information. Note that the object used for obtaining the first authentication information and the object used for obtaining the second authentication information may be different from each other. For example, a palm image may be used as the first authentication information, and a fingerprint image may be used as the second authentication information. By performing authentications using different objects, the security can be increased.

Display Device Structure Example 1

FIG. 1 is a block diagram of a display device 400 that is one embodiment of the present invention. The display device 400 includes a control portion 401, a pixel portion 402, a sensor portion 403, and a memory portion 404. The control portion 401 includes an authentication portion 407. The pixel portion 402 includes a display element 405 and a light-receiving element 406. The display device 400 can be used in an electronic device such as a portable information terminal, for example.

Here, a case where the object whose image is captured is a finger is described.

Note that in the drawings attached to this specification, the block diagram in which components are classified according to their functions and shown as independent blocks is illustrated; however, it is difficult to separate actual components completely according to their functions, and one component may be related to a plurality of functions or a plurality of components may achieve one function.

The control portion 401 has a function of performing entire control of the system of the display device 400. The control portion 401 has a function of performing centralized control of each component included in the display device 400.

The control portion 401 has a function of a central processing unit (CPU), for example. The control portion 401 interprets and executes instructions from various programs with use of a processor to process various kinds of data or control programs. Programs that can be executed by the processor may be stored in a memory region of the processor or may be stored in the memory portion 404.

The control portion 401 has a function of generating image data to be output to the pixel portion 402, a function of processing the first authentication information input from the light-receiving element 406 of the pixel portion 402, a function of processing the second authentication information input from the sensor portion 403, and a function of controlling the lock state of the display device 400, for example.

Specifically, the pixel portion 402 has a function of displaying an image with the display element 405 on the basis of image data input from the control portion 401. The pixel portion 402 can capture an image of an object (subject) that is in contact with or approaching the pixel portion 402. Part of light emitted by the display element 405 is reflected by the object and the reflected light enters the light-receiving element 406, for example. The light-receiving element can output an electric signal in accordance with the intensity of incident light. By including the plurality of light-receiving elements 406 arranged in a matrix, the pixel portion 402 can obtain positional information or data on the shape (capture an image) of the object. In other words, the pixel portion 402 has a function of an image sensor panel or an optical sensor.

The pixel portion 402 has a function of obtaining the first authentication information of a user with the use of the light-receiving element 406 and outputting the first authentication information to the control portion 401. As the first authentication information, a fingerprint image of a user touching the pixel portion 402 (also referred to as a first image-capture image or first image-capture data) can be used, for example. An image of a fingerprint of a user touching the pixel portion 402 is captured with the use of the light-receiving element 406; thus, the first authentication information can be obtained.

Because the pixel portion 402 having a function of an optical sensor can obtain information on the color of an object, color information may be contained in the first authentication information. For example, in the case where the object is a finger, skin color information as well as fingerprint information can be obtained as the first authentication information.

The sensor portion 403 has a function of obtaining the second authentication information of a user and outputting the second authentication information to the control portion 401. As the second authentication information, a fingerprint image of a user touching the display device 400 (also referred to as a second image-capture image or second image-capture data) can be used, for example. For the sensor portion 403, an ultrasonic sensor, an optical sensor, a capacitive sensor, or the like can be used. For the sensor portion 403, an ultrasonic sensor can be especially suitably used.

An ultrasonic sensor emits an ultrasonic wave and senses the wave reflected by an object, thereby obtaining three-dimensional information on the surface unevenness of the object. Since an ultrasonic wave passes through the skin, in the case where the object is a human finger, not only finger surface unevenness (a fingerprint) but also the bloodstream inside the skin can be sensed. By using an ultrasonic sensor for the sensor portion 403, the second authentication information can be obtained with high sensitivity.

The memory portion 404 has a function of retaining user information of a user registered in advance. As the user information, fingerprint information of the user can be used, for example. The memory portion 404 can output the user information to the authentication portion 407 in accordance with the request from the control portion 401.

The memory portion 404 preferably retains fingerprint information of all the user's fingers used for authentication. For example, two pieces of fingerprint information on user's right and left index fingers can be retained. The user can freely register fingerprint information of not only an index finger but also one or more of a middle finger, a ring finger, a little finger, and a thumb, and the memory portion 404 can retain all pieces of the registered fingerprint information.

The control portion 401 has a function of bringing the system from the locked state into the unlocked state and shifting the display device 400 to a ready-to-use state in the case where a user is authenticated by user authentication executed by the authentication portion 407.

The control portion 401 has a function of making the display element 405 of the pixel portion 402 emit light when an operation of the display device 400 is sensed in a period in which the display device 400 is locked. In addition, the control portion 401 has a function of requesting the pixel portion 402 to execute fingerprint image capturing in the state where the display element 405 emits light.

The control portion 401 may also have a function of generating image data including an image showing a position to be touched by a user (also referred to as an image indicating a touch position) on the pixel portion 402 and outputting the image data to the pixel portion 402 when the system of the display device 400 is locked.

The authentication portion 407 has a function of comparing the first authentication information input from the pixel portion 402 and fingerprint information retained in the memory portion 404 and executing processing for determining whether those match or not (first authentication processing). Furthermore, the authentication portion 407 has a function of comparing the second authentication information input from the sensor portion 403 and fingerprint information retained in the memory portion 404 and executing processing for determining whether those pieces of information match or not (second authentication processing).

In each of the first authentication processing and the second authentication processing, a method using the degree of similarity between two images compared, such as a template matching method or a pattern matching method, can be used, for example. In each of the first authentication processing and the second authentication processing, a minutia method comparing minutiae such as ridge endings and bifurcations of an image pattern may be used. In each of the first authentication processing and the second authentication processing, inference using machine learning may be used. In this case, it is particularly preferable that the first authentication processing and the second authentication processing be each performed by inference using a neural network. Note that the first authentication processing and the second authentication processing may use the same or different methods.

The display device 400 that is one embodiment of the present invention can have high security by performing authentication in multiple stages, i.e., the first authentication and the second authentication (hereinafter also referred to as multistage authentication). The display device 400 that is one embodiment of the present invention can use the first authentication information obtained by the pixel portion 402 having a function of an optical sensor for the first authentication and use the second authentication information obtained by the sensor portion 403 using the ultrasonic sensor for the second authentication, for example. The display device 400 that is one embodiment of the present invention can have an increased level of security by performing some different types of authentications.

In the case where the first authentication information contains color information, the first authentication processing may be performed using the color information. In addition to fingerprint information, color information may be used for the first authentication processing, whereby a display device with high security can be provided.

Authentication Method Example 1

An authentication method example using the display device 400 is described below. As the authentication method of an electronic device using the display device 400, an operation of authenticating a user using a fingerprint is described here.

Figure 2:
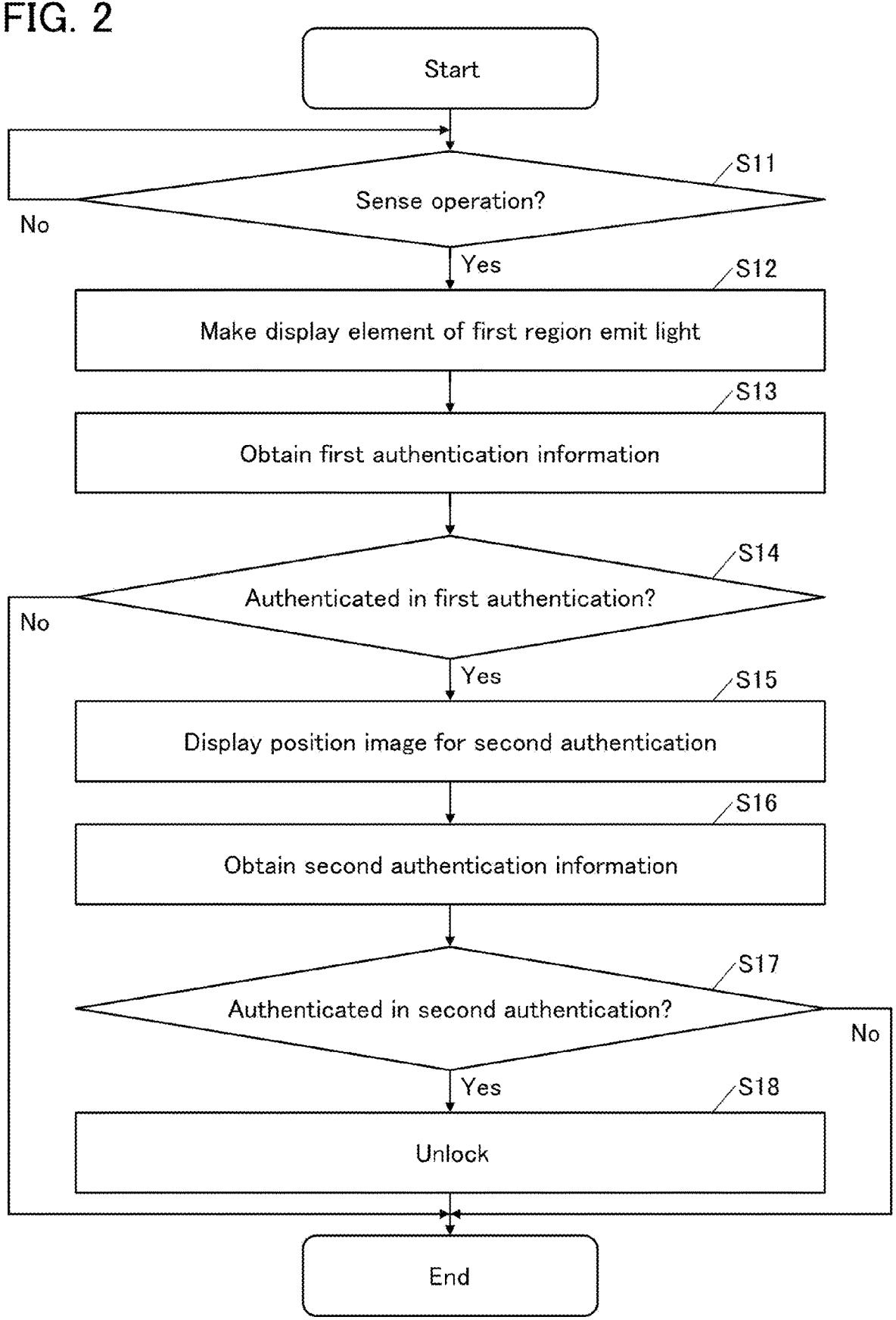
FIG. 2 is a flowchart showing an example of an authentication method.
Figure 3A:
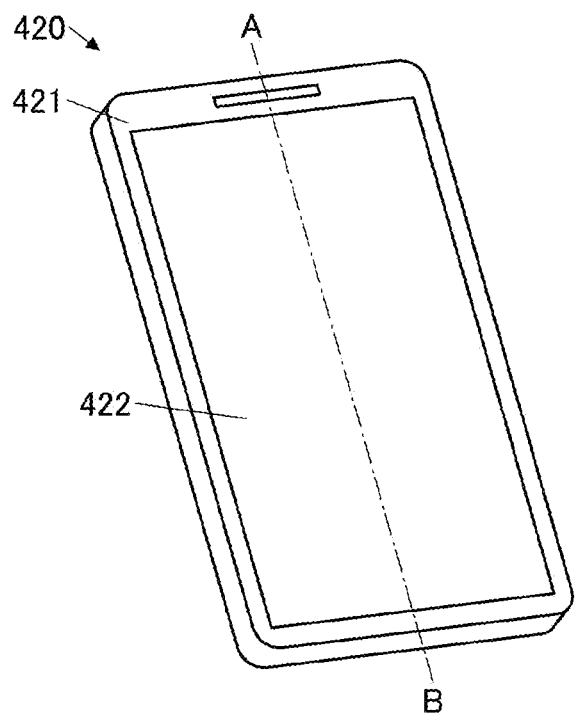
FIG. 3A and FIG. 3B are diagrams illustrating structure examples of an electronic device.

A flowchart of the operation of the authentication method using the display device 400 is shown in FIG. 2. An electronic device 420 in which the display device 400 is used is illustrated in FIG. 3A. The electronic device 420 includes a housing 421 and a pixel portion 422. The electronic device 420 includes the control portion 401, the sensor portion 403, and the memory portion 404, which are described above, inside the housing 421. The above-described pixel portion 402 can be used as the pixel portion 422.

First, processing is started. At this time, the system of the electronic device 420 is locked, i.e., in a state where functions that can be executed by a user are limited (including a log-out state and a log-off state).

In Step S11, a user operation on the electronic device 420 is sensed. Examples of the method for sensing a user operation include turning on the electronic device 420, pressing a physical button, sensing user's eyes to the device, making ambient light bright, and changing the orientation of the electronic device 420 greatly. When the operation is sensed, the operation proceeds to Step S12. Step S11 is repeatedly executed until the operation is sensed.

Next, in Step S12, the display element 405 included in the pixel portion 422 is made to emit light. Light emitted from the display element 405 can be used as a light source for capturing an image by the light-receiving element 406. Accordingly, the display element 405 can emit light that can be received by the light-receiving element 406. In the case where the pixel portion 422 includes the display elements 405 of three colors, red (R), green (G), and blue (B), for example, any one or two or all of the display elements 405 can be made to emit light.

Figure 3B:
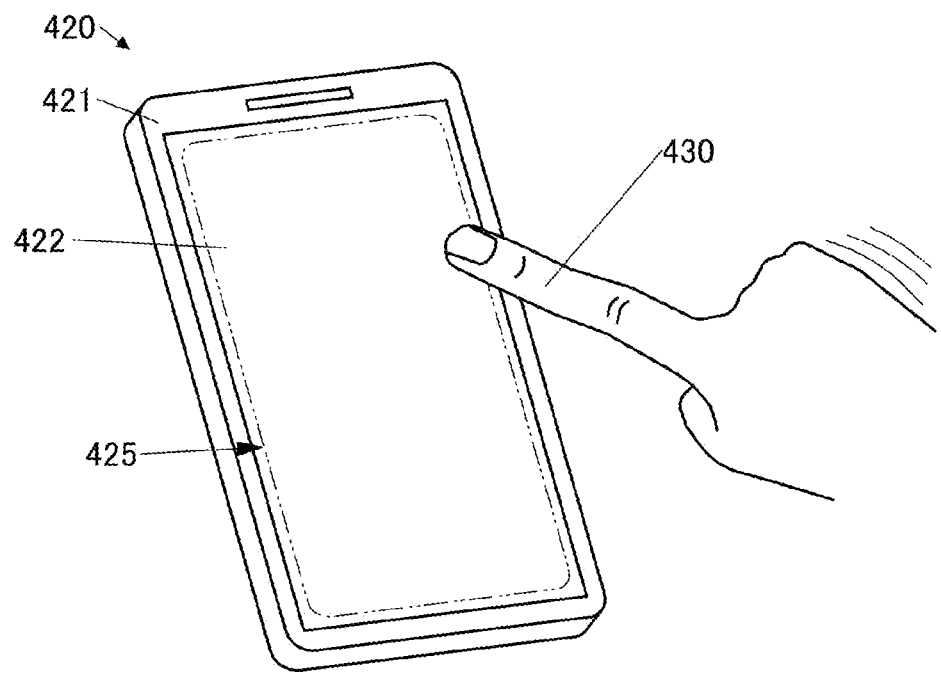

In Step S12, all the display elements 405 in the pixel portion 422 may be made to emit light, or some of the display elements 405 in the pixel portion 422 may be made to emit light. In this specification and the like, the region from which the first authentication information is obtained may be referred to as a first region. FIG. 3B illustrates an example in which all the display elements 405 in the pixel portion 422 are made to emit light, that is, the entire surface of the pixel portion 422 serves as a first region 425. A user can perform the first authentication by touching the first region 425. In the case where the entire surface of the pixel portion 422 serves as the first region 425, the user can perform the first authentication by touching any region on the pixel portion 422.

In the case where some of the display elements 405 in the pixel portion 422 are made to emit light, that is, where part of the pixel portion 422 serves as the first region 425, the user can perform the first authentication by touching the first region 425. The display elements 405 in the region except the first region 425 may be made to emit no light. Since the display elements 405 emitting light in the first region 425 are covered with a finger 430, bright light can be prevented from being viewed by the user. In other words, light for the first authentication can be prevented from being directly viewed by the user. For example, when a user directly views light for the first authentication under a dark usage environment, the user may feel glare and the light may damage the eyes; for this reason, light emission from only the first region 425 can reduce user's eye strain. Note that the region other than the first region 425 may display an arbitrary image.

In Step S12, the brightness of light emitted by the display element 405 can be changed as appropriate depending on ambient brightness or the sensitivity of the light-receiving element 406, and is preferably as high as possible. For example, assuming that the luminance or the gray level of the display element 405 that emits the brightest light is 100%, the luminance or the gray level can be 50% to 100%, preferably 70% to 100%, further preferably 80% to 100%.

Next, in Step S13, the first authentication information is obtained with the use of the light-receiving element 406. The first authentication information, which is the image data (the first image data) captured with the use of the light-receiving element 406, is output from the pixel portion 422 to the control portion 401. The image capture region can be the first region 425.

Figure 4A:
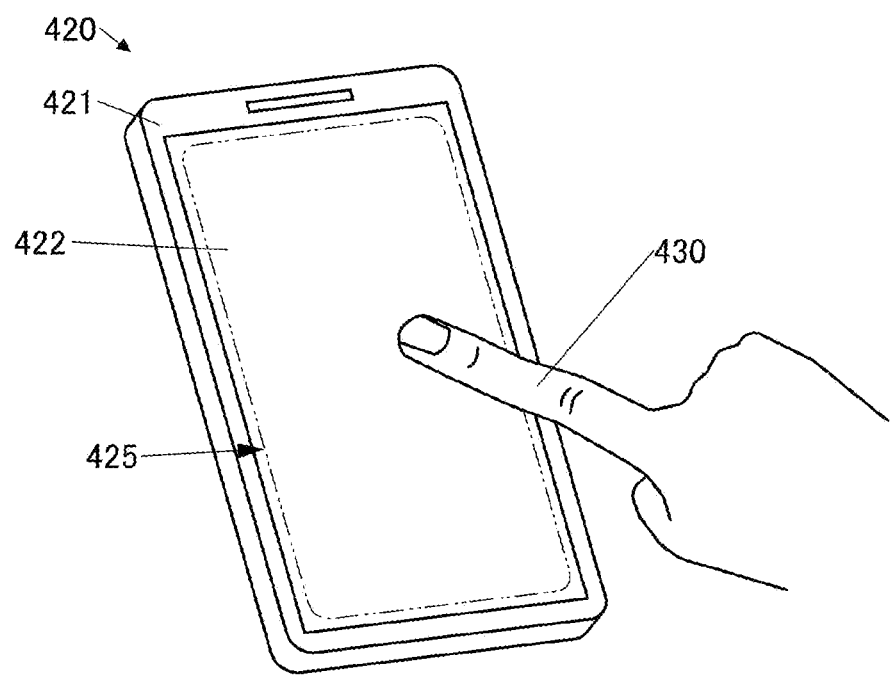
FIG. 4A is a diagram illustrating a structure example of an electronic device.
Figure 4B:
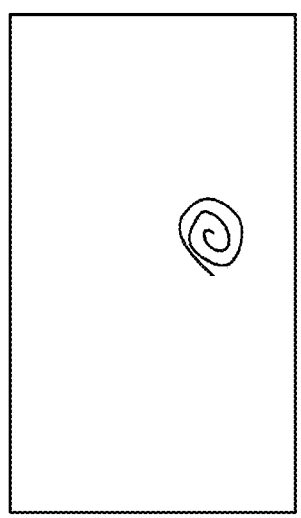
FIG. 4B is a diagram illustrating an example of authentication information.

In Step S12, in the case where all the display elements 405 in the pixel portion 422 are made to emit light, that is, where the entire surface of the pixel portion 422 serves as the first region 425, all the light-receiving elements 406 in the pixel portion 422 are made to operate to obtain the first authentication information. FIG. 4A illustrates capturing of a fingerprint image as the first image data by touching the first region 425 with the finger 430 in the case where the entire surface of the pixel portion 422 serves as the first region 425. FIG. 4B illustrates an example of the fingerprint image data (the first image data) captured as first authentication information 451.

Figure 5A:
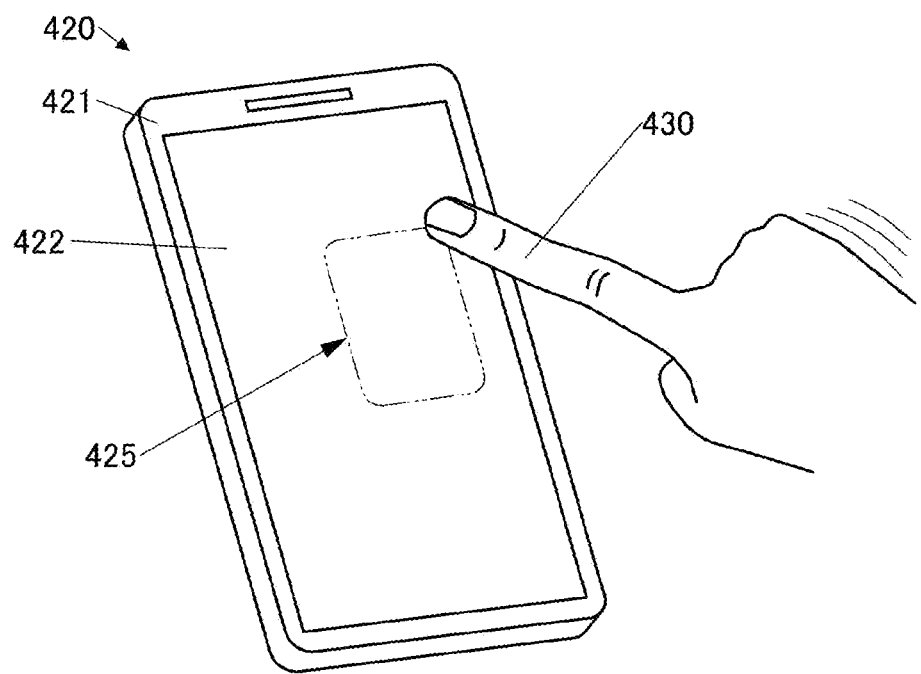
FIG. 5A is a diagram illustrating a structure example of an electronic device.
Figure 5B:
FIG. 5B is a diagram illustrating an example of authentication information.

In Step S12, in the case where some of the display elements 405 in the pixel portion 422 are made to emit light, that is, where part of the surface of the pixel portion 422 serves as the first region 425, the light-receiving elements 406 in the first region 425 are made to operate to obtain the first authentication information. The first region can be regarded as part of the pixel portion 422. FIG. 5A illustrates capturing of a fingerprint image as the first image data by touching the first region 425 with the finger 430 in the case where part of the pixel portion 422 serves as the first region 425. FIG. 5B illustrates an example of the fingerprint image data (the first image data) captured as first authentication information 451. Note that also in the case where part of the pixel portion 422 is the first region 425 in Step S12, all the light-receiving elements 406 in the pixel portion 422 may be made to operate to obtain the first authentication information.

The first region 425 may be in the same position every time when processing is executed, but preferably in different positions every time when processing is executed. That is, the user touches portions randomly shown in different positions every time when processing is executed; thus, the first authentication can be performed.

Capturing a fingerprint image in the same position every time promotes degradation of the display element 405 that is made to emit light as a light source for capturing a fingerprint image and the transistor included in the pixel, for example, which may cause a problem such as a decrease in the emission luminance of the display element 405 or burn-in of the screen. Therefore, by performing fingerprint authentication in different positions every time when processing is executed as described above, a decrease in the luminance of the display element 405, burn-in of the screen, and the like can be inhibited.

Fingerprint authentication executed at different positions every time when processing is performed requires the user to perform the operation for authentication actively, which leads to an improvement in user's security awareness.

A plurality of first regions 425 may be provided in the pixel portion 422 and touched with two or more fingers at the same time so that the first authentication can be performed on the basis of two or more pieces of fingerprint information. Alternatively, the first authentication may be performed a plurality of times in such a manner that the first authentication is performed with one finger, and when the finger is authenticated, the first authentication is further performed with a different finger.

By performing the first authentication with not only one piece of fingerprint information but also a plurality of pieces of fingerprint information, the electronic device 420 with high security can be achieved. For example, even when a malicious user obtains fingerprint information of a true user (owner) illegally and uses the electronic device 420, the electronic device 420 cannot be used without fingerprint information of a plurality (preferably, all) of fingers; thus, unauthorized use can be favorably prevented.

In the case where the first authentication is performed a plurality of times, processing of Step S12 to Step S14 is executed a plurality of times. As two-step authentication, the following processing can be executed, for example: authentication processing is performed using a fingerprint of a right middle finger in the first processing; when the fingerprint is authenticated, authentication processing is performed using a fingerprint of a left ring finger in the second processing; and when the fingerprint of the left ring finger is authenticated, the operation proceeds to Step S15. Fingers used in the first processing and the second processing are preferably randomly changed for every processing.

Next, in Step S14, the first authentication processing is executed by the authentication portion 407. Specifically, the authentication portion 407 compares the first authentication information (the first image data) output from the pixel portion 422 and user's fingerprint information registered in advance and retained in the memory portion 404, and determines whether those pieces of information match or not. When authenticated, that is, when it is determined that the first authentication information and the user's fingerprint information match, the operation proceeds to Step S15. When not authenticated, that is, when it is determined that the first authentication information and the user's fingerprint information do not match, the processing ends. In the case where two or more pieces of fingerprint information are stored in the memory portion 404, all pieces of fingerprint information are subjected to the first authentication processing.

Next, in Step S15, a position image for the second authentication is displayed on the pixel portion 422. The position image includes an image showing a position to be touched by the user, an image indicating a touch position to the user, text information urging the user to touch, or the like.

Figure 6A:
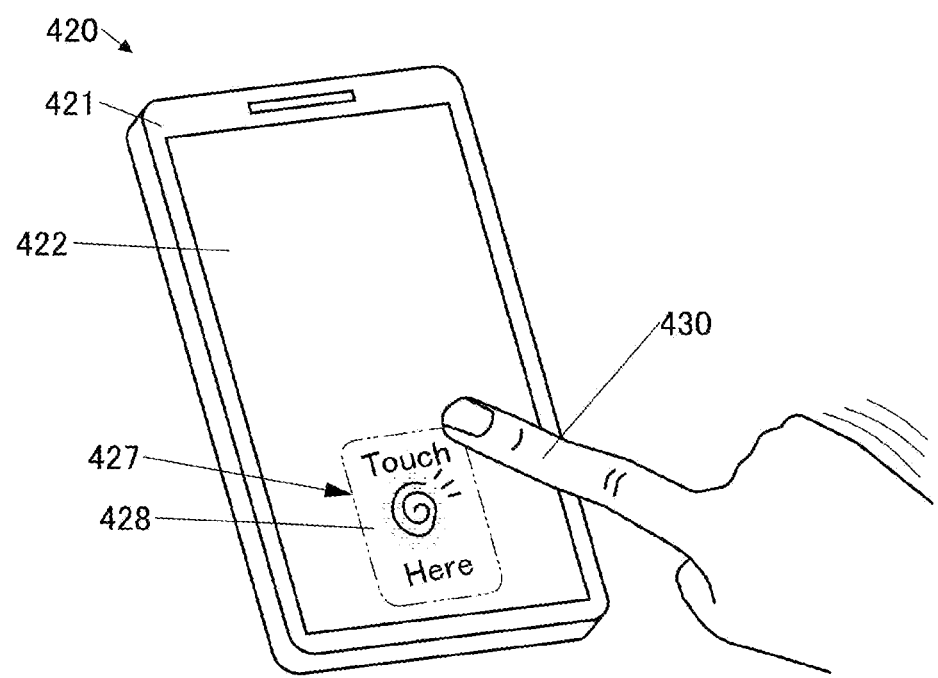
FIG. 6A is a diagram illustrating a structure example of an electronic device.

Specifically, the control portion 401 generates image data including a position image and outputs the image data to the pixel portion 422, whereby an image based on the image data is displayed on the pixel portion 422. A region where the position image is displayed is a region from which the second authentication information is obtained with the use of the sensor portion 403. In this specification and the like, the region from which the second authentication information is obtained may be referred to as a second region. A user can perform the second authentication by touching a second region 427. FIG. 6A illustrates a state in which an image 428 is displayed on the second region 427 and the second region 427 is about to be touched by the finger 430.

FIG. 6A illustrates an example in which the image 428 includes text information "Touch Here" to urge the user to touch in addition to an illustration that imitates a fingerprint. The illustration added with the text information can clearly show the position to the user.

As the image 428, not only a touch position but also an image or text information which specifies a finger to touch can be displayed in combination. For example, text information such as "Please touch with a middle finger" can be displayed and authentication can be executed using fingerprint information of a middle finger in the later second authentication processing. Different fingers can be randomly specified for every processing like a touch position.

Although FIG. 6A illustrates the structure in which the second region 427 is provided inside the pixel portion 422, that is, the structure in which the pixel portion 422 includes a region overlapping with the second region 427, one embodiment of the present invention is not limited to this structure. The second region may be provided outside the pixel portion 422. With the structure in which the second region 427 is provided inside the pixel portion 422, the electronic device 420 can have a narrow bezel.

Although the structure of displaying the image 428 on the second region 427 is illustrated in FIG. 6A, one embodiment of the present invention is not limited to this structure. In order to show the second region 427 to the user, the display elements 405 in the second region 427 may be made to emit light without displaying the image 428 on the second region 427.

Figure 6B:
FIG. 6B is a diagram illustrating an example of authentication information.

Next, in Step S16, the second authentication information is obtained with the use of the sensor portion 403. The second authentication information, which is the image data (the second image data) captured with the use of the sensor portion 403, is output from the sensor portion 403 to the control portion 401. FIG. 6B illustrates an example of the fingerprint image data (the second image data) captured as second authentication information 453.

Next in Step S17, the second authentication processing is executed by the authentication portion 407. Specifically, the authentication portion 407 compares the second authentication information (the second image data) output from the sensor portion 403 and user's fingerprint information registered in advance and retained in the memory portion 404, and determines whether those pieces of information match or not. When authenticated, the processing proceeds to Step S18. When not authenticated, the processing ends. In the case where two or more pieces of fingerprint information are stored in the memory portion 404, all pieces of fingerprint information are subjected to the second authentication processing.

In Step S18, the control portion 401 brings the system of the electronic device 420 into the unlocked state (including bringing the system into a log-in state).

The above is the description of the flowchart shown in FIG. 2.

The electronic device 420 that is one embodiment of the present invention can perform the first authentication by obtaining the first authentication information with the use of the light-receiving element 406 and can further perform the second authentication by obtaining the second authentication information with the use of the sensor portion 403. By using some different authentication methods, the security level can become extremely high. For example, even when a malicious user obtains fingerprint information of a true user (owner) illegally and uses the electronic device 420, unauthorized use can be favorably prevented.

Although the example in which the first region 425 and the second region 427 are different was presented, one embodiment of the present invention is not limited to this example. The first region 425 and the second region 427 may be in the same position. The first region 425 and the second region 427 may have the same size. Furthermore, the finger used for the first authentication and the finger used for the second authentication may be the same or different.

In the case where the finger used for the first authentication and the finger used for the second authentication are the same, the first region 425 and the second region 427 are preferably in the same position. By performing the first authentication and the second authentication in the same position, a user can perform the first authentication and the second authentication with the finger touched on the pixel portion 422, increasing the operability of the electronic device 420.

Figure 7A:
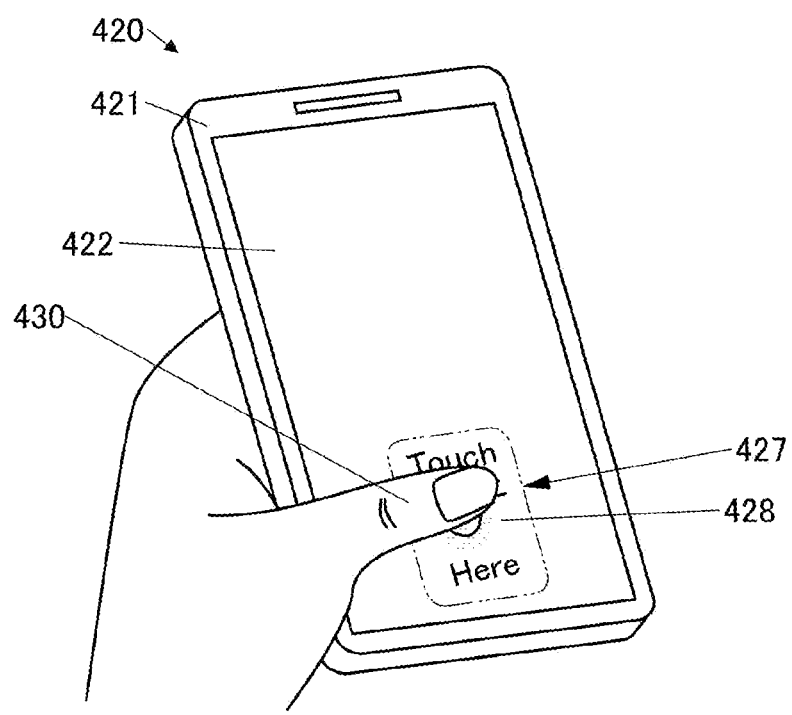
FIG. 7A is a diagram illustrating a structure example of an electronic device.
Figure 7B:
FIG. 7B is a diagram illustrating an example of authentication information.

In the case where the finger used for the first authentication and the finger used for the second authentication are different, the first region 425 and the second region 427 can be in different positions. By using different fingers for the first authentication and the second authentication, the electronic device 420 with high security can be achieved. The position of the first region 425 is preferably arbitrarily set by the user. For example, the first authentication can be performed with the right index finger as illustrated in FIG. 5A, and the second authentication can be performed with the left thumb as illustrated in FIG. 7A. When the position of the first region 425 is arbitrarily set by the user, the electronic device 420 with high operability can be achieved. FIG. 7B illustrates an example of the fingerprint image data (the second image data) captured as second authentication information 453.

The electronic device 420 that is one embodiment of the present invention can be a display device with high security by performing authentication in multiple stages, i.e., the first authentication and the second authentication (hereinafter also referred to as multistage authentication). The electronic device 420 that is one embodiment of the present invention can use the first authentication information obtained by the pixel portion 422 having a function of an optical sensor for the first authentication and use the second authentication information obtained by the sensor portion 403 using the ultrasonic sensor for the second authentication, for example. The electronic device 420 that is one embodiment of the present invention can have an increased level of security by performing some different types of authentications.

Although the structure of performing the second authentication after performing the first authentication is illustrated in FIG. 2, one embodiment of the present invention is not limited to this structure. After the second authentication is performed, the first authentication may be performed. In this case, Step S12 to Step S14 for the first authentication can be performed after Step S15 to Step S17 for the second authentication, for example. Alternatively, Step S12 to Step S14 for the first authentication may proceed in parallel with Step S15 to Step S17 for the second authentication.

In the case where the first region 425 and the second region 427 are in the same position, the electronic device 420 can generate the composite image of the first image data obtained in the first region 425 and the second image data obtained in the second region 427. For example, the first image obtained with the use of the pixel portion 422 contains information on the color of an object, and the second image obtained with the use of the sensor portion 403 using the ultrasonic sensor contains three-dimensional information of the object. By superimposing the first image on the second image, a three-dimensional color image can be obtained. The electronic device 420 that is one embodiment of the present invention can also have a function of a three-dimensional color scanner. With the above-described structure, a multi-function electronic device can be provided.

Authentication Method Example 2

Figure 8:
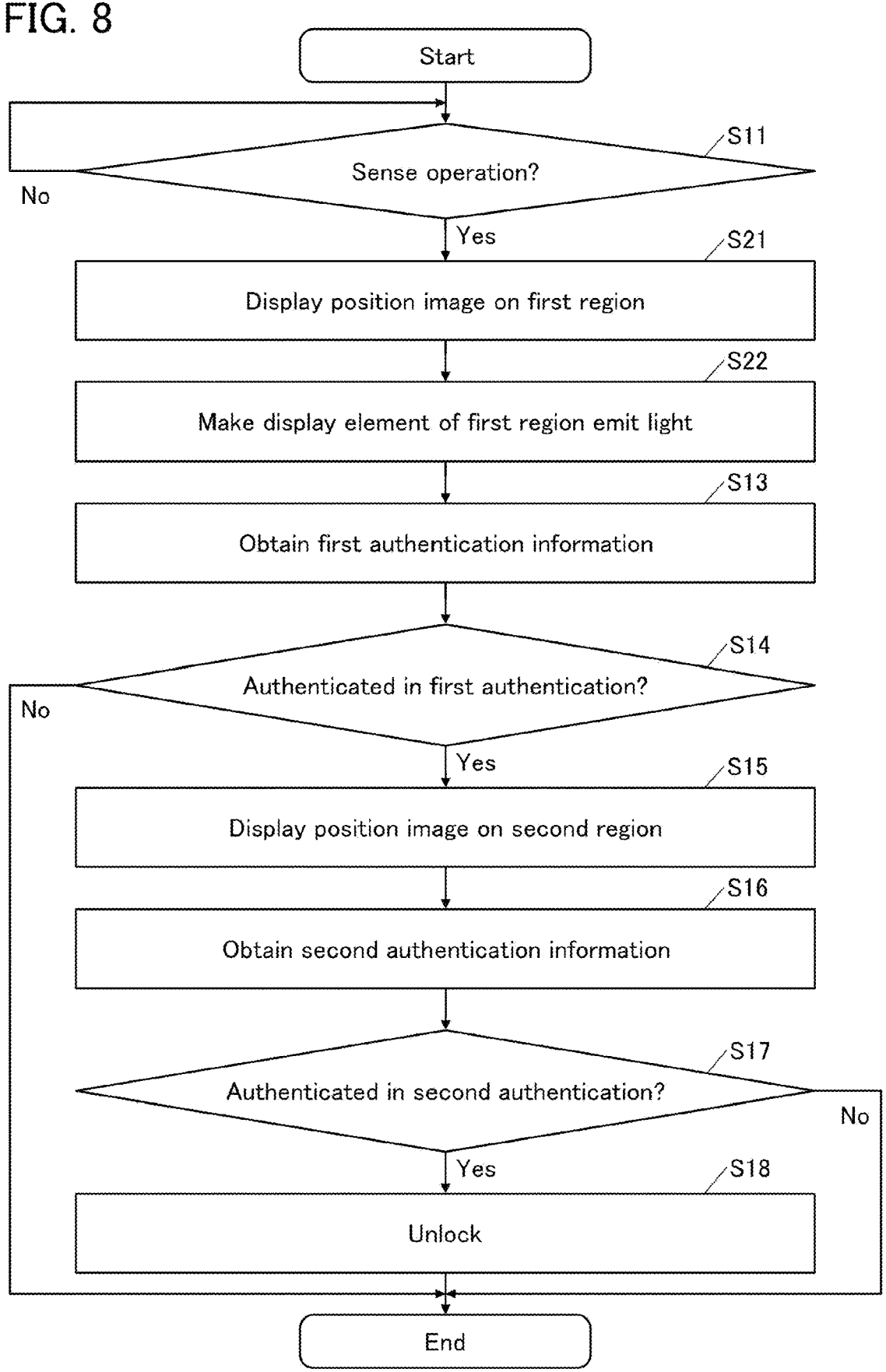
FIG. 8 is a flowchart showing an example of an authentication method.

An authentication method example different from that shown in FIG. 2 is described. A flowchart of the operation of the authentication method is shown in FIG. 8.

First, processing is started. At this time, the system of the electronic device 420 is locked, i.e., in a state where functions that can be executed by a user are limited (including a log-out state and a log-off state).

In Step S11, a user operation on the electronic device 420 is sensed. The detailed description of Step S11 is omitted because the above description can be referred to.

Figure 9:
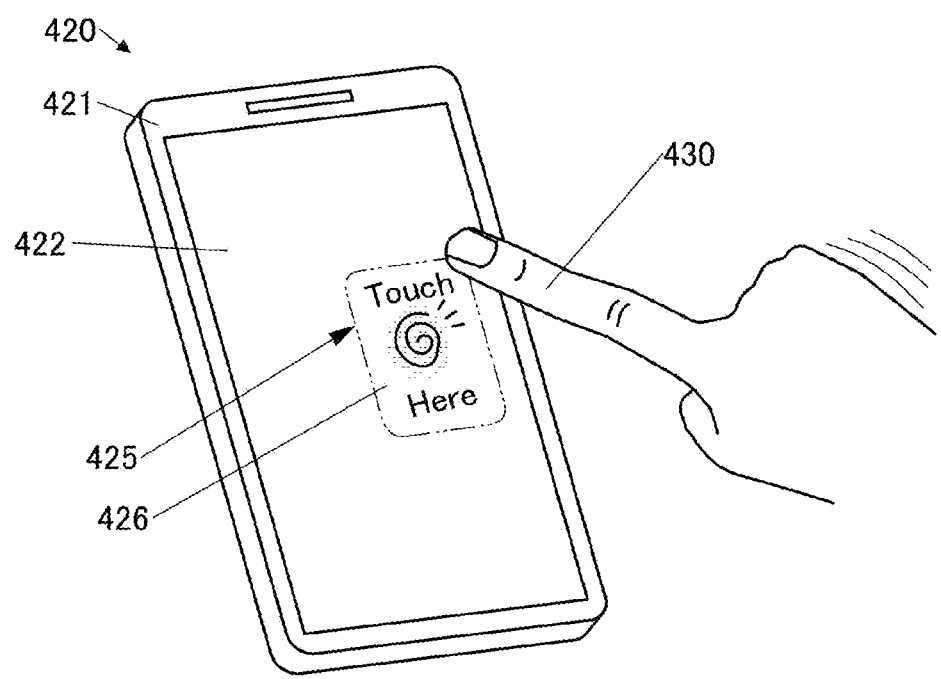
FIG. 9 is a diagram illustrating a structure example of an electronic device.

Next, in Step S21, an image 426 is displayed on the first region 425. FIG. 9 illustrates an example in which the image 426 is displayed on the first region 425. For the image 426, the above description of the image 428 can be referred to and the detailed description thereof is omitted.

Next, in Step S22, the display element 405 of the first region 425 is made to emit light. A user can perform the first authentication by touching the first region 425. The detailed description of Step S22 is omitted because the description of Step S12 can be referred to. Note that all the display elements 405 in the pixel portion 422 may be made to emit light in Step S22.

For subsequent Step S13 to Step S18, the description <Authentication method example 1> can be referred to and the detailed description thereof is omitted.

The above is the description of the flowchart shown in FIG. 8.

Authentication Method Example 3

Figure 10:
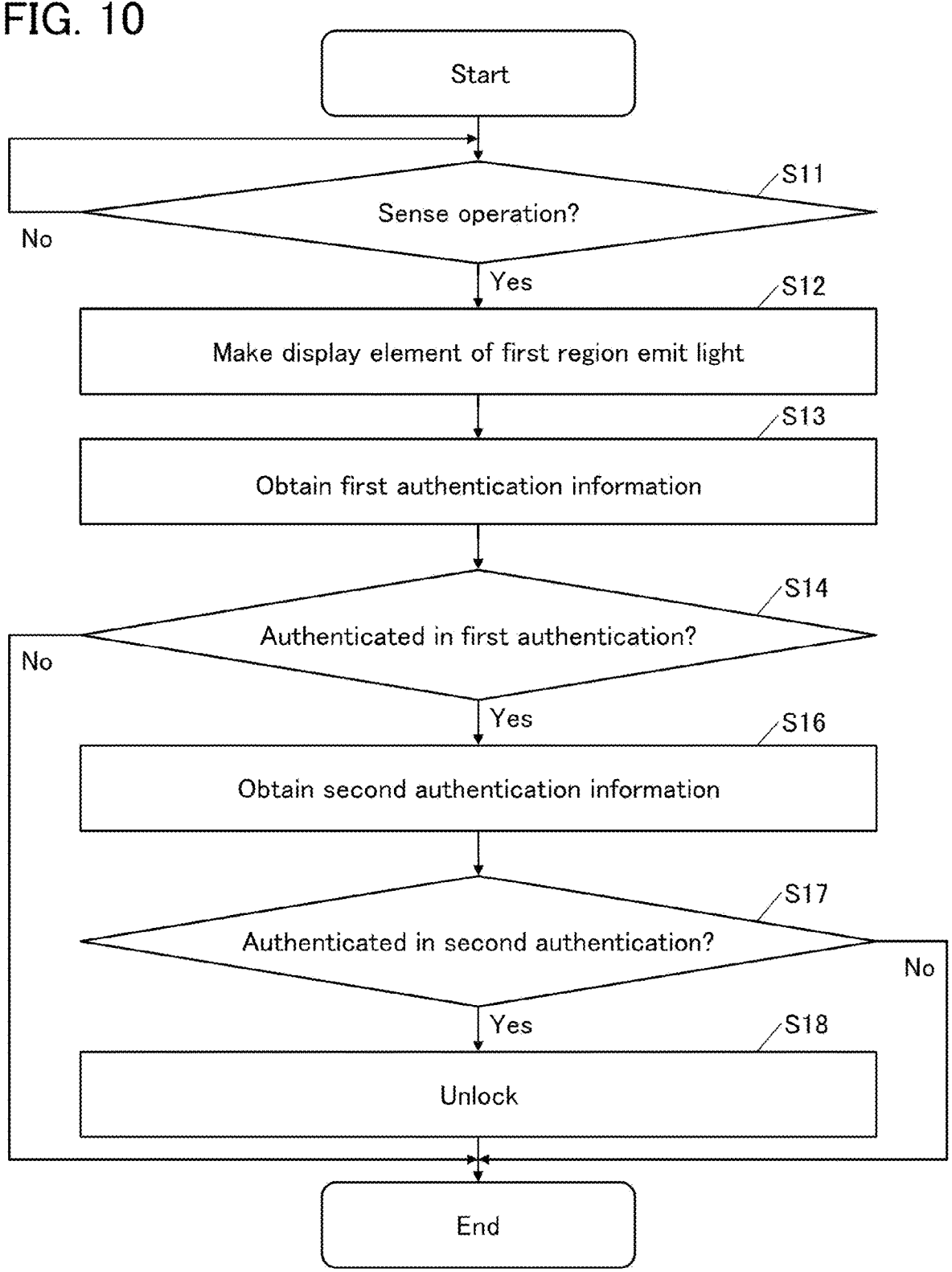
FIG. 10 is a flowchart showing an example of an authentication method.

An authentication method example different from that shown in FIG. 2 is described. A flowchart of the operation of the authentication method is shown in FIG. 10. The flowchart shown in FIG. 10 is mainly different from the flowchart shown in FIG. 2 in not including Step S15.

First, processing is started. At this time, the system of the electronic device 420 is locked, i.e., in a state where functions that can be executed by a user are limited (including a log-out state and a log-off state).

For Step S11 to Step S14, the description related to FIG. 2 can be referred to and the detailed description thereof is omitted.

Next, in Step S16, the second authentication information is obtained with the use of the sensor portion 403. The second authentication information, which is the image data (the second image data) captured with the use of the sensor portion 403, is output from the sensor portion 403 to the control portion 401.

Figure 11A:
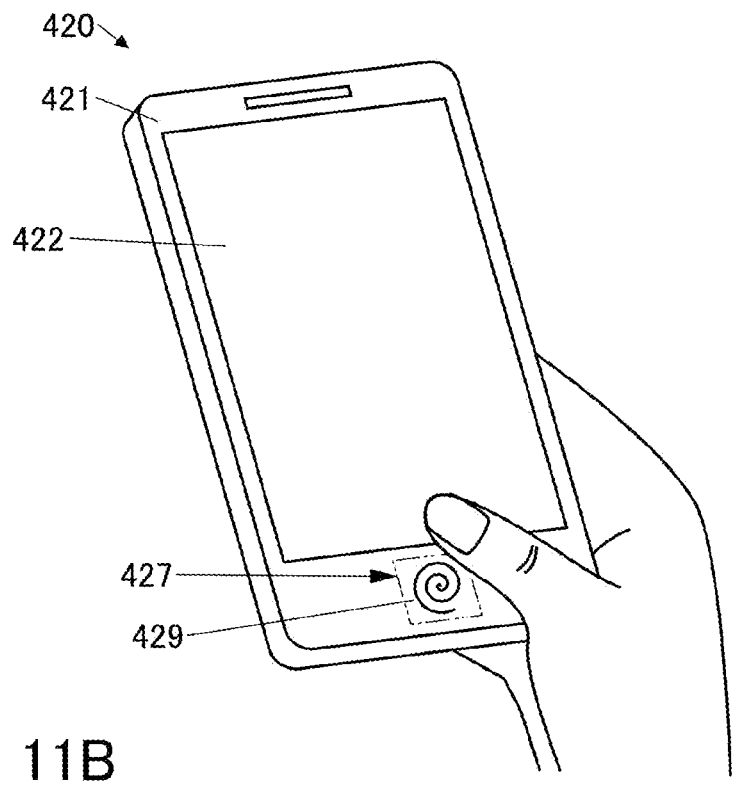
FIG. 11A and FIG. 11B are diagrams illustrating structure examples of an electronic device.

FIG. 11A illustrates capturing of a fingerprint image as the second image data by touching the second region 427 provided outside the pixel portion 422 with the finger 430. A display 429 indicating the position for performing the second authentication may be provided on the second region 427. The display 429 is a display of a graphic symbol, a character, or the like indicating the position to be touched by a user.

Figure 11B:
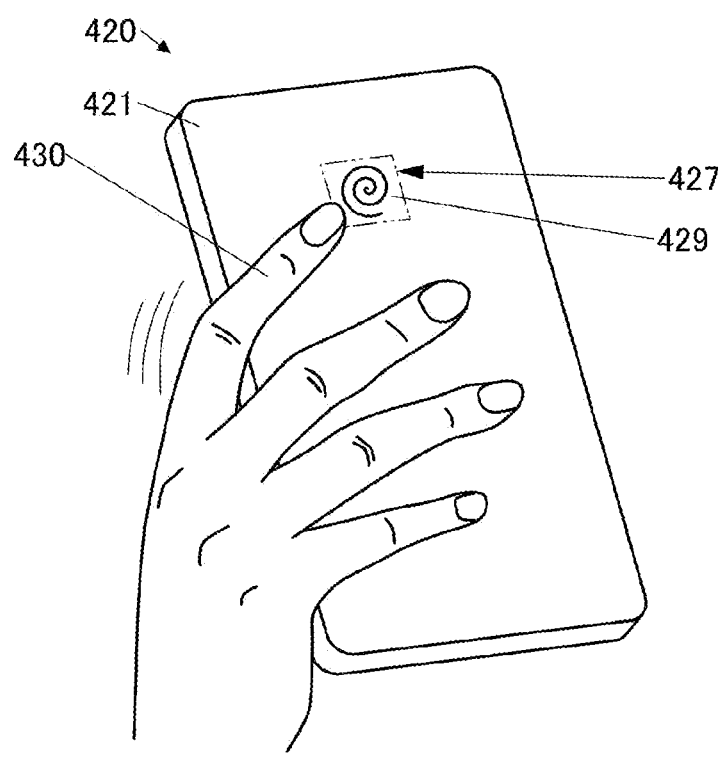

Although FIG. 11A illustrates the structure in which the second region 427 is provided outside the pixel portion 422 on the surface including the pixel portion 422 of the electronic device 420 (the display surface), that is, the structure in which the pixel portion 422 does not include a region overlapping with the second region 427, one embodiment of the present invention is not limited to this structure. As illustrated in FIG. 11B, the second region 427 may be provided on the surface opposite to the pixel portion 422 of the electronic device 420 (the surface opposite to the display surface). In the case where the second region 427 is provided on the surface opposite to the pixel portion 422 of the electronic device 420, the pixel portion 422 may include a region overlapping with the second region 427. Since the second region 427 does not have to be provided outside the pixel portion 422 on the surface including the pixel portion 422 of the electronic device 420 (the display surface), the electronic device 420 can have a narrow bezel.

Although FIG. 11B illustrates the structure in which the second region 427 is provided on the surface opposite to the pixel portion 422, one embodiment of the present invention is not limited to this structure. For example, the second region 427 may be provided on the surface not provided with the pixel portion 422 of the electronic device 420 (e.g., any one or more of a top surface, a bottom surface, and a side surface of the electronic device 420). Furthermore, the pixel portion 422 (the first region 425) may be provided on any one or more of the surface opposite to the display surface of the electronic device 420, the top surface, the bottom surface, and the side surface. With this structure, the first authentication and the second authentication can be performed at any position on the electronic device 420, achieving a highly convenient electronic device.

For subsequent Step S16 to Step S18, the description related to FIG. 2 can be referred to and the detailed description thereof is omitted.

The above is the description of the flowchart shown in FIG. 10.

Display Device Structure Example 2

Figure 12:
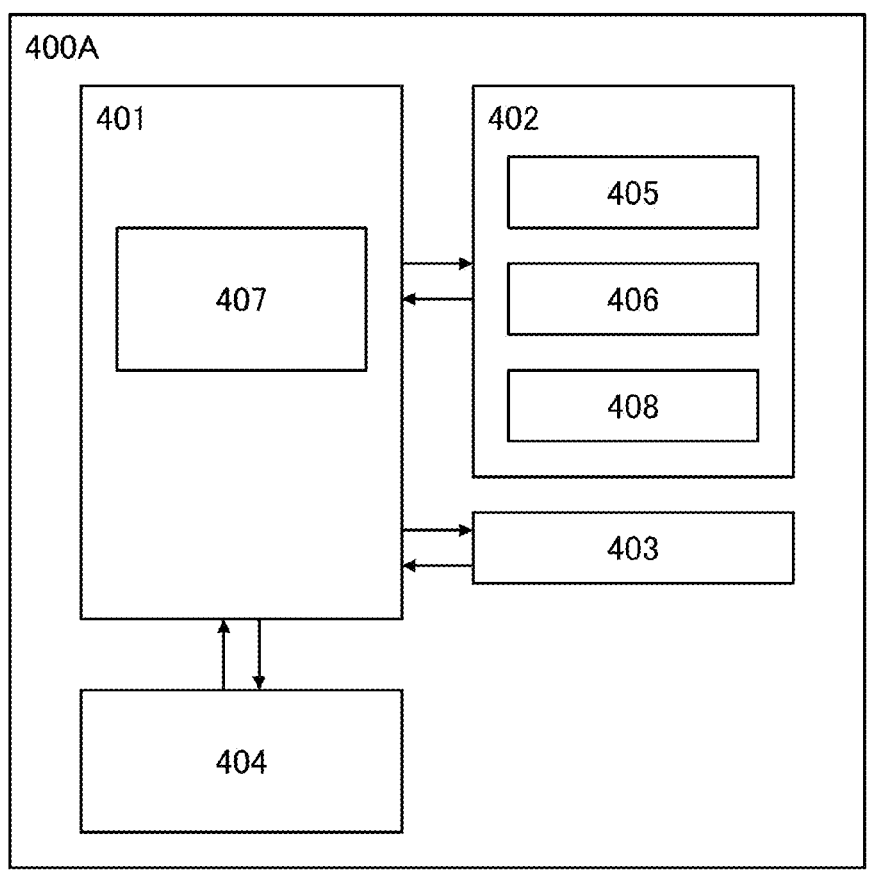
FIG. 12 is a diagram illustrating a structure example of a display device.

A structure example different from that of the above-described display device 400 is described. A block diagram of a display device 400A that is one embodiment of the present invention is shown in FIG. 12. The display device 400A is mainly different from the above-described display device 400 in that the pixel portion 402 includes a touch sensor 408.

The touch sensor 408 has a function of sensing a touch on the pixel portion 402 and a function of obtaining information on the touch position and outputting the information to the control portion 401.

The control portion 401 has a function of processing positional information of a sensing object input from the touch sensor 408. The control portion 401 has a function of generating image data and outputting the image data to the pixel portion 402 so as to make the display element 405 in the touched position on the pixel portion 402 emit light when a touch operation is sensed and information on the touch position is output by the touch sensor 408 in a period when the system of the display device 400A is locked. In addition, the control portion 401 has a function of requesting the pixel portion 402 to execute fingerprint image capturing in the state where the display element 405 emits light.

The control portion 401 may also have a function of generating image data including an image showing a position to be touched by a user (a position image) on the pixel portion 402 and outputting the image data to the pixel portion 402 when the system of the display device 400A is locked. Furthermore, the display portion 402 has a function of obtaining the positional information of a sensing object such as a finger with the use of the touch sensor 408 and outputting the positional information to the control portion 401.

It is preferable that the pixel portion 402 be capable of obtaining fingerprint information of a finger touching any position on the pixel portion 402. That is, the range where the touch sensor 408 functions and the range where fingerprint information can be obtained preferably match or substantially match on the pixel portion 402.

Authentication Method Example 4

Figure 13:
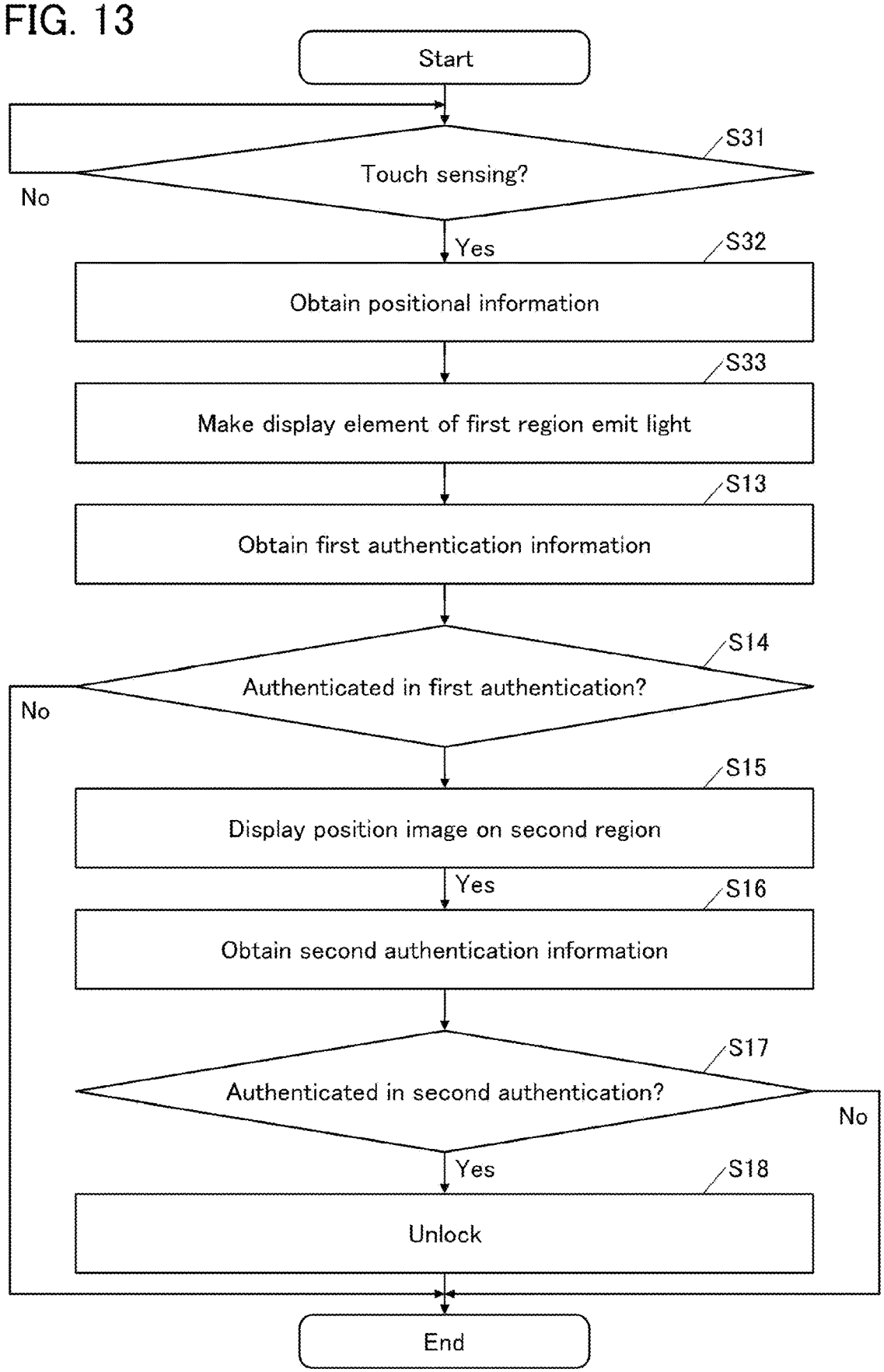
FIG. 13 is a flowchart showing an example of an authentication method.
Figure 14A:
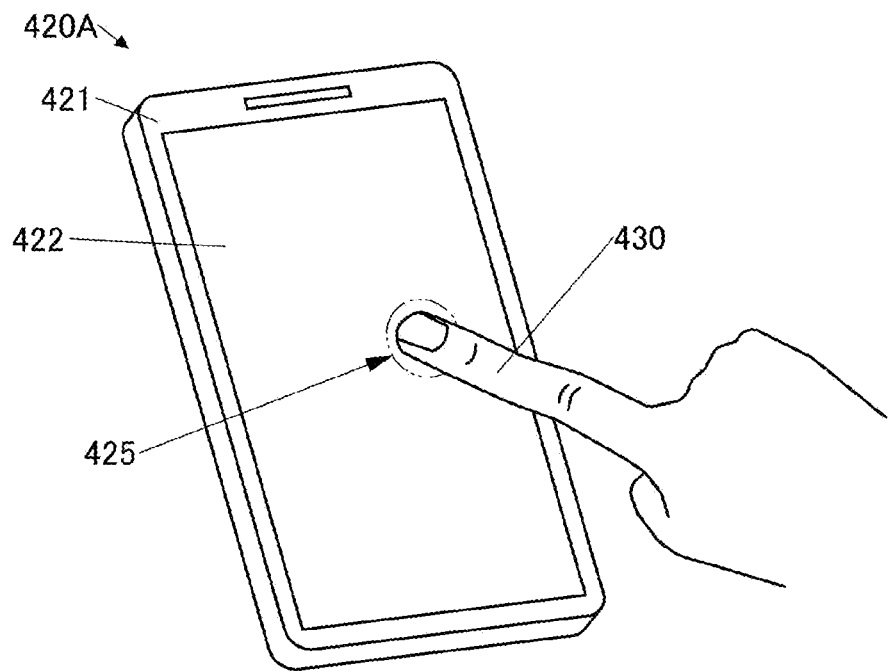
FIG. 14A and FIG. 14B are diagrams illustrating a structure example of an electronic device.

An authentication method example of the above-described display device 400A is described. A flowchart of the operation of the authentication method using the display device 400A is shown in FIG. 13. An electronic device 420A in which the display device 400A is used is illustrated in FIG. 14A. The electronic device 420A includes the housing 421 and the pixel portion 422. The electronic device 420A includes the control portion 401, the sensor portion 403, and the memory portion 404, which are described above, inside the housing 421. The above-described pixel portion 402 can be used as the pixel portion 422.

First, processing is started. At this time, the system of the electronic device 420A is locked.

In Step S31, whether the pixel portion 422 is touched or not is sensed. Touch sensing is executed by the touch sensor 408. When a touch is sensed, the operation proceeds to Step S32. Step S31 is repeatedly executed until a touch is sensed. In the case where a touch is not sensed for a certain period or a different position is touched, the processing ends.

In Step S32, the positional information on the touch position is obtained. The positional information is output from the touch sensor 408 to the control portion 401.

In Step S33, the display elements 405 at and in the vicinity of the touch position are made to emit light in accordance with the positional information. The touch position and the vicinity thereof can be the first region 425. At this time, the control portion 401 generates image data where the first region 425 is bright (has a high gray level) and the other portions are dark (have a low gray level) and outputs the image data to the pixel portion 422, whereby the pixel portion 422 displays an image based on the image data.

In Step S33, the first region 425 may be displayed brightly (with light emission) and the other portions may perform no light emission. Note that the region other than the first region 425 may display an arbitrary image.

The light emission range of the display elements 405 (the first region 425) is preferably a range hidden by a finger. In the case where a finger touches a screen, a contact surface of the finger is positioned inside the outline of the finger that is seen by the user and the projected area of the finger on the screen is larger than the contact area of the finger. Therefore, assuming that the contact area is 100%, the light emission range can be 50% to 150%, preferably 70% to 130%, further preferably 80% to 120%. When the light emission area is smaller than 50%, fingerprint information obtained by image capturing is not enough and thus the accuracy of authentication might be decreased. In contrast, when the light emission area exceeds 150%, a light source might be directly viewed by the user.

A structure may be employed in which the light emission range is a circle of radius r whose center is a touch position and the radius value r can be set in advance. The size or shape of a finger varies depending on the user's age, gender, physique, or the like, so that the user may be capable of setting the radius r of the circle, which defines the light emission range.

Figure 14B:
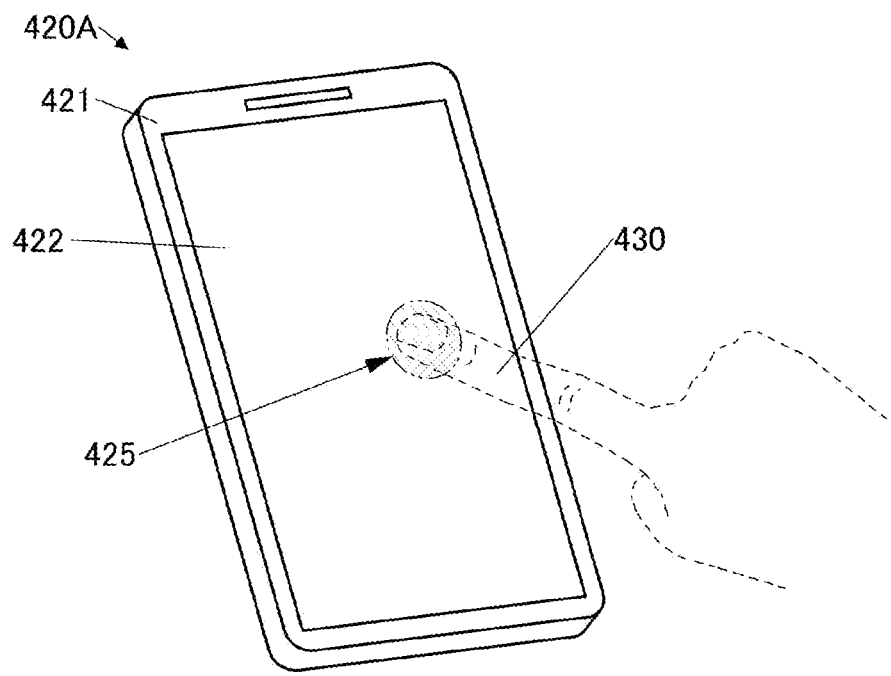

FIG. 14A illustrates light emission from the display elements 405 of the first region 425, where a region in which a touch is sensed by the touch sensor 408 and the vicinity thereof is the first region 425. In FIG. 14B, the finger 430 in FIG. 14A is illustrated transparently with its outline shown with a broken line, and the first region 425 is shown with hatching. As illustrated in FIG. 14A and FIG. 14B, the first region 425 emitting bright light is hidden by the finger 430 and thus is not easily viewed by the user. Therefore, fingerprint authentication can be executed without causing stress to the user. In addition, the electronic device 420A can perform fingerprint authentication at any position in the pixel portion 422.

For subsequent Step S14 to Step S18, the description related to FIG. 2 can be referred to and the detailed description thereof is omitted.

The above is the description of the flowchart shown in FIG. 13.

Electronic Device Structure Example

FIG. 15A to FIG. 16D show schematic views of the electronic device 420. FIG. 15A to FIG. 16D are cross-sectional views taken along dashed-dotted line A-B in FIG. 3A. In FIG. 15A to FIG. 16D, the first region 425 and the second region 427 are indicated by arrows.

The electronic device 420 includes a housing 421, a layer 441, and a layer 443. The layer 441 includes the pixel portion 422. The layer 443 includes the sensor portion 403. The control portion 401 and the memory portion 404 can be provided in space 445 inside the housing 421. Note that the control portion 401 and the memory portion 404 may be provided in the layer 441 or the layer 443. Although not illustrated, an electronic part such as a communication antenna or a storage battery can be provided in the space 445.

Figure 15A:
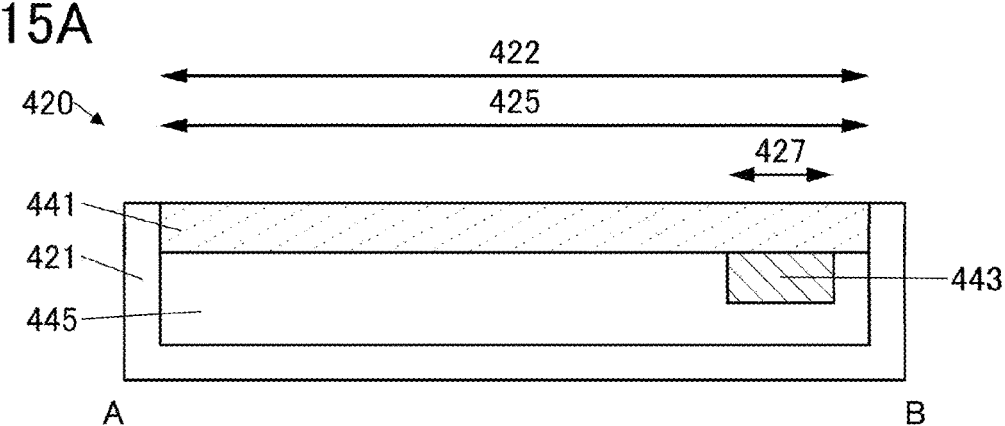
FIG. 15A to FIG. 15D are diagrams illustrating structure examples of an electronic device.

FIG. 15A illustrates an example in which the first region 425 is provided on the entire surface of the pixel portion 422 and the second region 427 is provided on part of the pixel portion 422. That is, the first region 425 and the second region 427 include an overlap region. In the structure illustrated in FIG. 15A, the first authentication information can be obtained at any position in the pixel portion 422.

Figure 15B:
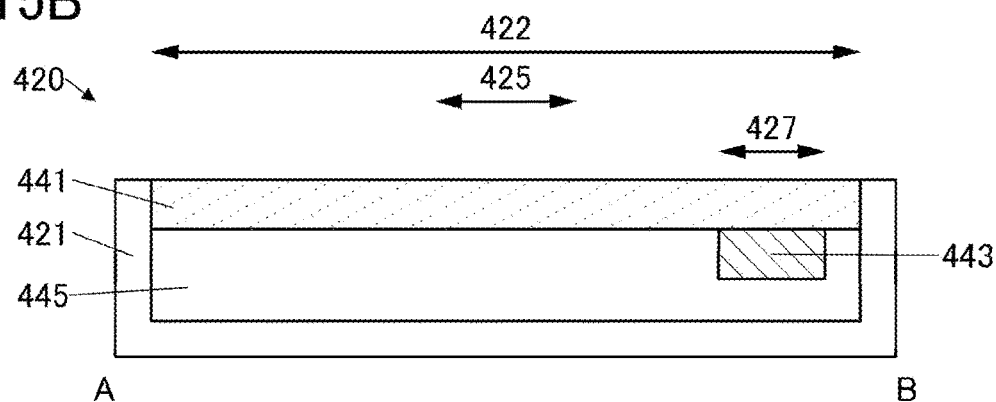
Figure 15C:
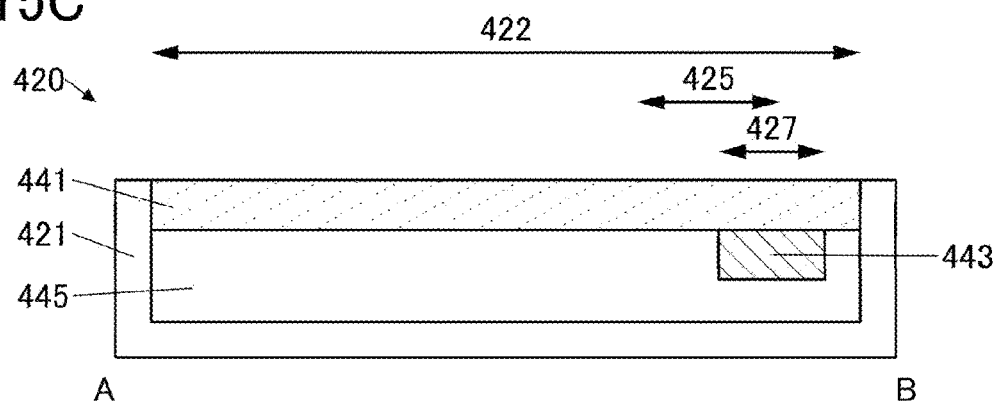

FIG. 15B illustrates an example in which the first region 425 is provided on part of the pixel portion 422 and the second region 427 is provided on part of the pixel portion 422. The structure in which the first region 425 is provided on part of the pixel portion 422 can reduce the power consumption of the electronic device 420 because not all the display elements 405 emit light. Although the structure in which the first region 425 and the second region 427 do not include an overlap region is illustrated in FIG. 15B, the first region 425 and the second region 427 may include an overlap region as illustrated in FIG. 15C.

Figure 15D:
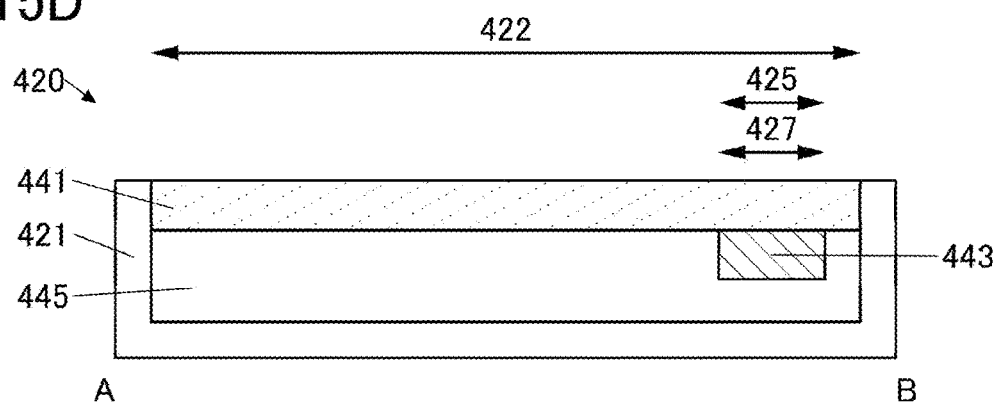

FIG. 15D illustrates an example in which the first region 425 and the second region 427 are in the same position. When the first region 425 and the second region 427 are in the same position, a user can obtain both the first authentication information and the second authentication information while touching the pixel portion 422 with a finger; thus, the operability of the electronic device 420 can be increased.

FIG. 15A to FIG. 15D illustrate the structures in which the second region 427 is provided in the pixel portion 422 and the second authentication information is obtained within the pixel portion 422. The layer 443 including the sensor portion 403 is preferably fixed to the layer 441 including the pixel portion 422. For example, the layer 443 is fixed to the layer 441 with an adhesive layer (not illustrated). It is preferable that space not be provided between the layer 443 and the layer 441. In the case where a fingerprint sensor using ultrasonic waves is used in the sensor portion 403, the structure without space (air) between the layer 443 and the layer 441 can inhibit ultrasonic attenuation by air and enables the second authentication information to be obtained with high sensitivity.

Figure 16A:
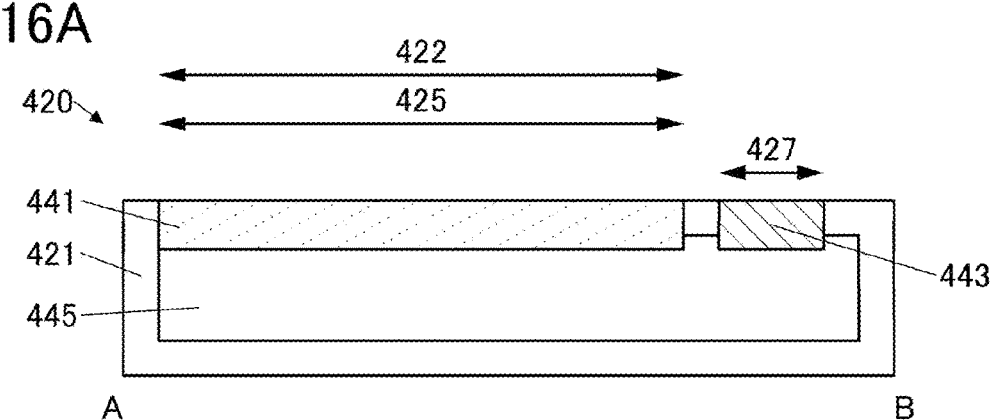
FIG. 16A to FIG. 16D are diagrams illustrating structure examples of an electronic device.
Figure 16B:
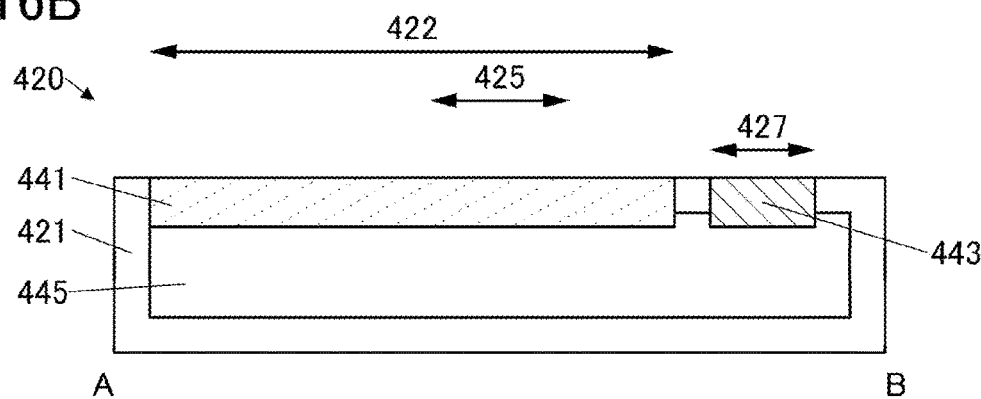

FIG. 16A illustrates an example in which the first region 425 is provided on the entire surface of the pixel portion 422 and the second region 427 is provided outside the pixel portion 422. As illustrated in FIG. 16B, the first region 425 may be provided on part of the pixel portion 422. FIG. 16A and FIG. 16B illustrate structures in which the first region 425 and the second region 427 do not include an overlap region and the obtainment of the first authentication information and the second authentication information is performed on the same surface as that of the pixel portion 422 of the electronic device 420 (display surface).

Although the structure examples in which the layer 443 is exposed are illustrated in FIG. 16A and FIG. 16B, one embodiment of the present invention is not limited to these structures. The layer 443 may be provided inside the housing 421. In the case where the layer 443 is provided inside the housing 421, the layer 443 is preferably fixed to the housing 421. The layer 443 is fixed to the housing 421 with an adhesive layer (not illustrated). It is preferable that space not be provided between the layer 443 and the housing 421. In the case where a fingerprint sensor using ultrasonic waves is used in the sensor portion 403, the structure without space (air) between the layer 443 and the housing 421 can inhibit ultrasonic attenuation by air and enables the second authentication information to be obtained with high sensitivity.

Figure 16C:
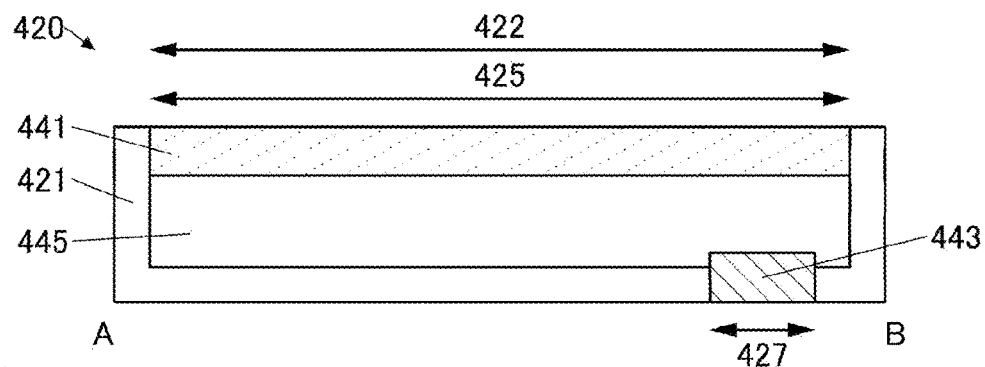
Figure 16D:
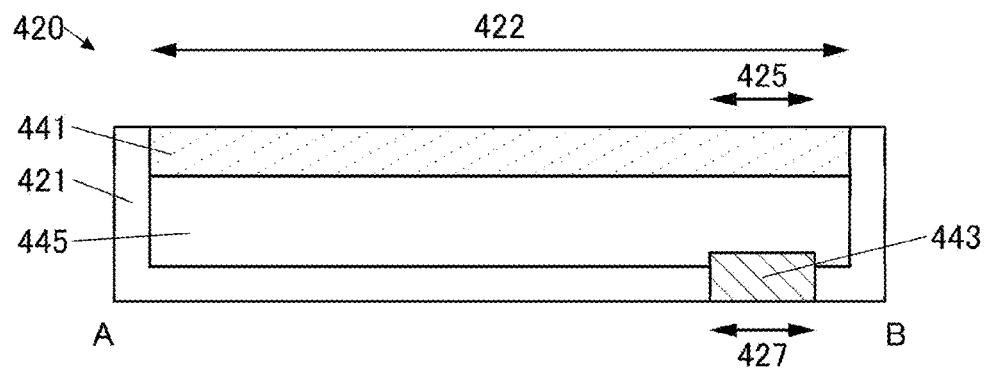

FIG. 16C illustrates an example in which the first region 425 is provided on the entire surface of the pixel portion 422 and the second region 427 is provided on the surface opposite to the pixel portion 422 of the electronic device 420 (the surface opposite to the display surface). As illustrated in FIG. 16D, the first region 425 may be provided on part of the pixel portion 422. FIG. 16C and FIG. 16D illustrate structures in which the obtainment of the first authentication information is performed on the same surface as that of the pixel portion 422 of the electronic device 420 (the display surface) and the obtainment of the second authentication information is performed on the surface opposite to the pixel portion 422 (the surface opposite to the display surface).

In the case where the structures illustrated in FIG. 16C and FIG. 16D are employed, space (air) may be provided between the layer 443 and the layer 441. Although the structure examples in which the layer 443 is exposed are illustrated in FIG. 16C and FIG. 16D, one embodiment of the present invention is not limited to these structures. The layer 443 may be provided inside the housing 421. In the case where the layer 443 is provided inside the housing 421, the layer 443 is preferably fixed to the housing 421. The layer 443 is fixed to the housing 421 with an adhesive layer (not illustrated). It is preferable that space not be provided between the layer 443 and the housing 421.

The above is the description of the structure examples of the electronic device.

Note that an authentication method, a processing method, an operation method, a driving method, a display method, or the like that is executed by the electronic device of one embodiment of the present invention might be described as a program, for example. For example, a program in which the authentication method, processing method, operation method, driving method, display method, or the like that is described above as an example and executed by the electronic device 420 and the like is written can be stored in a non-transitory storage medium and can be read and executed by an arithmetic device or the like included in the control portion 401 of the electronic device 420. Accordingly, a program that makes hardware execute the authentication method, operation method, or the like that is described above as an example and a non-transitory storage medium storing the program are embodiments of the present invention.

At least part of the structure examples, the drawings corresponding thereto, and the like shown in this embodiment as an example can be combined with the other structure examples, the other drawings, and the like as appropriate.

At least part of this embodiment can be implemented in combination with the other embodiments described in this specification as appropriate.

Embodiment 2

In this embodiment, display devices of embodiments of the present invention will be described.

A pixel portion included in the display device of one embodiment of the present invention includes a light-emitting element and a light-emitting and light-receiving element.

The light-emitting and light-receiving element can be manufactured by combining an organic EL element and an organic photodiode, which are respectively a light-emitting element and a light-receiving element. For example, by adding an active layer of an organic photodiode to a layered structure of an organic EL element, the light-emitting and light-receiving element can be manufactured. Furthermore, in the light-emitting and light-receiving element formed of a combination of an organic EL element and an organic photodiode, concurrently depositing layers that can be shared with the organic EL element can inhibit an increase in the number of deposition steps.

For example, one of a pair of electrodes (a common electrode) can be a layer shared by the light-emitting and light-receiving element and the light-emitting element. For example, at least one of a hole-injection layer, a hole-transport layer, an electron-transport layer, and an electron-injection layer is preferably a layer shared by the light-emitting and light-receiving element and the light-emitting element. As another example, the light-emitting and light-receiving element and the light-emitting element can have the same structure except for the presence or absence of an active layer of the light-receiving element. That is, the light-emitting and light-receiving element can be manufactured by only adding the active layer of the light-receiving element to the light-emitting element. When the light-emitting and light-receiving element and the light-emitting element include common layers in such a manner, the number of deposition steps and the number of masks can be reduced, thereby reducing the number of manufacturing steps and the manufacturing cost of the display device. Furthermore, the display device including the light-emitting and light-receiving element can be manufactured using an existing manufacturing device and an existing manufacturing method for the display device.

Note that a layer included in the light-emitting and light-receiving element may have a different function between the case where the light-emitting and light-receiving element function as a light-receiving element and the case where the light-emitting and light-receiving element function as a light-emitting element. In this specification, the name of a component is based on its function in the case where the light-emitting and light-receiving element functions as a light-emitting element. For example, a hole-injection layer functions as a hole-injection layer in the case where the light-emitting and light-receiving element functions as a light-emitting element, and functions as a hole-transport layer in the case where the light-emitting and light-receiving element functions as a light-receiving element. Similarly, an electron-injection layer functions as an electron-injection layer in the case where the light-emitting and light-receiving element functions as a light-emitting element, and functions as an electron-transport layer in the case where the light-emitting and light-receiving element functions as a light-receiving element.

As described above, the display device of this embodiment includes light-emitting and light-receiving elements and light-emitting elements in its pixel portion. Specifically, light-emitting and light-receiving elements and light-emitting elements are arranged in a matrix in the pixel portion. Accordingly, the pixel portion has one or both of an image capturing function and a sensing function in addition to a function of displaying an image.

The pixel portion can be used as an image sensor, a touch sensor, or the like. That is, by sensing light with the pixel portion, an image can be captured or an approach or touch of an object (e.g., a finger or a stylus) can be detected. Furthermore, in the display device of this embodiment, the light-emitting elements can be used as a light source for the sensor. Accordingly, a light-receiving portion and a light source do not need to be provided separately from the display device; hence, the number of components of an electronic device can be reduced.

In the display device of this embodiment, when an object reflects light emitted from the light-emitting element included in the pixel portion, the light-emitting and light-receiving element can detect the reflected light; thus, image capturing, touch (contact or approach) detection, or the like is possible even in a dark place.

The display device of this embodiment has a function of displaying images with the use of the light-emitting elements and the light-emitting and light-receiving elements. That is, the light-emitting elements and the light-emitting and light-receiving elements function as display elements.

As the light-emitting element, an EL element such as an OLED (Organic Light Emitting Diode) or a QLED (Quantum-dot Light Emitting Diode) is preferably used. Examples of a light-emitting substance contained in the EL element include a substance exhibiting fluorescence (a fluorescent material), a substance exhibiting phosphorescence (a phosphorescent material), an inorganic compound (such as a quantum dot material), and a substance exhibiting thermally activated delayed fluorescence (TADF (Thermally Activated Delayed Fluorescence) material). Alternatively, an LED such as a micro-LED (Light Emitting Diode) can be used as the light-emitting element.

The display device of this embodiment has a function of detecting light with the use of the light-emitting and light-receiving elements. The light-emitting and light-receiving element can detect light having a shorter wavelength than light emitted by the light-emitting and light-receiving element itself.

When the light-emitting and light-receiving element is used as an image sensor, the display device of this embodiment can capture an image using the light-emitting and light-receiving element. For example, the display device of this embodiment can be used as a scanner.

For example, data on a fingerprint, a palm print, or the like can be obtained with the use of the image sensor. That is, a biological authentication sensor can be incorporated in the display device of this embodiment. When the display device incorporates a biological authentication sensor, the number of components of an electronic device can be reduced as compared to the case where a biological authentication sensor is provided separately from the display device; thus, the size and weight of the electronic device can be reduced.

Data on facial expression, eye movement, change of the pupil diameter, or the like of a user can be obtained with the use of the image sensor. By analysis of the data, information on the user's physical and mental state can be obtained. Changing the output contents of one or both of display and sound on the basis of the information allows the user to safely use a device for VR (Virtual Reality), a device for AR (Augmented Reality), or a device for MR (Mixed Reality), for example.

When the light-emitting and light-receiving element is used as a touch sensor, the display device of this embodiment can detect the approach or contact of an object with the use of the light-emitting and light-receiving element.

The light-emitting and light-receiving element functions as a photoelectric conversion element that detects light entering the light-emitting and light-receiving element and generates electric charge. The amount of generated electric charge depends on the amount of incident light.

The light-emitting and light-receiving element can be manufactured by adding an active layer of the light-receiving element to the above-described structure of the light-emitting element.

For the light-emitting and light-receiving element, an active layer of a pn photodiode or a pin photodiode can be used, for example.

It is particularly preferable to use, for the light-emitting and light-receiving element, an active layer of an organic photodiode including a layer containing an organic compound. An organic photodiode, which is easily made thin, lightweight, and large in area and has a high degree of freedom for shape and design, can be used in a variety of display devices.

FIG. 17A to FIG. 17D are cross-sectional views of display devices of embodiments of the present invention.

Figure 17A:
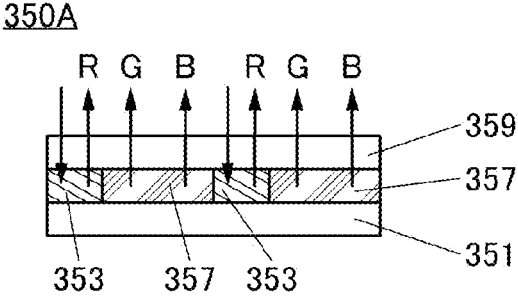
FIG. 17A to FIG. 17D are cross-sectional views illustrating examples of display devices.

A display device 350A illustrated in FIG. 17A includes, between a substrate 351 and a substrate 359, a layer 353 including a light-emitting and light-receiving element and a layer 357 including light-emitting elements.

Figure 17B:
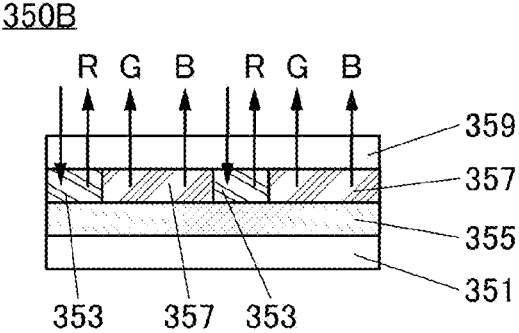

A display device 350B illustrated in FIG. 17B includes, between the substrate 351 and the substrate 359, the layer 353 including a light-emitting and light-receiving element, a layer 355 including transistors, and the layer 357 including light-emitting elements.

In the display device 350A and the display device 350B, green (G) light and blue (B) light are emitted from the layer 357 including light-emitting elements, and red (R) light is emitted from the layer 353 including a light-emitting and light-receiving element. In the display device of one embodiment of the present invention, the color of light emitted from the layer 353 including a light-emitting and light-receiving element is not limited to red.

The light-emitting and light-receiving element included in the layer 353 including the light-emitting and light-receiving element can detect light that enters from the outside of the display device 350A or the display device 350B. The light-emitting and light-receiving element can detect one or both of green (G) light and blue (B) light, for example.

The display device of one embodiment of the present invention includes a plurality of pixels arranged in a matrix. One pixel includes one or more subpixels. One subpixel includes one light-emitting and light-receiving element or one light-emitting element. For example, the pixel can have a structure including three subpixels (e.g., three colors of R, G, and B or three colors of yellow (Y), cyan (C), and magenta (M)) or four subpixels (e.g., four colors of R, G, B, and white (W) or four colors of R, G, B, and Y). The subpixel of at least one color includes a light-emitting and light-receiving element. The light-emitting and light-receiving element may be provided in all the pixels or may be provided in some of the pixels. In addition, one pixel may include a plurality of light-emitting and light-receiving elements.

The layer 355 including transistors includes a transistor electrically connected to the light-emitting and light-receiving element and a transistor electrically connected to the light-emitting element, for example. The layer 355 including transistors may also include a wiring, an electrode, a terminal, a capacitor, a resistor, or the like.

Figure 17C:
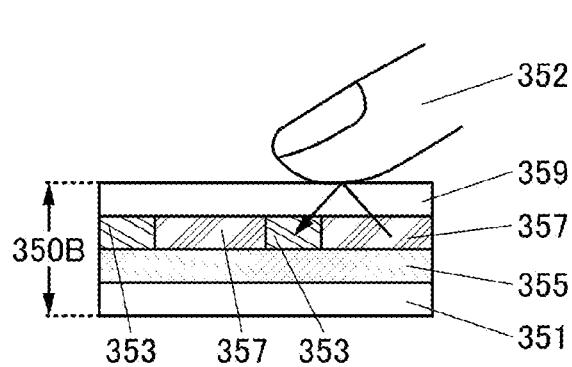
Figure 17D:
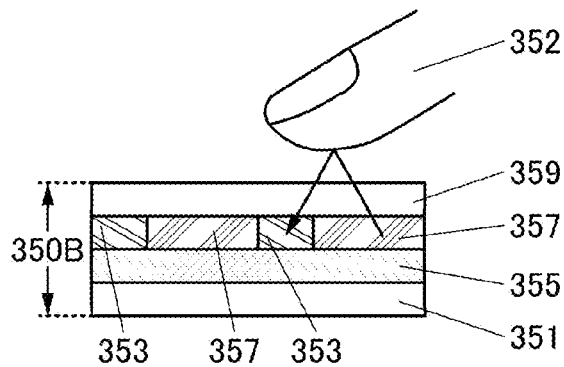

The display device of one embodiment of the present invention may have a function of detecting an object such as a finger that is touching the display device (FIG. 17C). Alternatively, the display device of one embodiment of the present invention may have a function of detecting an object that is approaching (but is not touching) the display device (FIG. 17D). For example, light emitted from the light-emitting element in the layer 357 including light-emitting elements is reflected by a finger 352 that touches or approaches the display device 350B as illustrated in FIG. 17C and FIG. 17D; then, the light-emitting and light-receiving element in the layer 353 including the light-emitting and light-receiving element detects the reflected light. Thus, the touch or approach of the finger 352 on/to the display device 350B can be detected.

<Pixel>

FIG. 17E to FIG. 17G and FIG. 18A to FIG. 18D illustrate examples of pixels. Note that the arrangement of subpixels is not limited to the illustrated order. For example, the positions of a subpixel 311B and a subpixel 311G may be reversed.

Figure 17E:
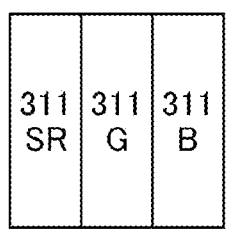
FIG. 17E to FIG. 17G are top views illustrating pixel examples.

A pixel illustrated in FIG. 17E employs stripe arrangement. The pixel includes a subpixel 311SR that emits red light and has a light-receiving function, a subpixel 311G that emits green light, and a subpixel 311B that emits blue light. By using a light-emitting and light-receiving element instead of a light-emitting element in the R subpixel, a display device including a pixel composed of three subpixels of R, G, and B can have a light-receiving function in the pixel.

Figure 17F:
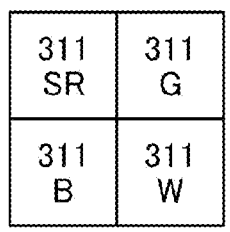

A pixel illustrated in FIG. 17F employs matrix arrangement. The pixel includes the subpixel 311SR that emits red light and has a light-receiving function, the subpixel 311G that emits green light, the subpixel 311B that emits blue light, and a subpixel 311W that emits white light. By using a light-emitting and light-receiving element instead of a light-emitting element in the R subpixel, a display device including a pixel composed of four subpixels of R, G, B, and W can also have a light-receiving function in the pixel.

Figure 17G:
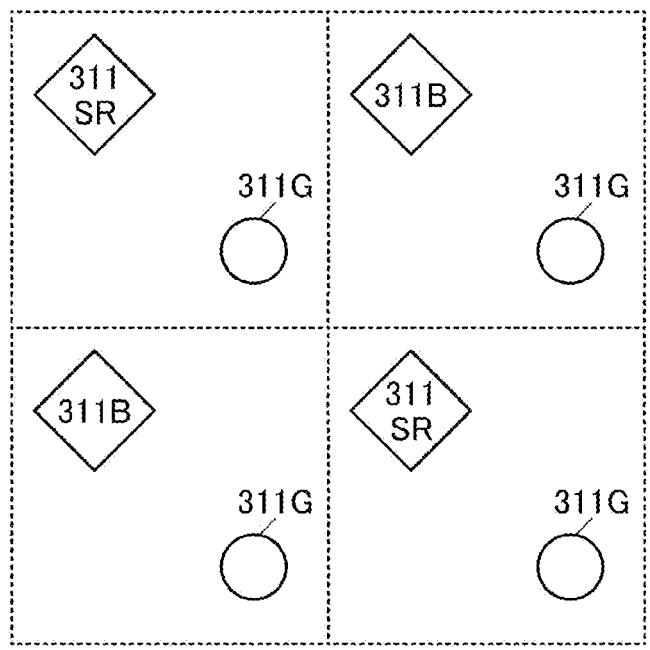

Pixels illustrated in FIG. 17G employ PenTile arrangement. In FIG. 17G, the pixels each include subpixels emitting light of two colors that differ among the pixels. The upper left pixel and the lower right pixel in FIG. 17G each include the subpixel 311SR that emits red light and has a light-receiving function and the subpixel 311G that emits green light. The lower left pixel and the upper right pixel in FIG. 17G each include the subpixel 311G that emits green light and the subpixel 311B that emits blue light. Note that the shape of the subpixels illustrated in FIG. 17G indicates a top surface shape of the light-emitting element or the light-emitting and light-receiving element included in the subpixels.

Figure 18A:
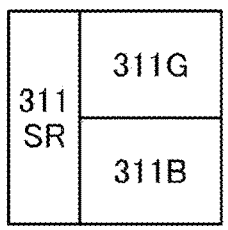
FIG. 18A to FIG. 18D are top views illustrating pixel examples.

A pixel illustrated in FIG. 18A includes the subpixel 311SR that emits red light and has a light-receiving function, the subpixel 311G that emits green light, and the subpixel 311B that emits blue light. The subpixel 311SR is provided in a column different from a column where the subpixel 311G and the subpixel 311B are positioned. The subpixel 311G and the subpixel 311B are alternately arranged in the same column; one is provided in an odd-numbered row and the other is provided in an even-numbered row. Note that the color of the subpixel positioned in a column different from the column where the subpixels of the other colors are positioned is not limited to red (R) and may alternatively be green (G) or blue (B).

Figure 18B:
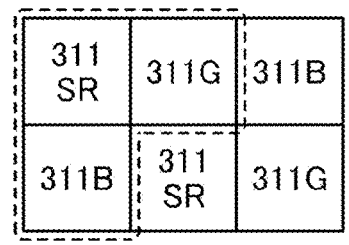

FIG. 18B illustrates two pixels, and one pixel is composed of three subpixels surrounded by dotted lines. The pixel illustrated in FIG. 18B includes the subpixel 311SR that emits red light and has a light-receiving function, the subpixel 311G that emits green light, and the subpixel 311B that emits blue light. In the pixel on the left in FIG. 18B, the subpixel 311G is positioned in the same row as the subpixel 311SR, and the subpixel 311B is positioned in the same column as the subpixel 311SR. In the pixel on the right in FIG. 18B, the subpixel 311G is positioned in the same row as the subpixel 311SR, and the subpixel 311B is positioned in the same column as the subpixel 311G. In the pixel layout illustrated in FIG. 18B, the subpixel 311SR, the subpixel 311G, and the subpixel 311B are repeatedly arranged in both the odd-numbered row and the even-numbered row. In addition, subpixels of different colors are arranged in the odd-numbered row and the even-numbered row in every column.

Figure 18C:
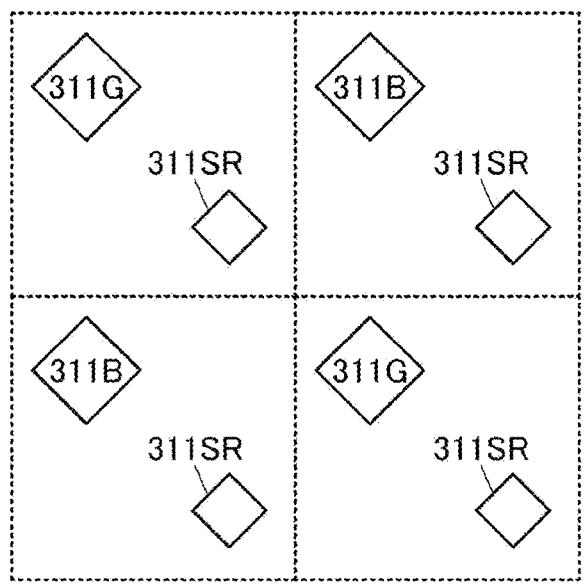

FIG. 18C is a modification example of the pixel arrangement of FIG. 17G. The upper left pixel and the lower right pixel in FIG. 18C each include the subpixel 311SR that emits red light and has a light-receiving function and the subpixel 311G that emits green light. The lower left pixel and the upper right pixel in FIG. 18C each include the subpixel 311SR that emits red light and has a light-receiving function and the subpixel 311B that emits blue light.

In FIG. 17G, the subpixel 311G that emits green light is provided in each pixel. Meanwhile, in FIG. 18C, the subpixel 311SR that emits red light and has a light-receiving function is provided in each pixel. The structure illustrated in FIG. 18C achieves higher-resolution image capturing than the structure illustrated in FIG. 17G because the subpixel having a light-receiving function is provided in each pixel. Thus, the accuracy of biometric authentication can be increased, for example.

The top surface shape of the light-emitting elements and the light-emitting and light-receiving elements is not particularly limited and can be a circular shape, an elliptical shape, a polygonal shape, a polygonal shape with rounded corners, or the like. The top surface shape of the light-emitting elements included in the subpixels 311G is circular in the example in FIG. 17G and square in the example in FIG. 18C. The top surface shape of the light-emitting elements and the light-emitting and light-receiving elements may vary depending on the color thereof, or the light-emitting elements and the light-emitting and light-receiving elements of some colors or every color may have the same top surface shape.

The aperture ratio of subpixels may vary depending on the color thereof, or may be the same among the subpixels of some colors or all colors. For example, the aperture ratio of a subpixel provided in each pixel (the subpixel 311G in FIG. 17G, and the subpixel 311SR in FIG. 18C) may be made lower than that of a subpixel of another color.

Figure 18D:
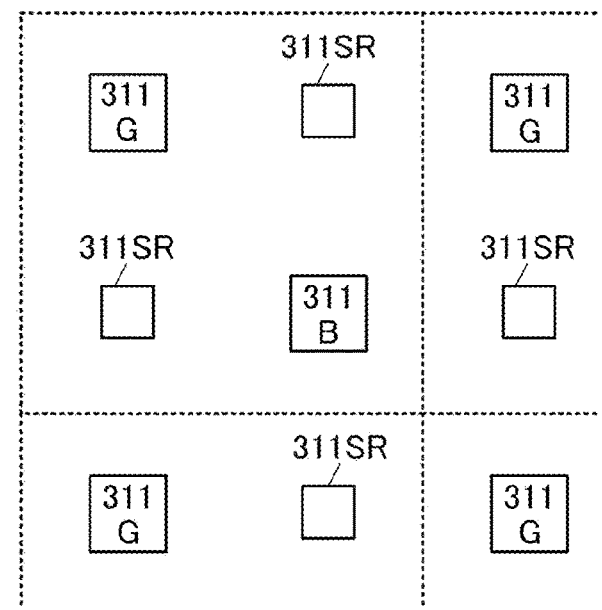

FIG. 18D is a modification example of the pixel arrangement of FIG. 18C. Specifically, the structure of FIG. 18D is obtained by rotating the structure of FIG. 18C by 45°. Although one pixel is regarded as being composed of two subpixels in FIG. 18C, one pixel can be regarded as being composed of four subpixels as illustrated in FIG. 18D.

In the description with reference to FIG. 18D, one pixel is regarded as being composed of four subpixels surrounded by dotted lines. One pixel includes two subpixels 311SR, one subpixel 311G, and one subpixel 311B. The pixel including a plurality of subpixels having a light-receiving function allows high-resolution image capturing. Accordingly, the accuracy of biometric authentication can be increased. For example, the resolution of image capturing can be the square root of 2 times the resolution of display.

A display device that employs the structure illustrated in FIG. 18C or FIG. 18D includes p first light-emitting elements (p is an integer greater than or equal to 2), q second light-emitting elements (q is an integer greater than or equal to 2), and r light-emitting and light-receiving elements (r is an integer greater than p and greater than q). As for p and r, r=2p is satisfied. As for p, q, and r, r=p+q is satisfied. Either the first light-emitting elements or the second light-emitting elements emit green light, and the other light-emitting elements emit blue light. The light-emitting and light-receiving elements emit red light and have a light-receiving function.

In the case where touch detection is performed with the light-emitting and light-receiving elements, for example, it is preferable that light emitted from a light source be not easily viewed by a user. Since blue light has low visibility than green light, light-emitting elements that emit blue light are preferably used as a light source. Accordingly, the light-emitting and light-receiving elements preferably have a function of receiving blue light and converting it into an electric signal.

As described above, the display device of one embodiment of the present invention can employ pixels with a variety of arrangements.

The pixel arrangement in the display device of this embodiment need not be changed when a light-receiving function is incorporated into pixels; thus, the pixel portion can be provided with one or both of an image capturing function and a sensing function without a reduction in the aperture ratio or resolution.

<Light-Emitting and Light-Receiving Element>

FIG. 19A to FIG. 19E illustrate examples of layered structures of light-emitting and light-receiving elements.

The light-emitting and light-receiving element includes at least an active layer and a light-emitting layer between a pair of electrodes.

In addition to the active layer and the light-emitting layer, the light-emitting and light-receiving element may further include a layer containing a substance with a high hole-injection property, a substance with a high hole-transport property, a substance with a high hole-blocking property, a substance with a high electron-transport property, a substance with a high electron-injection property, a substance with a high electron-blocking property, a substance with a bipolar property (a substance with high electron- and hole-transport properties), or the like.

The light-emitting and light-receiving elements illustrated in FIG. 19A to FIG. 19C each include a first electrode 180, a hole-injection layer 181, a hole-transport layer 182, an active layer 183, a light-emitting layer 193, an electron-transport layer 184, an electron-injection layer 185, and a second electrode 189.

Note that each of the light-emitting and light-receiving elements illustrated in FIG. 19A to FIG. 19C can be regarded as having a structure where the active layer 183 is added to a light-emitting element. Therefore, the light-emitting and light-receiving element can be formed concurrently with the formation of the light-emitting element only by adding a step of depositing the active layer 183 in the manufacturing process of the light-emitting element. The light-emitting element and the light-emitting and light-receiving element can be formed over one substrate. Thus, the pixel portion can be provided with one or both of an image capturing function and a sensing function without a significant increase in the number of manufacturing steps.

The stacking order of the light-emitting layer 193 and the active layer 183 is not limited. FIG. 19A illustrates an example in which the active layer 183 is provided over the hole-transport layer 182 and the light-emitting layer 193 is provided over the active layer 183. FIG. 19B illustrates an example in which the light-emitting layer 193 is provided over the hole-transport layer 182 and the active layer 183 is provided over the light-emitting layer 193. The active layer 183 and the light-emitting layer 193 may be in contact with each other as illustrated in FIG. 19A and FIG. 19B.

As illustrated in FIG. 19C, a buffer layer is preferably provided between the active layer 183 and the light-emitting layer 193. As the buffer layer, at least one layer of a hole-injection layer, a hole-transport layer, an electron-transport layer, an electron-injection layer, a hole-blocking layer, an electron-blocking layer, and the like can be used. FIG. 19C illustrates an example in which the hole-transport layer 182 is used as the buffer layer.

The buffer layer provided between the active layer 183 and the light-emitting layer 193 can inhibit transfer of excitation energy from the light-emitting layer 193 to the active layer 183. Furthermore, the buffer layer can also be used to adjust the optical path length (cavity length) of the microcavity structure. Thus, high emission efficiency can be obtained from the light-emitting and light-receiving element including the buffer layer between the active layer 183 and the light-emitting layer 193.

The light-emitting and light-receiving element illustrated in FIG. 19D is different from the light-emitting and light-receiving elements illustrated in FIG. 19A and FIG. 19C in not including the hole-transport layer 182. The light-emitting and light-receiving element may exclude at least one of the hole-injection layer 181, the hole-transport layer 182, the electron-transport layer 184, and the electron-injection layer 185. Furthermore, the light-emitting and light-receiving element may include another functional layer such as a hole-blocking layer or an electron-blocking layer.

The light-emitting and light-receiving element illustrated in FIG. 19E is different from the light-emitting and light-receiving elements illustrated in FIG. 19A to FIG. 19C in including a layer 186 serving as both a light-emitting layer and an active layer instead of including the active layer 183 and the light-emitting layer 193.

As the layer 186 serving as both a light-emitting layer and an active layer, it is possible to use, for example, a layer containing three materials which are an n-type semiconductor that can be used for the active layer 183, a p-type semiconductor that can be used for the active layer 183, and a light-emitting substance that can be used for the light-emitting layer 193.

Note that an absorption band on the lowest energy side of an absorption spectrum of a mixed material of the n-type semiconductor and the p-type semiconductor and a maximum peak of an emission spectrum (PL spectrum) of the light-emitting substance preferably do not overlap each other and are further preferably positioned fully apart from each other.

In the light-emitting and light-receiving element, a conductive film that transmits visible light is used as the electrode through which light is extracted. A conductive film that reflects visible light is preferably used as the electrode through which light is not extracted.

When the light-emitting and light-receiving element is driven as a light-emitting element, the hole-injection layer serves as a layer that injects holes from the anode to the light-emitting and light-receiving element. The hole-injection layer is a layer containing a material with a high hole-injection property. As the material with a high hole-injection property, it is possible to use a composite material containing a hole-transport material and an acceptor material (electron-accepting material), an aromatic amine compound, or the like.

When the light-emitting and light-receiving element is driven as a light-emitting element, the hole-transport layer serves as a layer that transports holes injected from the anode by the hole-injection layer, to the light-emitting layer. When the light-emitting and light-receiving element is driven as a light-receiving element, the hole-transport layer serves as a layer that transports holes generated in the active layer on the basis of incident light, to the anode. The hole-transport layer is a layer containing a hole-transport material. As the hole-transport material, a substance having a hole mobility greater than or equal to $1\times10^{-6}$ cm$^2$/Vs is preferable. Note that other substances can also be used as long as they have a property of transporting more holes than electrons. As the hole-transport material, a material having a high hole-transport property, such as a π-electron-rich heteroaromatic compound (e.g., a carbazole derivative, a thiophene derivative, and a furan derivative) or an aromatic amine (a compound having an aromatic amine skeleton), is preferable.

When the light-emitting and light-receiving element is driven as a light-emitting element, the electron-transport layer serves as a layer that transports electrons injected from the cathode by the electron-injection layer, to the light-emitting layer. When the light-emitting and light-receiving element is driven as a light-receiving element, the electron-transport layer serves as a layer that transports electrons generated in the active layer on the basis of incident light, to the cathode. The electron-transport layer is a layer containing an electron-transport material. As the electron-transport material, a substance with an electron mobility greater than or equal to $1\times10^{-6}$ cm$^2$/Vs is preferable. Note that other substances can also be used as long as they have a property of transporting more electrons than holes. As the electron-transport material, it is possible to use a material having a high electron-transport property, such as a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, or a π-electron deficient heteroaromatic compound such as a nitrogen-containing heteroaromatic compound.

When the light-emitting and light-receiving element is driven as a light-emitting element, the electron-injection layer serves as a layer that injects electrons from the cathode to the light-emitting and light-receiving element. The electron-injection layer is a layer containing a material with a high electron-injection property. As the material with a high electron-injection property, an alkali metal, an alkaline earth metal, or a compound thereof can be used. As the material with a high electron-injection property, a composite material containing an electron-transport material and a donor material (electron-donating material) can also be used.

The light-emitting layer 193 is a layer that contains a light-emitting substance. The light-emitting layer 193 can contain one or more kinds of light-emitting substances. As the light-emitting substance, a substance that exhibits an emission color of blue, violet, bluish violet, green, yellowish green, yellow, orange, red, or the like is appropriately used. As the light-emitting substance, a substance that emits near-infrared light can also be used.

Examples of the light-emitting substance include a fluorescent material, a phosphorescent material, a TADF material, and a quantum dot material.

Examples of the fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of the phosphorescent material include an organometallic complex (particularly an iridium complex) having a 4H-triazole skeleton, a 1H-triazole skeleton, an imidazole skeleton, a pyrimidine skeleton, a pyrazine skeleton, or a pyridine skeleton; an organometallic complex (particularly an iridium complex) having a phenylpyridine derivative including an electron-withdrawing group as a ligand; a platinum complex; and a rare earth metal complex.

The light-emitting layer 193 may contain one or more kinds of organic compounds (e.g., a host material and an assist material) in addition to the light-emitting substance (guest material). As one or more kinds of organic compounds, one or both of the hole-transport material and the electron-transport material can be used. Alternatively, as one or more kinds of organic compounds, a bipolar material or a TADF material may be used.

The light-emitting layer 193 preferably contains a phosphorescent material and a combination of a hole-transport material and an electron-transport material that easily forms an exciplex. With such a structure, light emission can be efficiently obtained by ExTET (Exciplex-Triplet Energy Transfer), which is energy transfer from an exciplex to a light-emitting substance (a phosphorescent material). When a combination of materials is selected so as to form an exciplex that exhibits light emission whose wavelength overlaps the wavelength of a lowest-energy-side absorption band of the light-emitting substance, energy can be transferred smoothly and light emission can be obtained efficiently. With this structure, high efficiency, low-voltage driving, and a long lifetime of the light-emitting element can be achieved at the same time.

In the combination of materials for forming an exciplex, the HOMO level (highest occupied molecular orbital level) of the hole-transport material is preferably higher than or equal to the HOMO level of the electron-transport material. The LUMO level (lowest unoccupied molecular orbital level) of the hole-transport material is preferably higher than or equal to the LUMO level of the electron-transport material. The LUMO levels and the HOMO levels of the materials can be derived from the electrochemical characteristics (reduction potentials and oxidation potentials) of the materials that are measured by cyclic voltammetry (CV).

Note that the formation of an exciplex can be confirmed by a phenomenon in which the emission spectrum of a mixed film in which the hole-transport material and the electron-transport material are mixed is shifted to the longer wavelength side than the emission spectrum of each of the materials (or has another peak on the longer wavelength side), observed by comparison of the emission spectra of the hole-transport material, the electron-transport material, and the mixed film of these materials, for example. Alternatively, the formation of an exciplex can be confirmed by a difference in transient response, such as a phenomenon in which the transient photoluminescence (PL) lifetime of the mixed film has longer lifetime components or has a larger proportion of delayed components than that of each of the materials, observed by comparison of the transient PL of the hole-transport material, the transient PL of the electron-transport material, and the transient PL of the mixed film of these materials. The transient PL can be rephrased as transient electroluminescence (EL). That is, the formation of an exciplex can also be confirmed by a difference in transient response observed by comparison of the transient EL of the hole-transport material, the transient EL of the material having an electron-transport property, and the transient EL of the mixed film of these materials.

The active layer 183 contains a semiconductor. Examples of the semiconductor include an inorganic semiconductor such as silicon and an organic semiconductor including an organic compound. This embodiment shows an example in which an organic semiconductor is used as the semiconductor included in the active layer. The use of an organic semiconductor is preferable because the light-emitting layer 193 and the active layer 183 can be formed by the same method (e.g., a vacuum evaporation method) and thus the same manufacturing device can be used.

Examples of an n-type semiconductor material contained in the active layer 183 are electron-accepting organic semiconductor materials such as fullerene (e.g., $C_{60}$ and $C_{70}$) and fullerene derivatives. Fullerene has a soccer ball-like shape, which is energetically stable. Both the HOMO level and the LUMO level of fullerene are deep (low). Having a deep LUMO level, fullerene has an extremely high electron-accepting property (acceptor property). When π-electron conjugation (resonance) spreads in a plane as in benzene, the electron-donating property (donor property) usually increases. However, since fullerene has a spherical shape, fullerene has a high electron-accepting property even when π-electrons widely spread. The high electron-accepting property efficiently causes rapid charge separation and is useful for a light-receiving element. Both $C_{60}$ and $C_{70}$ have a wide absorption band in the visible light region, and $C_{70}$ is especially preferable because of having a larger π-electron conjugation system and a wider absorption band in the long wavelength region than $C_{60}$.

Examples of the n-type semiconductor material include a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative, a benzoquinoline derivative, a quinoxaline derivative, a dibenzoquinoxaline derivative, a pyridine derivative, a bipyridine derivative, a pyrimidine derivative, a naphthalene derivative, an anthracene derivative, a coumarin derivative, a rhodamine derivative, a triazine derivative, and a quinone derivative.

Examples of the p-type semiconductor material contained in the active layer 183 include electron-donating organic semiconductor materials such as copper(II) phthalocyanine (CuPc), tetraphenyldibenzoperiflanthene (DBP), zinc phthalocyanine (ZnPc), tin phthalocyanine (SnPc), and quinacridone.

Examples of the p-type semiconductor material include a carbazole derivative, a thiophene derivative, a furan derivative, and a compound having an aromatic amine skeleton. Other examples of the p-type semiconductor material include a naphthalene derivative, an anthracene derivative, a pyrene derivative, a triphenylene derivative, a fluorene derivative, a pyrrole derivative, a benzofuran derivative, a benzothiophene derivative, an indole derivative, a dibenzofuran derivative, a dibenzothiophene derivative, an indolocarbazole derivative, a porphyrin derivative, a phthalocyanine derivative, a naphthalocyanine derivative, a quinacridone derivative, a polyphenylene vinylene derivative, a polyparaphenylene derivative, a polyfluorene derivative, a polyvinylcarbazole derivative, and a polythiophene derivative.

The HOMO level of the electron-donating organic semiconductor material is preferably shallower (higher) than the HOMO level of the electron-accepting organic semiconductor material. The LUMO level of the electron-donating organic semiconductor material is preferably shallower (higher) than the LUMO level of the electron-accepting organic semiconductor material.

Fullerene having a spherical shape is preferably used as the electron-accepting organic semiconductor material, and an organic semiconductor material having a substantially planar shape is preferably used as the electron-donating organic semiconductor material. Molecules of similar shapes tend to aggregate, and aggregated molecules of similar kinds, which have molecular orbital energy levels close to each other, can improve the carrier-transport property.

For example, the active layer 183 is preferably formed by co-evaporation of an n-type semiconductor and a p-type semiconductor.

The layer 186 serving as both a light-emitting layer and an active layer is preferably formed using the above-described light-emitting material, n-type semiconductor, and p-type semiconductor.

The hole-injection layer 181, the hole-transport layer 182, the active layer 183, the light-emitting layer 193, the electron-transport layer 184, the electron-injection layer 185, and the layer 186 serving as both a light-emitting layer and an active layer may be formed using either a low-molecular compound or a high-molecular compound and may contain an inorganic compound. Each of the layers can be formed by an evaporation method (including a vacuum evaporation method), a transfer method, a printing method, an inkjet method, a coating method, or the like.

Detailed structures of the light-emitting and light-receiving element and the light-emitting elements included in the display device of one embodiment of the present invention will be described below with reference to FIG. 20 to FIG. 22.

The display device of one embodiment of the present invention can have any of the following structures: a top-emission structure in which light is emitted in a direction opposite to the substrate where the light-emitting elements are formed, a bottom-emission structure in which light is emitted toward the substrate where the light-emitting elements are formed, and a dual-emission structure in which light is emitted toward both surfaces.

FIG. 20 to FIG. 22 illustrate top-emission display devices as examples.

Structure Example 1

Figure 20A:
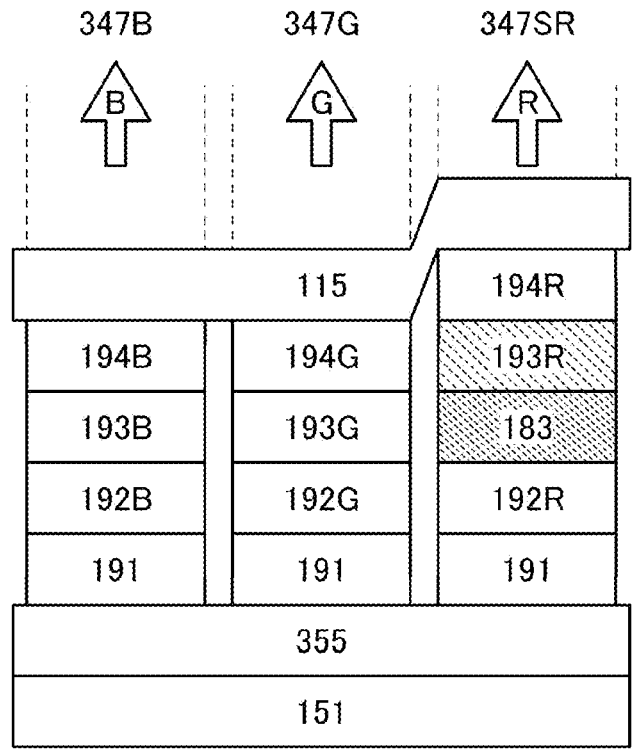
FIG. 20A and FIG. 20B are cross-sectional views illustrating an example of a display device.
Figure 20B:
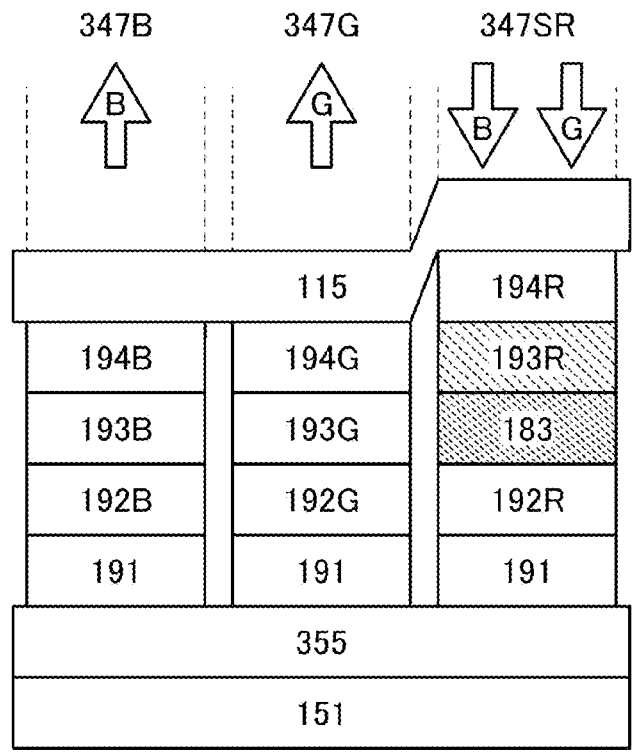

The display device illustrated in FIG. 20A and FIG. 20B includes a light-emitting element 347B that emits blue (B) light, a light-emitting element 347G that emits green (G) light, and a light-emitting and light-receiving element 347SR that emits red (R) light and has a light-receiving function over a substrate 151 with the layer 355 including transistors therebetween.

FIG. 20A shows the case where the light-emitting and light-receiving element 347SR functions as a light-emitting element. FIG. 20A illustrates an example in which the light-emitting element 347B emits blue light, the light-emitting element 347G emits green light, and the light-emitting and light-receiving element 347SR emits red light.

FIG. 20B shows the case where the light-emitting and light-receiving element 347SR functions as a light-receiving element. FIG. 20B illustrates an example in which the light-emitting and light-receiving element 347SR detects blue light emitted by the light-emitting element 347B and green light emitted by the light-emitting element 347G.

The light-emitting element 347B, the light-emitting element 347G, and the light-emitting and light-receiving element 347SR each include a pixel electrode 191 and a common electrode 115. In this embodiment, the case where the pixel electrode 191 functions as an anode and the common electrode 115 functions as a cathode is described as an example.

In the description in this embodiment, also in the light-emitting and light-receiving element 347SR, the pixel electrode 191 functions as an anode and the common electrode 115 functions as a cathode as in the light-emitting elements. In other words, when the light-emitting and light-receiving element 347SR is driven by application of reverse bias between the pixel electrode 191 and the common electrode 115, light entering the light-emitting and light-receiving element 347SR can be detected and electric charge can be generated and extracted as current.

The common electrode 115 is shared by the light-emitting element 347B, the light-emitting element 347G, and the light-emitting and light-receiving element 347SR.

The material, thickness, and the like of the pair of electrodes can be the same in the light-emitting element 347B, the light-emitting element 347G, and the light-emitting and light-receiving element 347SR. Accordingly, the manufacturing cost of the display device can be reduced, and the manufacturing process of the display device can be simplified.

The structure of the display device illustrated in FIG. 20A and FIG. 20B will be specifically described.

The light-emitting element 347B includes a buffer layer 192B, a light-emitting layer 193B, and a buffer layer 194B in this order over the pixel electrode 191. The light-emitting layer 193B contains a light-emitting substance that emits blue light. The light-emitting element 347B has a function of emitting blue light.

The light-emitting element 347G includes a buffer layer 192G, a light-emitting layer 193G, and a buffer layer 194G in this order over the pixel electrode 191. The light-emitting layer 193G contains a light-emitting substance that emits green light. The light-emitting element 347G has a function of emitting green light.

The light-emitting and light-receiving element 347SR includes a buffer layer 192R, the active layer 183, a light-emitting layer 193R, and a buffer layer 194R in this order over the pixel electrode 191. The light-emitting layer 193R contains a light-emitting substance that emits red light. The active layer 183 contains an organic compound that absorbs light having a shorter wavelength than red light (e.g., one or both of green light and blue light). Note that an organic compound that absorbs ultraviolet light as well as visible light may be used for the active layer 183. The light-emitting and light-receiving element 347SR has a function of emitting red light. The light-emitting and light-receiving element 347SR has a function of detecting light emitted from at least one of the light-emitting element 347G and the light-emitting element 347B and preferably has a function of detecting light emitted from both of them.

The active layer 183 preferably contains an organic compound that does not easily absorb red light and absorbs light having a shorter wavelength than red light. Thus, the light-emitting and light-receiving element 347SR can have a function of efficiently emitting red light and a function of accurately detecting light having a shorter wavelength than red light.

The pixel electrode 191, the buffer layer 192R, the buffer layer 192G, the buffer layer 192B, the active layer 183, the light-emitting layer 193R, the light-emitting layer 193G, the light-emitting layer 193B, the buffer layer 194R, the buffer layer 194G, the buffer layer 194B, and the common electrode 115 may each have a single-layer structure or a stacked-layer structure.

In the display device illustrated in FIG. 20A and FIG. 20B, the buffer layer, the active layer, and the light-emitting layer are formed in each element individually.

The buffer layers 192R, 192G, and 192B can each include one or both of a hole-injection layer and a hole-transport layer. Furthermore, the buffer layers 192R, 192G, and 192B may each include an electron-blocking layer. The buffer layers 194B, 194G, and 194R can each include one or both of an electron-injection layer and an electron-transport layer. Furthermore, the buffer layers 194R, 194G, and 194B may each include a hole-blocking layer. Note that the above description of the layers included in the light-emitting and light-receiving element can be referred to for materials and the like of the layers included in the light-emitting elements. Note that in this specification and the like, the buffer layer 192R, the buffer layer 192G, and the buffer layer 192B are collectively referred to as a buffer layer 192 in some cases. The buffer layer 194B, the buffer layer 194G, and the buffer layer 194R are collectively referred to as a buffer layer 194 in some cases.

Structure Example 2

Figure 21A:
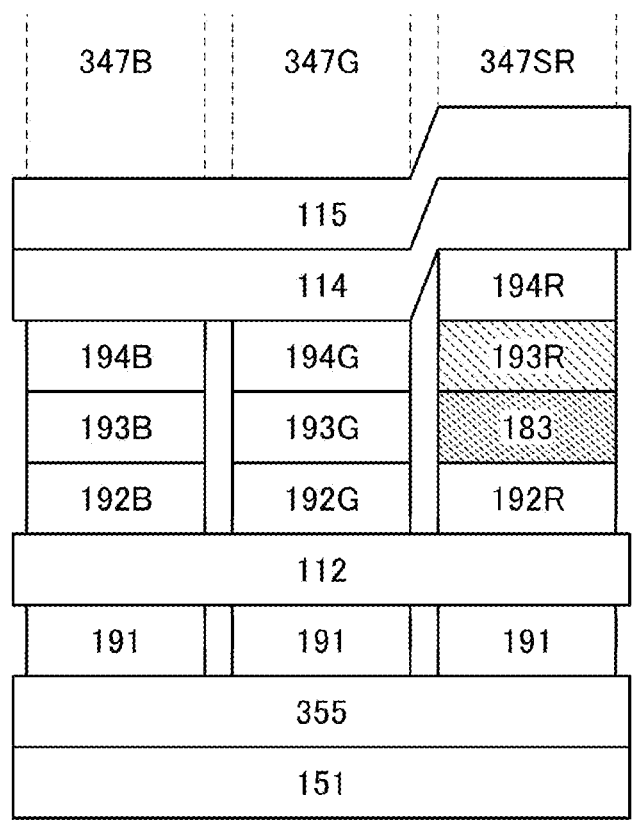
FIG. 21A and FIG. 21B are cross-sectional views illustrating examples of display devices.
Figure 21B:
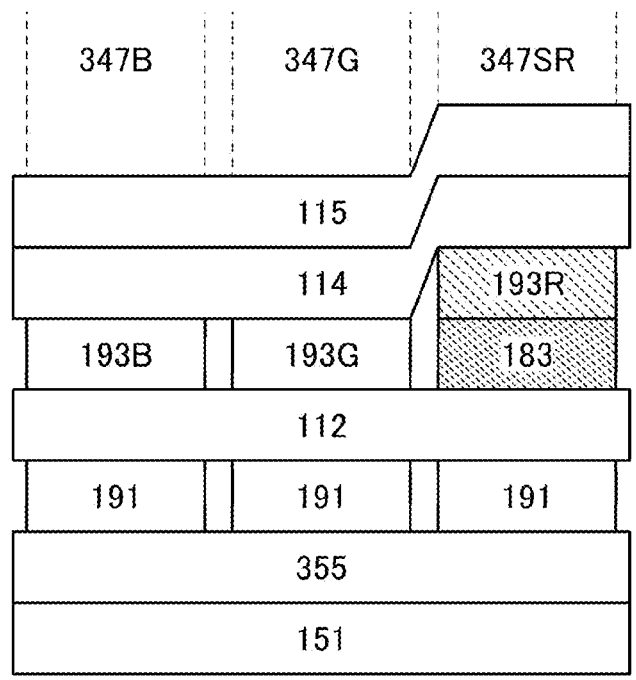

As illustrated in FIG. 21A and FIG. 21B, the light-emitting element 347B, the light-emitting element 347G, and the light-emitting and light-receiving element 347SR may include common layers between the pair of electrodes. Thus, the light-emitting and light-receiving element can be incorporated into the display device without a significant increase in the number of manufacturing steps.

The light-emitting element 347B, the light-emitting element 347G, and the light-emitting and light-receiving element 347SR illustrated in FIG. 21A include a common layer 112 and a common layer 114 in addition to the components illustrated in FIG. 20A and FIG. 20B.

The light-emitting element 347B, the light-emitting element 347G, and the light-emitting and light-receiving element 347SR illustrated in FIG. 21B are different from those illustrated in FIG. 20A and FIG. 20B in that the buffer layers 192R, 192G, and 192B and the buffer layers 194R, 194G, and 194B are not included and the common layer 112 and the common layer 114 are included.

The common layer 112 can include one or both of a hole-injection layer and a hole-transport layer. The common layer 114 can include one or both of an electron-injection layer and an electron-transport layer.

The common layer 112 and the common layer 114 may each have a single-layer structure or a stacked-layer structure.

Structure Example 6

Figure 22A:
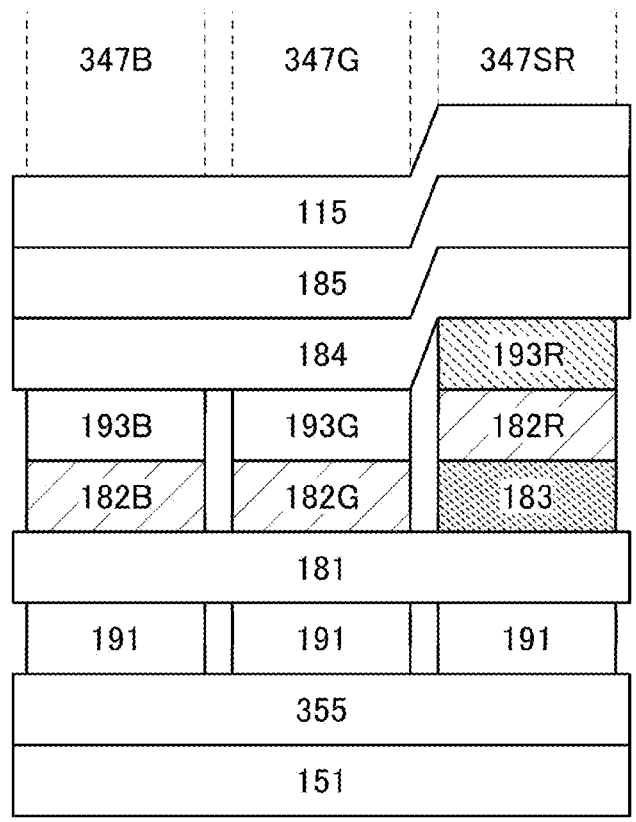
FIG. 22A and FIG. 22B are cross-sectional views illustrating examples of display devices.

The display device illustrated in FIG. 22A is an example in which the light-emitting and light-receiving element 347SR employs the layered structure illustrated in FIG. 19C.

The light-emitting and light-receiving element 347SR includes the hole-injection layer 181, the active layer 183, a hole-transport layer 182R, the light-emitting layer 193R, the electron-transport layer 184, the electron-injection layer 185, and the common electrode 115 in this order over the pixel electrode 191.

The hole-injection layer 181, the electron-transport layer 184, the electron-injection layer 185, and the common electrode 115 are layers shared with the light-emitting element 347G and the light-emitting element 347B.

The light-emitting element 347G includes the hole-injection layer 181, a hole-transport layer 182G, the light-emitting layer 193G, the electron-transport layer 184, the electron-injection layer 185, and the common electrode 115 in this order over the pixel electrode 191.

The light-emitting element 347B includes the hole-injection layer 181, a hole-transport layer 182B, the light-emitting layer 193B, the electron-transport layer 184, the electron-injection layer 185, and the common electrode 115 in this order over the pixel electrode 191.

The light-emitting elements included in the display device of this embodiment preferably employs a microcavity structure. Thus, one of the pair of electrodes of the light-emitting elements is preferably an electrode having properties of transmitting and reflecting visible light (a semi-transmissive and semi-reflective electrode), and the other is preferably an electrode having a property of reflecting visible light (a reflective electrode). When the light-emitting elements have a microcavity structure, light obtained from the light-emitting layers can be resonated between both of the electrodes, whereby light emitted from the light-emitting elements can be intensified.

Note that the semi-transmissive and semi-reflective electrode can have a stacked-layer structure of a reflective electrode and an electrode having a property of transmitting visible light (also referred to as a transparent electrode). In this specification and the like, a reflective electrode functioning as part of a semi-transmissive and semi-reflective electrode may be referred to as a pixel electrode or a common electrode, and a transparent electrode may be referred to as an optical adjustment layer; however, in some cases, a transparent electrode (optical adjustment layer) can also be regarded as having a function of a pixel electrode or a common electrode.

The transparent electrode has a light transmittance higher than or equal to 40%. For example, an electrode whose transmittance for visible light (light with a wavelength greater than or equal to 400 nm and less than 750 nm) and near-infrared light (light with a wavelength greater than or equal to 750 nm and less than or equal to 1300 nm) is greater than or equal to 40% is preferably used in the light-emitting element. The reflectance of the semi-transmissive and semi-reflective electrode for visible light and near-infrared light is greater than or equal to 10% and less than or equal to 95%, preferably greater than or equal to 30% and less than or equal to 80%. The reflectance of the reflective electrode for visible light and near-infrared light is greater than or equal to 40% and less than or equal to 100%, preferably greater than or equal to 70% and less than or equal to 100%. These electrodes preferably have a resistivity of $1 \times 10^{-2}$ Ωcm or lower.

The hole-transport layers 182B, 182G, and 182R may each have a function of an optical adjustment layer. Specifically, the thickness of the hole-transport layer 182B is preferably adjusted such that the optical distance between the pair of electrodes in the light-emitting element 347B intensifies blue light. Similarly, the thickness of the hole-transport layer 182G is preferably adjusted such that the optical distance between the pair of electrodes in the light-emitting element 347G intensifies green light. The thickness of the hole-transport layer 182R is preferably adjusted such that the optical distance between the pair of electrodes in the light-emitting and light-receiving element 347SR intensifies red light. The layer used as the optical adjustment layer is not limited to the hole-transport layer. Note that when the semi-transmissive and semi-reflective electrode has a stacked-layer structure of a reflective electrode and a transparent electrode, the optical distance between the pair of electrodes represents the optical distance between a pair of reflective electrodes.

Structure Example 4

Figure 22B:
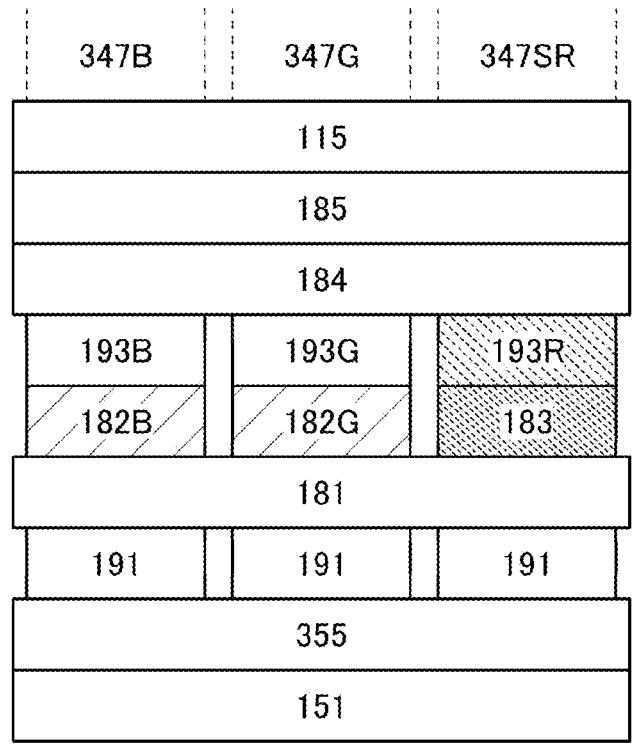

The display device illustrated in FIG. 22B is an example in which the light-emitting and light-receiving element 347SR employs the layered structure illustrated in FIG. 19D.

The light-emitting and light-receiving element 347SR includes the hole-injection layer 181, the active layer 183, the light-emitting layer 193R, the electron-transport layer 184, the electron-injection layer 185, and the common electrode 115 in this order over the pixel electrode 191.

The hole-injection layer 181, the electron-transport layer 184, the electron-injection layer 185, and the common electrode 115 are layers shared with the light-emitting element 347G and the light-emitting element 347B.

The light-emitting element 347G includes the hole-injection layer 181, the hole-transport layer 182G, the light-emitting layer 193G, the electron-transport layer 184, the electron-injection layer 185, and the common electrode 115 in this order over the pixel electrode 191.

The light-emitting element 347B includes the hole-injection layer 181, the hole-transport layer 182B, the light-emitting layer 193B, the electron-transport layer 184, the electron-injection layer 185, and the common electrode 115 in this order over the pixel electrode 191.

The hole-transport layer is provided in the light-emitting element 347G and the light-emitting element 347B and is not provided in the light-emitting and light-receiving element 347SR. In this manner, a layer provided in only one of the light-emitting elements and the light-emitting and light-receiving element may exist in addition to the active layer and the light-emitting layer.

A detailed structure of the display device of one embodiment of the present invention will be described below with reference to FIG. 23 to FIG. 29.

<Display Device 310A>

Figure 23A:
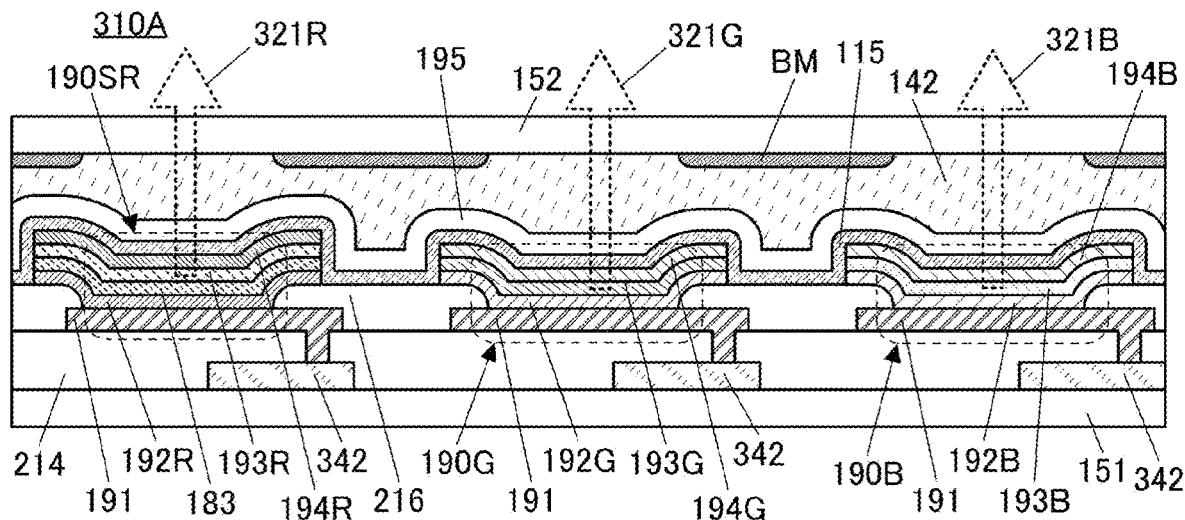
FIG. 23A and FIG. 23B are cross-sectional views illustrating an example of a display device.
Figure 23B:
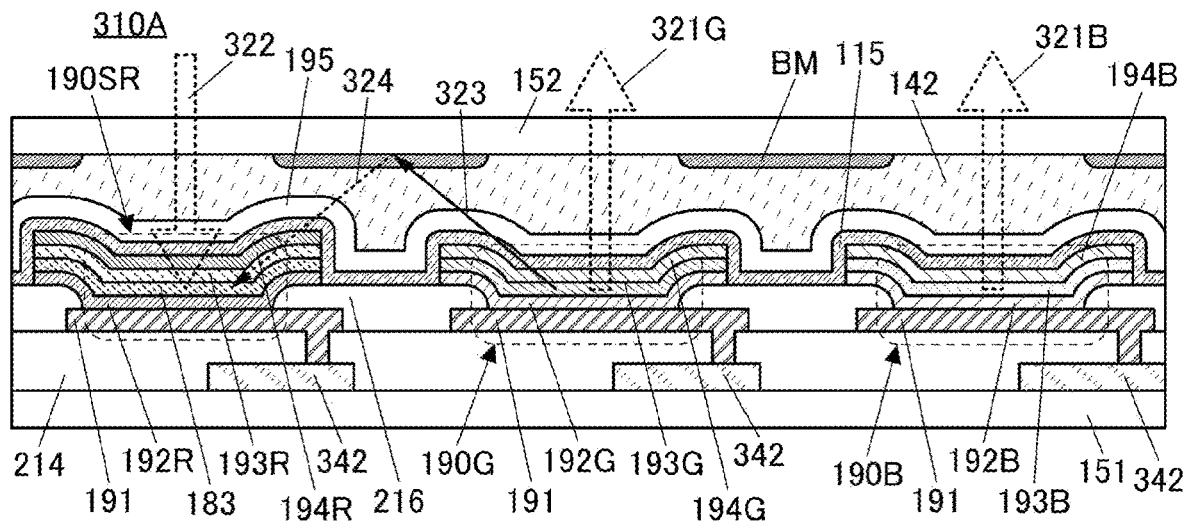

FIG. 23A and FIG. 23B are cross-sectional views of a display device 310A.

The display device 310A includes a light-emitting element 190B, a light-emitting element 190G, and a light-emitting and light-receiving element 190SR.

The light-emitting element 190B includes the pixel electrode 191, the buffer layer 192B, the light-emitting layer 193B, the buffer layer 194B, and the common electrode 115. The light-emitting element 190B has a function of emitting blue light 321B.

The light-emitting element 190G includes the pixel electrode 191, the buffer layer 192G, the light-emitting layer 193G, the buffer layer 194G, and the common electrode 115. The light-emitting element 190G has a function of emitting green light 321G.

The light-emitting and light-receiving element 190SR includes the pixel electrode 191, the buffer layer 192R, the active layer 183, the light-emitting layer 193R, the buffer layer 194R, and the common electrode 115. The light-emitting and light-receiving element 190SR has a function of emitting red light 321R and a function of detecting light 322.

FIG. 23A shows the case where the light-emitting and light-receiving element 190SR functions as a light-emitting element. FIG. 23A illustrates an example in which the light-emitting element 190B emits blue light, the light-emitting element 190G emits green light, and the light-emitting and light-receiving element 190SR emits red light.

FIG. 23B shows the case where the light-emitting and light-receiving element 190SR functions as a light-receiving element. FIG. 23B illustrates an example in which the light-emitting and light-receiving element 190SR detects blue light emitted by the light-emitting element 190B and green light emitted by the light-emitting element 190G.

The pixel electrode 191 is positioned over an insulating layer 214. An end portion of the pixel electrode 191 is covered with a partition 216. Two adjacent pixel electrodes 191 are electrically insulated (electrically isolated) from each other by the partition 216.

An organic insulating film can be suitably used for the partition 216. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins. The partition 216 is a layer that transmits visible light. Although the details will be described later, a partition that blocks visible light may be provided in place of the partition 216.

The display device 310A includes the light-emitting and light-receiving element 190SR, the light-emitting element 190G, the light-emitting element 190B, a transistor 342, and the like between a pair of substrates (the substrate 151 and a substrate 152).

The light-emitting and light-receiving element 190SR has a function of detecting light. Specifically, the light-emitting and light-receiving element 190SR is a photoelectric conversion element that receives the light 322 incident from the outside of the display device 310A and converts it into an electric signal. The light 322 can also be referred to as light that is emitted from one or both of the light-emitting element 190G and the light-emitting element 190B and then reflected by an object. The light 322 may enter the light-emitting and light-receiving element 190SR through a lens.

The light-emitting element 190G and the light-emitting element 190B have a function of emitting visible light. Specifically, the light-emitting element 190G and the light-emitting element 190B are each an electroluminescent element that emits light to the substrate 152 side by voltage application between the pixel electrode 191 and the common electrode 115 (see the light 321G and the light 321B).

The buffer layer 192, the light-emitting layer 193, and the buffer layer 194 can also be referred to as organic layers (layers containing an organic compound) or EL layers. The pixel electrode 191 preferably has a function of reflecting visible light. The common electrode 115 has a function of transmitting visible light.

The pixel electrode 191 is electrically connected to a source or a drain of the transistor 342 through an opening provided in the insulating layer 214. The transistor 342 has a function of controlling the driving of the light-emitting element or the light-emitting and light-receiving element.

At least part of a circuit electrically connected to the light-emitting and light-receiving element 190SR is preferably formed using the same material in the same steps as a circuit electrically connected to the light-emitting element 190G and the light-emitting element 190B. In that case, the thickness of the display device can be reduced compared with the case where the two circuits are separately formed, resulting in simplification of the manufacturing process.

The light-emitting and light-receiving element 190SR, the light-emitting element 190G, and the light-emitting element 190B are preferably covered with a protective layer 195. In FIG. 23A and the like, the protective layer 195 is provided over and in contact with the common electrode 115. Providing the protective layer 195 can inhibit entry of impurities into the light-emitting and light-receiving element 190SR, the light-emitting elements of different colors, and the like and improve the reliability of the light-emitting and light-receiving element 190SR and the light-emitting elements of different colors. The protective layer 195 and the substrate 152 are bonded to each other with an adhesive layer 142.

A light-blocking layer BM is provided on a surface of the substrate 152 that faces the substrate 151. The light-blocking layer BM has openings at positions overlapping the light-emitting element 190G and the light-emitting element 190B and a position overlapping the light-emitting and light-receiving element 190SR. Note that in this specification and the like, the position overlapping the light-emitting element 190G or the light-emitting element 190B refers specifically to a position overlapping a light-emitting region of the light-emitting element 190G or the light-emitting element 190B. Similarly, the position overlapping the light-emitting and light-receiving element 190SR refers specifically to a position overlapping a light-emitting region and a light-receiving region of the light-emitting and light-receiving element 190SR.

As illustrated in FIG. 23B, the light-emitting and light-receiving element 190SR is capable of detecting light that is emitted from the light-emitting element 190G or the light-emitting element 190B and then reflected by an object. However, in some cases, light emitted from the light-emitting element 190G or the light-emitting element 190B is reflected inside the display device 310A and enters the light-emitting and light-receiving element 190SR without involving an object. The light-blocking layer BM can reduce the influence of such stray light. For example, in the case where the light-blocking layer BM is not provided, light 323 emitted from the light-emitting element 190G is reflected by the substrate 152 and reflected light 324 enters the light-emitting and light-receiving element 190SR in some cases. Providing the light-blocking layer BM can inhibit the reflected light 324 from entering the light-emitting and light-receiving element 190SR. Consequently, noise can be reduced, and the sensitivity of a sensor using the light-emitting and light-receiving element 190SR can be increased.

For the light-blocking layer BM, a material that blocks light emitted from the light-emitting elements can be used. The light-blocking layer BM preferably absorbs visible light. As the light-blocking layer BM, a black matrix can be formed using a metal material or a resin material containing pigment (e.g., carbon black) or dye, for example. The light-blocking layer BM may have a stacked-layer structure of a red color filter, a green color filter, and a blue color filter.

<Display Device 310B>

Figure 24A:
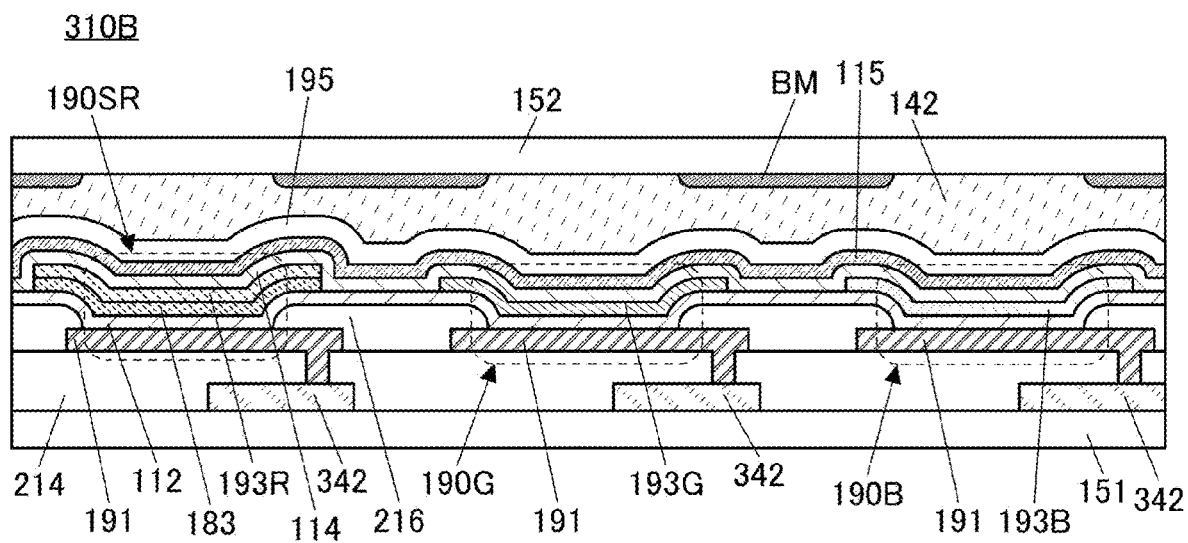
FIG. 24A and FIG. 24B are cross-sectional views illustrating examples of display devices.

A display device 310B illustrated in FIG. 24A is different from the display device 310A in that each of the light-emitting element 190G, the light-emitting element 190B, and the light-emitting and light-receiving element 190SR does not include the buffer layer 192 and the buffer layer 194 and includes the common layer 112 and the common layer 114. Note that in the following description of the display device, components similar to those of the above-mentioned display device are not described in some cases.

Note that the layered structure of the light-emitting element 190B, the light-emitting element 190G, and the light-emitting and light-receiving element 190SR is not limited to the structures in the display devices 310A and 310B. For example, any of the layered structures illustrated in FIG. 19 to FIG. 22 can be appropriately used for each element.

<Display Device 310C>

Figure 24B:
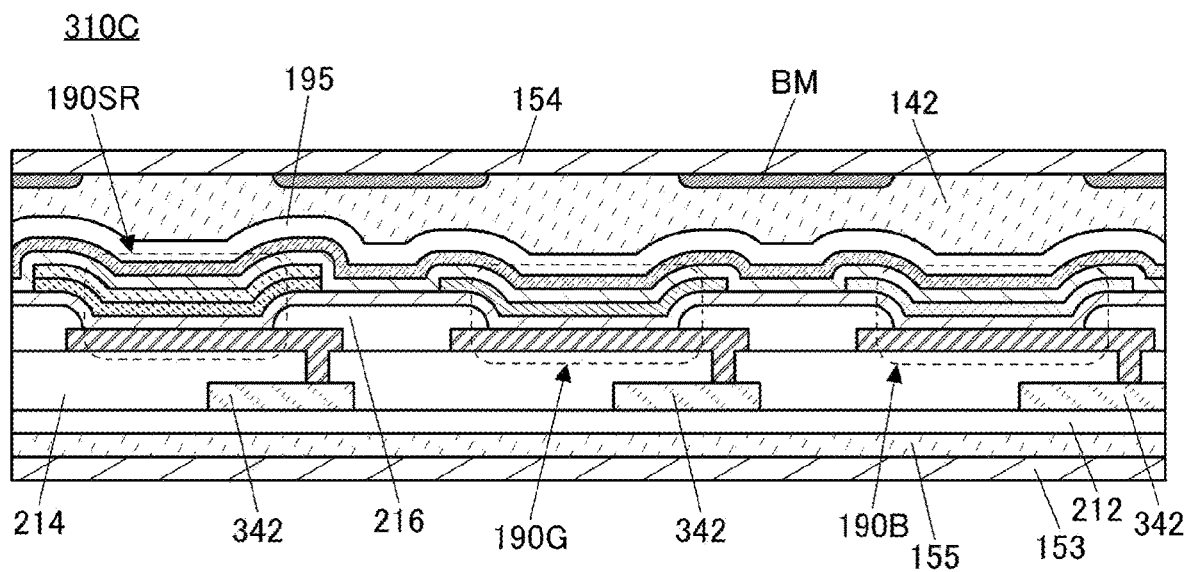

A display device 310C in FIG. 24B is different from the display device 310B in that the substrate 151 and the substrate 152 are not included but a substrate 153, a substrate 154, an adhesive layer 155, and an insulating layer 212 are included.

The substrate 153 and the insulating layer 212 are bonded to each other with the adhesive layer 155. The substrate 154 and the protective layer 195 are bonded to each other with the adhesive layer 142.

The display device 310C has a structure obtained in such a manner that the insulating layer 212, the transistor 342, the light-emitting and light-receiving element 190SR, the light-emitting element 190G, the light-emitting element 190B, and the like are formed over a formation substrate and then transferred onto the substrate 153. The substrate 153 and the substrate 154 preferably have flexibility. Accordingly, the flexibility of the display device 310C can be increased. For example, a resin is preferably used for the substrate 153 and the substrate 154.

For the substrate 153 and the substrate 154, it is possible to use, for example, a polyester resin such as polyethylene terephthalate (PET) or polyethylene naphthalate (PEN), a polyacrylonitrile resin, an acrylic resin, a polyimide resin, a polymethyl methacrylate resin, a polycarbonate (PC) resin, a polyether sulfone (PES) resin, a polyamide resin (e.g., nylon or aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, or cellulose nanofiber. Glass that is thin enough to have flexibility may be used for one or both of the substrate 153 and the substrate 154.

As the substrate included in the display device of this embodiment, a film having high optical isotropy may be used. Examples of the film having high optical isotropy include a triacetyl cellulose (TAC, also referred to as cellulose triacetate) film, a cycloolefin polymer (COP) film, a cycloolefin copolymer (COC) film, and an acrylic film.

A more detailed structure of the display device of one embodiment of the present invention will be described below with reference to FIG. 25 to FIG. 28.

<Display Device 100A>

Figure 25:
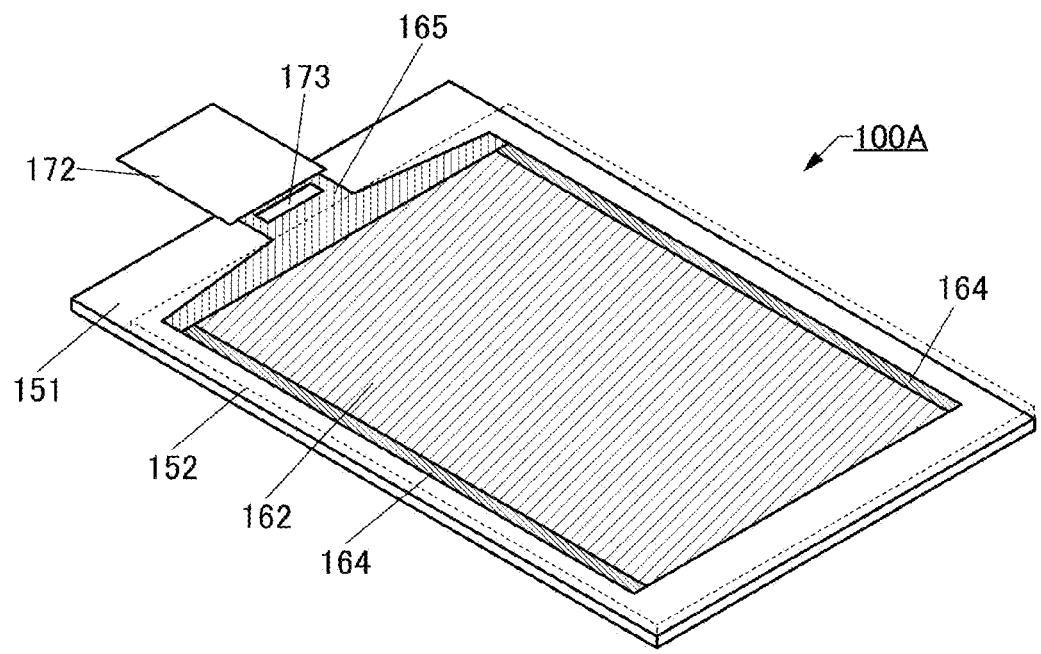
FIG. 25 is a perspective view illustrating an example of a display device.
Figure 26:
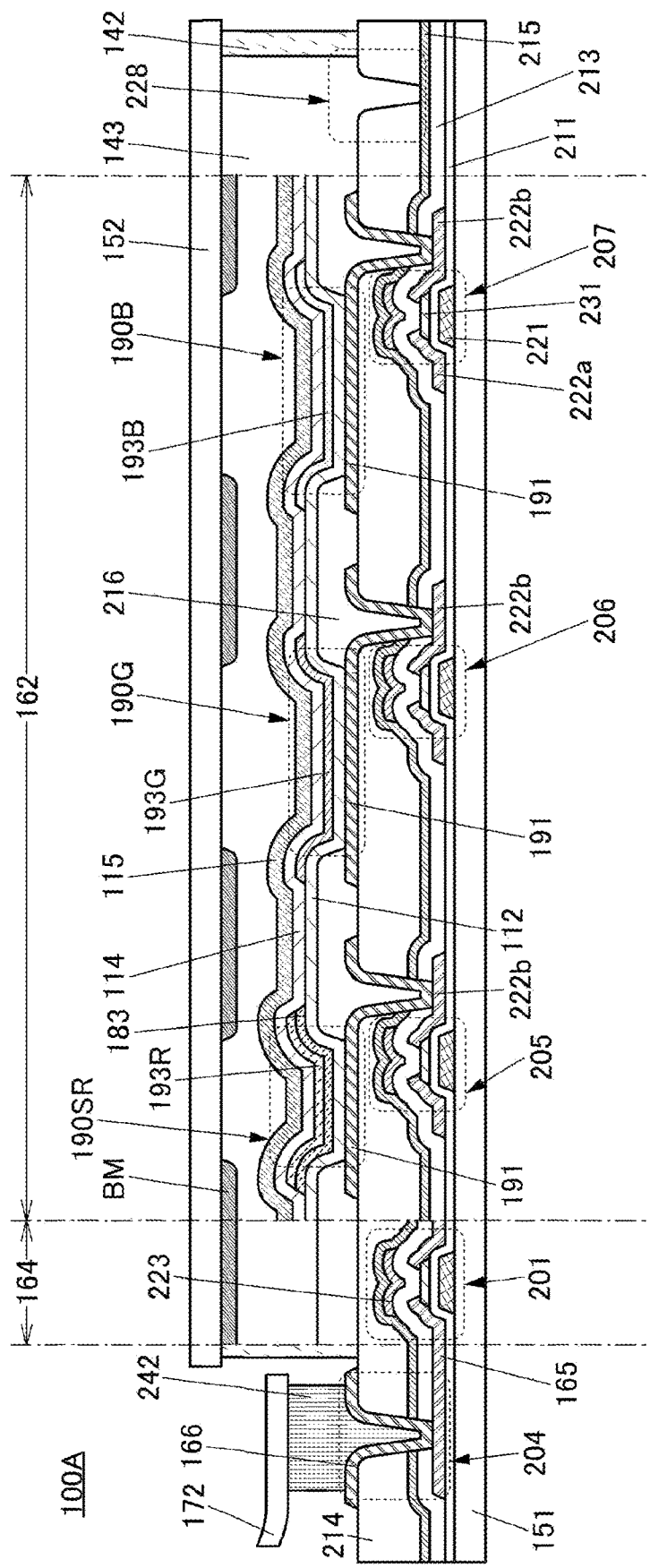
FIG. 26 is a cross-sectional view illustrating an example of a display device.

FIG. 25 is a perspective view of a display device 100A, and FIG. 26 is a cross-sectional view of the display device 100A.

The display device 100A has a structure in which the substrate 152 and the substrate 151 are bonded to each other. In FIG. 25, the substrate 152 is denoted by a dashed line.

The display device 100A includes a pixel portion 162, a circuit 164, a wiring 165, and the like. FIG. 25 illustrates an example in which the display device 100A is provided with an IC (integrated circuit) 173 and an FPC 172. Thus, the structure illustrated in FIG. 25 can be regarded as a display module including the display device 100A, the IC, and the FPC.

As the circuit 164, for example, a scan line driver circuit can be used.

The wiring 165 has a function of supplying a signal and power to the pixel portion 162 and the circuit 164. The signal and power are input to the wiring 165 from the outside through the FPC 172 or from the IC 173.

FIG. 25 illustrates an example in which the IC 173 is provided over the substrate 151 by a COG (Chip On Glass) method, a COF (Chip on Film) method, or the like. An IC including a scan line driver circuit or a signal line driver circuit, for example, can be used as the IC 173. Note that the display device 100A and the display module may have a structure not including an IC. The IC may be mounted on the FPC by a COF method or the like.

FIG. 26 illustrates an example of cross sections of part of a region including the FPC 172, part of a region including the circuit 164, part of a region including the pixel portion 162, and part of a region including an end portion of the display device 100A illustrated in FIG. 25.

The display device 100A in FIG. 26 includes a transistor 201, a transistor 205, a transistor 206, a transistor 207, the light-emitting element 190B, the light-emitting element 190G, the light-emitting and light-receiving element 190SR, and the like between the substrate 151 and the substrate 152.

The substrate 152 and the insulating layer 214 are attached to each other with the adhesive layer 142. A solid sealing structure, a hollow sealing structure, or the like can be employed to seal the light-emitting element 190B, the light-emitting element 190G, and the light-emitting and light-receiving element 190SR. In FIG. 26, a hollow sealing structure is employed in which a space 143 surrounded by the substrate 152, the adhesive layer 142, and the insulating layer 214 is filled with an inert gas (e.g., nitrogen or argon). The adhesive layer 142 may be provided to overlap the light-emitting element 190B, the light-emitting element 190G, and the light-emitting and light-receiving element 190SR. The space 143 surrounded by the substrate 152, the adhesive layer 142, and the insulating layer 214 may be filled with a resin different from that of the adhesive layer 142.

The light-emitting element 190B has a layered structure in which the pixel electrode 191, the common layer 112, the light-emitting layer 193B, the common layer 114, and the common electrode 115 are stacked in this order from the insulating layer 214 side. The pixel electrode 191 is connected to a conductive layer 222b included in the transistor 207 through an opening provided in the insulating layer 214. The transistor 207 has a function of controlling the driving of the light-emitting element 190B. The end portion of the pixel electrode 191 is covered with the partition 216. The pixel electrode 191 contains a material that reflects visible light, and the common electrode 115 contains a material that transmits visible light.

The light-emitting element 190G has a layered structure in which the pixel electrode 191, the common layer 112, the light-emitting layer 193G, the common layer 114, and the common electrode 115 are stacked in this order from the insulating layer 214 side. The pixel electrode 191 is connected to the conductive layer 222b included in the transistor 206 through an opening provided in the insulating layer 214. The transistor 206 has a function of controlling the driving of the light-emitting element 190G.

The light-emitting and light-receiving element 190SR has a layered structure in which the pixel electrode 191, the common layer 112, the active layer 183, the light-emitting layer 193R, the common layer 114, and the common electrode 115 are stacked in this order from the insulating layer 214 side. The pixel electrode 191 is electrically connected to the conductive layer 222b included in the transistor 205 through an opening provided in the insulating layer 214. The transistor 205 has a function of controlling the driving of the light-emitting and light-receiving element 190SR.

Light emitted from the light-emitting element 190B, the light-emitting element 190G, and the light-emitting and light-receiving element 190SR is emitted toward the substrate 152. Light enters the light-emitting and light-receiving element 190SR through the substrate 152 and the space 143. For the substrate 152, a material that has high visible-light-transmitting property is preferably used.

The pixel electrodes 191 can be formed using the same material in the same step. The common layer 112, the common layer 114, and the common electrode 115 are used in common in the light-emitting element 190B, the light-emitting element 190G, and the light-emitting and light-receiving element 190SR. The light-emitting and light-receiving element 190SR has the structure of a red-light-emitting element to which the active layer 183 is added. Alternatively, the light-emitting element 190B, the light-emitting element 190G, and the light-emitting and light-receiving element 190SR can have a common structure except for the active layer 183 and the light-emitting layer 193 of each color. Thus, the pixel portion 162 of the display device 100A can have a light-receiving function without a significant increase in the number of manufacturing steps.

The light-blocking layer BM is provided on a surface of the substrate 152 that faces the substrate 151. The light-blocking layer BM includes openings at positions overlapping the light-emitting element 190B, the light-emitting element 190G, and the light-emitting and light-receiving element 190SR. Providing the light-blocking layer BM can control the range where the light-emitting and light-receiving element 190SR detects light. Furthermore, with the light-blocking layer BM, light can be prevented from directly entering the light-emitting and light-receiving element 190SR from the light-emitting element 190G or the light-emitting element 190B without involving any object. Hence, a sensor with less noise and high sensitivity can be obtained.

The transistor 201, the transistor 205, the transistor 206, and the transistor 207 are formed over the substrate 151. These transistors can be formed using the same materials in the same steps.

An insulating layer 211, an insulating layer 213, an insulating layer 215, and the insulating layer 214 are provided in this order over the substrate 151. Parts of the insulating layer 211 function as gate insulating layers of the transistors. Parts of the insulating layer 213 function as gate insulating layers of the transistors. The insulating layer 215 is provided to cover the transistors. The insulating layer 214 is provided to cover the transistors and has a function of a planarization layer. Note that there is no limitation on the number of gate insulating layers and the number of insulating layers covering the transistors, and each insulating layer may be either a single layer or two or more layers.

A material into which impurities such as water or hydrogen do not easily diffuse is preferably used for at least one of the insulating layers that cover the transistors. This allows the insulating layer to serve as a barrier layer. Such a structure can effectively inhibit diffusion of impurities into the transistors from the outside and increase the reliability of the display device.

An inorganic insulating film is preferably used as each of the insulating layer 211, the insulating layer 213, and the insulating layer 215. As the inorganic insulating film, for example, an inorganic insulating film such as a silicon nitride film, a silicon oxynitride film, a silicon oxide film, a silicon nitride oxide film, an aluminum oxide film, or an aluminum nitride film can be used. A hafnium oxide film, a hafnium oxynitride film, a hafnium nitride oxide film, an yttrium oxide film, a zirconium oxide film, a gallium oxide film, a tantalum oxide film, a magnesium oxide film, a lanthanum oxide film, a cerium oxide film, a neodymium oxide film, or the like may be used. A stack including two or more of the above insulating films may also be used. Note that a base film may be provided between the substrate 151 and the transistors. Any of the above-described inorganic insulating films can be used as the base film.

Here, an organic insulating film often has a lower barrier property than an inorganic insulating film. Therefore, the organic insulating film preferably has an opening in the vicinity of an end portion of the display device 100A. This can inhibit entry of impurities from the end portion of the display device 100A through the organic insulating film. Alternatively, the organic insulating film may be formed so that an end portion of the organic insulating film is positioned on the inner side compared to the end portion of the display device 100A, to prevent the organic insulating film from being exposed at the end portion of the display device 100A.

An organic insulating film is suitable for the insulating layer 214 functioning as a planarization layer. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins.

In a region 228 illustrated in FIG. 26, an opening is formed in the insulating layer 214. This can inhibit entry of impurities into the pixel portion 162 from the outside through the insulating layer 214 even when an organic insulating film is used as the insulating layer 214. Thus, the reliability of the display device 100A can be increased.

The transistor 201, the transistor 205, the transistor 206, and the transistor 207 each include a conductive layer 221 functioning as a gate, the insulating layer 211 functioning as a gate insulating layer, a conductive layer 222a and the conductive layer 222b functioning as a source and a drain, a semiconductor layer 231, the insulating layer 213 functioning as a gate insulating layer, and a conductive layer 223 functioning as a gate. Here, a plurality of layers obtained by processing the same conductive film are shown with the same hatching pattern. The insulating layer 211 is positioned between the conductive layer 221 and the semiconductor layer 231. The insulating layer 213 is positioned between the conductive layer 223 and the semiconductor layer 231.

There is no particular limitation on the structure of the transistors included in the display device of this embodiment. For example, a planar transistor, a staggered transistor, or an inverted staggered transistor can be used. A top-gate or a bottom-gate transistor structure may be employed. Alternatively, gates may be provided above and below a semiconductor layer in which a channel is formed.

The structure in which the semiconductor layer where a channel is formed is provided between two gates is used for the transistor 201, the transistor 205, the transistor 206, and the transistor 207. The two gates may be connected to each other and supplied with the same signal to drive the transistor. Alternatively, a potential for controlling the threshold voltage may be supplied to one of the two gates and a potential for driving may be supplied to the other to control the threshold voltage of the transistor.

There is no particular limitation on the crystallinity of a semiconductor material used in the transistor, and any of an amorphous semiconductor or a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case deterioration of the transistor characteristics can be inhibited.

A semiconductor layer of a transistor preferably includes a metal oxide (also referred to as an oxide semiconductor). Alternatively, the semiconductor layer of the transistor may include silicon. Examples of silicon include amorphous silicon and crystalline silicon (e.g., low-temperature polysilicon and single crystal silicon).

The semiconductor layer preferably includes indium, M (M is one or more kinds selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium), and zinc, for example. In particular, M is preferably one or more kinds selected from aluminum, gallium, yttrium, and tin.

It is particularly preferable to use an oxide containing indium (In), gallium (Ga), and zinc (Zn) (also referred to as IGZO) for the semiconductor layer. Alternatively, it is preferable to use an oxide containing indium, gallium, zinc, and tin. Alternatively, it is preferable to use an oxide containing indium and zinc.

When the semiconductor layer is an In-M-Zn oxide, the atomic ratio of In is preferably greater than or equal to the atomic ratio of M in the In-M-Zn oxide. Examples of the atomic ratio of the metal elements in such an In-M-Zn oxide include In:M:Zn=1:1:1 or a composition in the neighborhood thereof, In:M:Zn=1:1:1.2 or a composition in the neighborhood thereof, In:M:Zn=2:1:3 or a composition in the neighborhood thereof, In:M:Zn=3:1:2 or a composition in the neighborhood thereof, In:M:Zn=4:2:3 or a composition in the neighborhood thereof, In:M:Zn=4:2:4.1 or a composition in the neighborhood thereof, In:M:Zn=5:1:3 or a composition in the neighborhood thereof, In:M:Zn=5:1:6 or a composition in the neighborhood thereof, In:M:Zn=5:1:7 or a composition in the neighborhood thereof, In:M:Zn=5:1:8 or a composition in the neighborhood thereof, In:M:Zn=10:1:3 or a composition in the neighborhood thereof, In:M:Zn=6:1:6 or a composition in the neighborhood thereof, and In:M:Zn=5:2:5 or a composition in the neighborhood thereof. Note that a composition in the neighborhood includes the range of ±30% of an intended atomic ratio.

For example, when the atomic ratio is described as In:Ga:Zn=4:2:3 or a composition in the neighborhood thereof, the case is included where the atomic ratio of Ga is greater than or equal to 1 and less than or equal to 3 and the atomic ratio of Zn is greater than or equal to 2 and less than or equal to 4 with the atomic ratio of In being 4. When the atomic ratio is described as In:Ga:Zn=5:1:6 or a composition in the neighborhood thereof, the case is included where the atomic ratio of Ga is greater than 0.1 and less than or equal to 2 and the atomic ratio of Zn is greater than or equal to 5 and less than or equal to 7 with the atomic ratio of In being 5. When the atomic ratio is described as In:Ga:Zn=1:1:1 or a composition in the neighborhood thereof, the case is included where the atomic ratio of Ga is greater than 0.1 and less than or equal to 2 and the atomic ratio of Zn is greater than 0.1 and less than or equal to 2 with the atomic ratio of In being 1.

The semiconductor layers where channels are formed of the transistor 201, the transistor 205, the transistor 206, and the transistor 207 may use different semiconductor materials from each other. For example, crystalline silicon (e.g., low-temperature polysilicon or single crystal silicon) can be used for the semiconductor layer of the transistor 201, and a metal oxide can be used for the semiconductor layers of the transistor 205, the transistor 206, and the transistor 207.

A transistor containing a metal oxide (hereinafter also referred to as an OS transistor) has much higher field-effect mobility than a transistor using amorphous silicon. In addition, the OS transistor has an extremely low leakage current between a source and a drain in an off state (hereinafter, also referred to as an off-state current), and charge accumulated in a capacitor that is connected in series to the transistor can be held for a long period. By using an OS transistor, a display device can have low power consumption. A transistor containing low-temperature polysilicon (LTPS) (hereinafter, also referred to as an LTPS transistor) has high field-effect mobility and favorable frequency characteristics. By using an LTPS transistor, the display device is capable of high-speed operation. By including the transistors containing different semiconductor layer materials from each other, the display device 100A can be a high-performance display device utilizing an advantage of each of the transistors.

The transistor included in the circuit 164 and the transistor included in the pixel portion 162 may have the same structure or different structures. A plurality of transistors included in the circuit 164 may have the same structure or two or more kinds of structures. Similarly, a plurality of transistors included in the pixel portion 162 may have the same structure or two or more kinds of structures.

A connection portion 204 is provided in a region of the substrate 151 that is not overlapped by the substrate 152. In the connection portion 204, the wiring 165 is electrically connected to the FPC 172 through a conductive layer 166 and a connection layer 242. On the top surface of the connection portion 204, the conductive layer 166 obtained by processing the same conductive film as the pixel electrode 191 is exposed. Thus, the connection portion 204 and the FPC 172 can be electrically connected to each other through the connection layer 242.

A variety of optical members can be arranged on the outer surface of the substrate 152. Examples of the optical members include a polarizing plate, a retardation plate, a light diffusion layer (e.g., a diffusion film), an anti-reflective layer, and a light-condensing film. Furthermore, an antistatic film inhibiting the attachment of dust, a water repellent film inhibiting the attachment of stain, a hard coat film inhibiting generation of a scratch caused by the use, a shock absorbing layer, or the like may be provided on the outside of the substrate 152.

For each of the substrate 151 and the substrate 152, glass, quartz, ceramic, sapphire, a resin, or the like can be used. When a flexible material is used for the substrate 151 and the substrate 152, the flexibility of the display device can be increased.

As the adhesive layer, a variety of curable adhesives, e.g., a photocurable adhesive such as an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferred. Alternatively, a two-component resin may be used. An adhesive sheet or the like may be used.

As the connection layer, an anisotropic conductive film (ACF), an anisotropic conductive paste (ACP), or the like can be used.

Examples of materials that can be used for a gate, a source, and a drain of a transistor and conductive layers such as a variety of wirings and electrodes included in a display device include metals such as aluminum, titanium, chromium, nickel, copper, yttrium, zirconium, molybdenum, silver, tantalum, or tungsten, and an alloy containing any of these metals as its main component. A film containing any of these materials can be used as a single layer or in a stacked-layer structure.

As a light-transmitting conductive material, a conductive oxide such as indium oxide, indium tin oxide, indium zinc oxide, zinc oxide, or zinc oxide containing gallium, or graphene can be used. Alternatively, a metal material such as gold, silver, platinum, magnesium, nickel, tungsten, chromium, molybdenum, iron, cobalt, copper, palladium, or titanium, or an alloy material containing the metal material can be used. Further alternatively, a nitride of the metal material (e.g., titanium nitride) or the like may be used. Note that in the case of using the metal material or the alloy material (or the nitride thereof), the thickness is preferably set small enough to be able to transmit light. A stacked film of any of the above materials can be used as a conductive layer. For example, a stacked film of indium tin oxide and an alloy of silver and magnesium is preferably used, in which case the conductivity can be increased. These materials can also be used for conductive layers such as a variety of wirings and electrodes included in a display device, or conductive layers (conductive layers functioning as a pixel electrode, a common electrode, or the like) included in a light-emitting element and a light-emitting and light-receiving element.

Examples of an insulating material that can be used for each insulating layer include a resin such as an acrylic resin and an epoxy resin, and an inorganic insulating material such as silicon oxide, silicon oxynitride, silicon nitride oxide, silicon nitride, and aluminum oxide.

<Display Device 100B>

Figure 27:
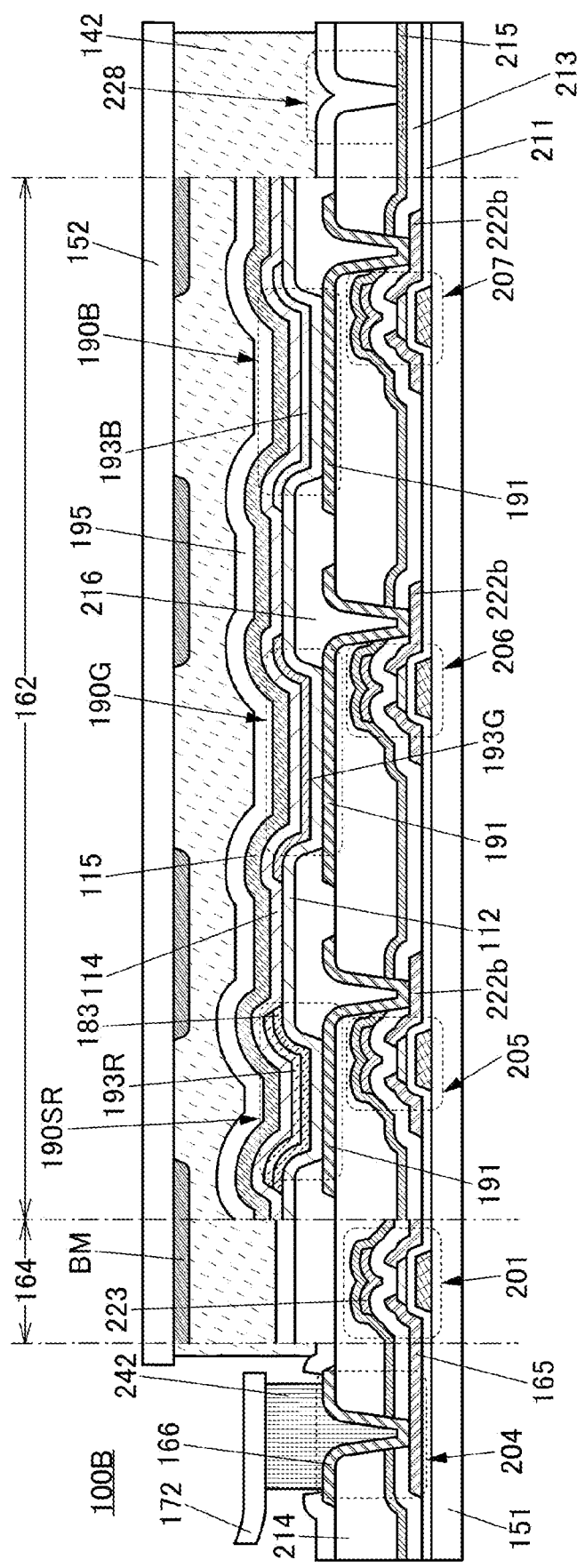
FIG. 27 is a cross-sectional view illustrating an example of a display device.

FIG. 27 is a cross-sectional view of a display device 100B.

The display device 100B is different from the display device 100A mainly in including the protective layer 195. Detailed description of a structure similar to that of the display device 100A is omitted.

Providing the protective layer 195 that covers the light-emitting element 190B, the light-emitting element 190G, and the light-emitting and light-receiving element 190SR can inhibit entry of impurities such as water into the light-emitting element 190B, the light-emitting element 190G, and the light-emitting and light-receiving element 190SR, leading to an increase in the reliability of the light-emitting element 190B, the light-emitting element 190G, and the light-emitting and light-receiving element 190SR.

In the region 228 in the vicinity of an end portion of the display device 100B, the insulating layer 215 and the protective layer 195 are preferably in contact with each other through an opening in the insulating layer 214. In particular, the inorganic insulating film included in the insulating layer 215 and the inorganic insulating film included in the protective layer 195 are preferably in contact with each other. Thus, entry of impurities from the outside into the pixel portion 162 through the organic insulating film can be inhibited. Consequently, the reliability of the display device 100B can be increased.

The protective layer 195 may have a single-layer structure or a stacked-layer structure; for example, the protective layer 195 may have a three-layer structure that includes an inorganic insulating layer over the common electrode 115, an organic insulating layer over the inorganic insulating layer, and an inorganic insulating layer over the organic insulating layer. In that case, an end portion of the inorganic insulating film preferably extends beyond an end portion of the organic insulating film.

Furthermore, a lens may be provided in a region overlapping the light-emitting and light-receiving element 190SR. Thus, the sensitivity and accuracy of a sensor using the light-emitting and light-receiving element 190SR can be increased.

The lens preferably has a refractive index greater than or equal to 1.3 and less than or equal to 2.5. The lens can be formed using at least one of an inorganic material and an organic material. For example, a material containing a resin can be used for the lens. Moreover, a material containing at least one of an oxide and a sulfide can be used for the lens.

Specifically, a resin containing chlorine, bromine, or iodine, a resin containing a heavy metal atom, a resin having an aromatic ring, a resin containing sulfur, and the like can be used for the lens. Alternatively, a material containing a resin and nanoparticles of a material having a higher refractive index than the resin can be used for the lens. Titanium oxide, zirconium oxide, or the like can be used for the nanoparticles.

In addition, cerium oxide, hafnium oxide, lanthanum oxide, magnesium oxide, niobium oxide, tantalum oxide, titanium oxide, yttrium oxide, zinc oxide, an oxide containing indium and tin, an oxide containing indium, gallium, and zinc, and the like can be used for the lens. Alternatively, zinc sulfide and the like can be used for the lens.

In the display device 100B, the protective layer 195 and the substrate 152 are bonded to each other with the adhesive layer 142. The adhesive layer 142 is provided to overlap the light-emitting element 190B, the light-emitting element 190G, and the light-emitting and light-receiving element 190SR; that is, the display device 100B employs a solid sealing structure.

<Display Device 100C>

FIG. 28A is a cross-sectional view of a display device 100C.

The display device 100C is different from the display device 100B in transistor structures.

The display device 100C includes a transistor 208, a transistor 209, and a transistor 210 over the substrate 153.

The transistor 208, the transistor 209, and the transistor 210 each include the conductive layer 221 functioning as a gate, the insulating layer 211 functioning as a gate insulating layer, a semiconductor layer including a channel formation region 231i and a pair of low-resistance regions 231n, the conductive layer 222a connected to one of the pair of low-resistance regions 231n, the conductive layer 222b connected to the other of the pair of low-resistance regions 231n, an insulating layer 225 functioning as a gate insulating layer, the conductive layer 223 functioning as a gate, and the insulating layer 215 covering the conductive layer 223. The insulating layer 211 is positioned between the conductive layer 221 and the channel formation region 231i. The insulating layer 225 is positioned between the conductive layer 223 and the channel formation region 231i.

The conductive layer 222a and the conductive layer 222b are connected to the corresponding low-resistance regions 231n through openings provided in the insulating layer 225 and the insulating layer 215. One of the conductive layer 222a and the conductive layer 222b serves as a source, and the other serves as a drain.

The pixel electrode 191 of the light-emitting element 190G is electrically connected to one of the pair of low-resistance regions 231n of the transistor 208 through the conductive layer 222b.

The pixel electrode 191 of the light-emitting and light-receiving element 190SR is electrically connected to the other of the pair of low-resistance regions 231n of the transistor 209 through the conductive layer 222b.

FIG. 28A illustrates an example in which the insulating layer 225 covers the top surface and a side surface of the semiconductor layer. Meanwhile, in a transistor 202 illustrated in FIG. 28B, the insulating layer 225 overlaps the channel formation region 231i of the semiconductor layer 231 and does not overlap the low-resistance regions 231n. The structure illustrated in FIG. 28B can be obtained by processing the insulating layer 225 using the conductive layer 223 as a mask, for example. In FIG. 28B, the insulating layer 215 is provided to cover the insulating layer 225 and the conductive layer 223, and the conductive layer 222a and the conductive layer 222b are connected to the low-resistance regions 231n through openings in the insulating layer 215. Furthermore, an insulating layer 218 covering the transistor may be provided.

In addition, the display device 100C is different from the display device 100B in that neither the substrate 151 nor the substrate 152 is included and the substrate 153, the substrate 154, the adhesive layer 155, and the insulating layer 212 are included.

The substrate 153 and the insulating layer 212 are bonded to each other with the adhesive layer 155. The substrate 154 and the protective layer 195 are bonded to each other with the adhesive layer 142.

The display device 100C is formed in such a manner that the insulating layer 212, the transistor 208, the transistor 209, the transistor 210, the light-emitting and light-receiving element 190SR, the light-emitting element 190G, and the like which are formed over a formation substrate are transferred onto the substrate 153. The substrate 153 and the substrate 154 preferably have flexibility. Accordingly, the flexibility of the display device 100C can be increased.

The inorganic insulating film that can be used as the insulating layer 211, the insulating layer 213, and the insulating layer 215 can be used as the insulating layer 212.

<Display Device 100D>

FIG. 29A illustrates a cross-sectional view of a display device 100D.

The display device 100D is different from the display device 100C in the structure of the transistor 210.

The display device 100D includes the transistor 208, the transistor 209, and a transistor 210A. An enlarged view of the transistor 210A is illustrated in FIG. 29B.

A semiconductor layer of the transistor 210A is formed on a plane different from the plane where the semiconductor layers of the transistor 208 and the transistor 209 are formed. For example, an LTPS transistor can be used as the transistor 210A, and OS transistors can be used as the transistor 208 and the transistor 209.

The transistor 210A includes a conductive layer 251 functioning as a bottom gate, an insulating layer 217 functioning as a first gate insulating layer, a semiconductor layer including a channel formation region 252i and a pair of low-resistance regions 252n, a conductive layer 254a connected to one of the pair of low-resistance regions 252n, a conductive layer 254b connected to the other of the pair of low-resistance regions 252n, an insulating layer 219 functioning as a second gate insulating layer, a conductive layer 253 functioning as a top gate, and the insulating layer 211 covering the conductive layer 253.

The inorganic insulating film that can be used as the insulating layer 211 and the insulating layer 225 can be used as the insulating layer 217 and the insulating layer 219.

The conductive layer 254a and the conductive layer 254b are each electrically connected to the low-resistance region 252n through an opening provided in the insulating layer 219 and the insulating layer 211. One of the conductive layer 254a and the conductive layer 254b functions as a source and the other functions as a drain.

Over the transistor 210A, the insulating layer 225 and the insulating layer 215 functioning as protective layers are provided. A conductive layer 255a and a conductive layer 255b are each electrically connected to the conductive layer 254a or the conductive layer 254b through an opening provided in the insulating layer 225 and the insulating layer 215.

Although FIG. 29A illustrates the structure where the conductive layer 255a is electrically connected to one of the pair of low-resistance regions 252n through the conductive layer 254a and the conductive layer 255b is electrically connected to the other of the pair of low-resistance regions 252n through the conductive layer 254b, one embodiment of the present invention is not limited to this structure. A structure without the conductive layer 254a and the conductive layer 254b, where the conductive layer 255a is in contact with one of the pair of low-resistance regions 252n and the conductive layer 255b is in contact with the other of the pair of low-resistance regions 252n, may also be used.

In the structure illustrated in FIG. 29A, the conductive layer 253 is provided on the same plane as the plane where the bottom gate of the transistor 208 and the bottom gate of the transistor 209 are provided. The conductive layer 253 can be formed using the same material as the bottom gate of the transistor 208 and the bottom gate of the transistor 209. Furthermore, the conductive layer 253 is preferably formed by processing the same conductive film as the bottom gate of the transistor 208 and the bottom gate of the transistor 209. By formation through processing of the same conductive film, the process can be simplified.

In the structure illustrated in FIG. 29A, the conductive layer 255a and the conductive layer 255b are provided on the same plane as the plane where the source and the drain of the transistor 208 and the source and the drain of the transistor 209 are provided. The conductive layer 255a and the conductive layer 255b can be formed using the same material as the source and the drain of the transistor 208 and the source and the drain of the transistor 209. Furthermore, the conductive layer 255a and the conductive layer 255b are preferably formed by processing the same conductive film as the source and the drain of the transistor 208 and the source and the drain of the transistor 209. By formation through processing of the same conductive film, the process can be simplified.

In the display device of this embodiment, a subpixel exhibiting light of any of the colors includes a light-emitting and light-receiving element instead of a light-emitting element as described above. The light-emitting and light-receiving element functions as both a light-emitting element and a light-receiving element, whereby the pixel can have a light-receiving function without an increase in the number of subpixels included in the pixel. Moreover, the pixel can have a light-receiving function without a reduction in the resolution of the display device or the aperture ratio of each subpixel.

At least part of this embodiment can be implemented in combination with the other embodiments described in this specification as appropriate.

Embodiment 3

Described in this embodiment is a metal oxide (hereinafter also referred to as an oxide semiconductor) that can be used in an OS transistor described in the above embodiment.

The metal oxide preferably contains at least indium or zinc. In particular, indium and zinc are preferably contained. In addition, aluminum, gallium, yttrium, tin, or the like is preferably contained. Furthermore, one or more kinds selected from boron, silicon, titanium, iron, nickel, germanium, zirconium, molybdenum, lanthanum, cerium, neodymium, hafnium, tantalum, tungsten, magnesium, cobalt, and the like may be contained.

The metal oxide can be formed by a sputtering method, a chemical vapor deposition (CVD) method such as a metal organic chemical vapor deposition (MOCVD) method, an atomic layer deposition (ALD) method, or the like.

<Classification of Crystal Structure>

Amorphous (including a completely amorphous structure), CAAC (c-axis-aligned crystalline), nc (nanocrystalline), CAC (cloud-aligned composite), single-crystal, and polycrystalline (poly crystal) structures can be given as examples of a crystal structure of an oxide semiconductor.

A crystal structure of a film or a substrate can be analyzed with an X-ray diffraction (XRD) spectrum. For example, evaluation is possible using an XRD spectrum which is obtained by GIXD (Grazing-Incidence XRD) measurement. Note that a GIXD method is also referred to as a thin film method or a Seemann-Bohlin method.

For example, the XRD spectrum of a quartz glass substrate shows a peak with a substantially bilaterally symmetrical shape. On the other hand, the peak of the XRD spectrum of an IGZO film having a crystal structure has a bilaterally asymmetrical shape. The asymmetrical peak of the XRD spectrum clearly shows the existence of crystal in the film or the substrate. In other words, the crystal structure of the film or the substrate cannot be regarded as "amorphous" unless it has a bilaterally symmetrical peak in the XRD spectrum.

A crystal structure of a film or a substrate can also be evaluated with a diffraction pattern obtained by a nanobeam electron diffraction (NBED) method (such a pattern is also referred to as a nanobeam electron diffraction pattern). For example, a halo pattern is observed in the diffraction pattern of the quartz glass substrate, which indicates that the quartz glass substrate is in an amorphous state. Furthermore, not a halo pattern but a spot-like pattern is observed in the diffraction pattern of the IGZO film deposited at room temperature. Thus, it is presumed that the IGZO film deposited at room temperature is in an intermediate state, which is neither a crystal state nor an amorphous state, and it cannot be concluded that the IGZO film is in an amorphous state.

<Structure of Oxide Semiconductor>

Oxide semiconductors might be classified in a manner different from the above-described one when classified in terms of the structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS are described in detail.

[CAAC-OS]

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more fine crystals (crystals each of which has a maximum diameter of less than 10 nm). In the case where the crystal region is formed of one fine crystal, the maximum diameter of the crystal region is less than 10 nm. In the case where the crystal region is formed of a large number of fine crystals, the size of the crystal region may be approximately several tens of nanometers.

In the case of an In-M-Zn oxide (the element M is one or more kinds selected from aluminum, gallium, yttrium, tin, titanium, and the like), the CAAC-OS tends to have a layered crystal structure (also referred to as a layered structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution transmission electron microscope (TEM) image, for example.

When the CAAC-OS film is subjected to structural analysis by Out-of-plane XRD measurement with an XRD apparatus using $\theta/2\theta$ scanning, for example, a peak indicating c-axis alignment is detected at $2\theta$ of 31° or around 31°. Note that the position of the peak indicating c-axis alignment (the value of $2\theta$) may change depending on the kind, composition, or the like of the metal element contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. Furthermore, a pentagonal or heptagonal lattice arrangement, for example, is included in the distortion in some cases. Note that a clear crystal grain boundary (grain boundary) cannot be observed even in the vicinity of the distortion in the CAAC-OS. That is, formation of a crystal grain boundary is inhibited by the distortion of lattice arrangement. This is probably because the CAAC-OS can tolerate distortion owing to a low density of arrangement of oxygen atoms in the a-b plane direction, an interatomic bond distance changed by substitution of a metal atom, or the like.

A crystal structure in which a clear crystal grain boundary is observed is what is called polycrystal. It is highly probable that the crystal grain boundary becomes a recombination center and captures carriers and thus decreases the on-state current and field-effect mobility of a transistor, for example. Thus, the CAAC-OS in which no clear crystal grain boundary is observed is one of crystalline oxides having a crystal structure suitable for a semiconductor layer of a transistor. Note that Zn is preferably contained to form the CAAC-OS. For example, an In—Zn oxide and an In-Ga—Zn oxide are suitable because they can inhibit generation of a crystal grain boundary as compared with an In oxide.

The CAAC-OS is an oxide semiconductor with high crystallinity in which no clear crystal grain boundary is observed. Thus, in the CAAC-OS, a reduction in electron mobility due to the crystal grain boundary is less likely to occur. Moreover, since the crystallinity of an oxide semiconductor might be decreased by entry of impurities, formation of defects, or the like, the CAAC-OS can be regarded as an oxide semiconductor that has small amounts of impurities and defects (e.g., oxygen vacancies). Thus, an oxide semiconductor including the CAAC-OS is physically stable. Therefore, the oxide semiconductor including the CAAC-OS is resistant to heat and has high reliability. In addition, the CAAC-OS is stable with respect to high temperatures in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor by some analysis methods. For example, when an nc-OS film is subjected to structural analysis by Out-of-plane XRD measurement with an XRD apparatus using $\theta/2\theta$ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., larger than or equal to 1 nm and smaller than or equal to 30 nm).

[A-Like OS]

The a-like OS is an oxide semiconductor having a structure between those of the nc-OS and the amorphous oxide semiconductor. The a-like OS has a void or a low-density region. That is, the a-like OS has lower crystallinity than the nc-OS and the CAAC-OS. Moreover, the a-like OS has higher hydrogen concentration in the film than the nc-OS and the CAAC-OS.

<Structure of Oxide Semiconductor>

Next, the above-described CAC-OS is described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Note that the atomic ratios of In, Ga, and Zn to the metal elements contained in the CAC-OS in an In-Ga—Zn oxide are denoted by [In], [Ga], and [Zn], respectively. For example, the first region in the CAC-OS in the In-Ga—Zn oxide has [In] higher than that in the composition of the CAC-OS film. Moreover, the second region has [Ga] higher than that in the composition of the CAC-OS film. For example, the first region has higher [In] and lower [Ga] than the second region. Moreover, the second region has higher [Ga] and lower [In] than the first region.

Specifically, the first region includes indium oxide, indium zinc oxide, or the like as its main component. The second region includes gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

In a material composition of a CAC-OS in an In-Ga—Zn oxide that contains In, Ga, Zn, and O, regions containing Ga as a main component are observed in part of the CAC-OS and regions containing In as a main component are observed in part thereof. These regions are randomly present to form a mosaic pattern. Thus, it is suggested that the CAC-OS has a structure in which metal elements are unevenly distributed.

The CAC-OS can be formed by a sputtering method under a condition where a substrate is not heated intentionally, for example. Moreover, in the case of forming the CAC-OS by a sputtering method, any one or more selected from an inert gas (typically, argon), an oxygen gas, and a nitrogen gas are used as a deposition gas. The ratio of the flow rate of the oxygen gas to the total flow rate of the deposition gas in deposition is preferably as low as possible, for example, the ratio of the flow rate of the oxygen gas to the total flow rate of the deposition gas in deposition is higher than or equal to 0% and lower than 30%, preferably higher than or equal to 0% and lower than or equal to 10%.

For example, energy dispersive X-ray spectroscopy (EDX) is used to obtain EDX mapping, and according to the EDX mapping, the CAC-OS in the In-Ga—Zn oxide has a structure in which the region containing In as its main component (the first region) and the region containing Ga as its main component (the second region) are unevenly distributed and mixed.

Here, the first region has a higher conductivity than the second region. In other words, when carriers flow through the first region, the conductivity of a metal oxide is exhibited. Accordingly, when the first regions are distributed in a metal oxide as a cloud, high field-effect mobility ($\mu$) can be achieved.

The second region has a higher insulating property than the first region. In other words, when the second regions are distributed in a metal oxide, leakage current can be inhibited.

Thus, in the case where a CAC-OS is used for a transistor, by the complementary action of the conductivity due to the first region and the insulating property due to the second region, the CAC-OS can have a switching function (On/Off function). A CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, high on-state current (Ion), high field-effect mobility (p), and excellent switching operation can be achieved.

A transistor using a CAC-OS has high reliability. Thus, the CAC-OS is most suitable for a variety of semiconductor devices such as display devices.

An oxide semiconductor has various structures with different properties. Two or more kinds among the amorphous oxide semiconductor, the polycrystalline oxide semiconductor, the a-like OS, the CAC-OS, the nc-OS, and the CAAC-OS may be included in an oxide semiconductor of one embodiment of the present invention.

<Transistor Including Oxide Semiconductor>

Next, the case where the above oxide semiconductor is used for a transistor is described.

When the above oxide semiconductor is used for a transistor, a transistor with high field-effect mobility can be achieved. In addition, a transistor having high reliability can be achieved.

An oxide semiconductor having a low carrier concentration is preferably used for the transistor. For example, the carrier concentration of an oxide semiconductor is lower than or equal to $1 \times 10^{17}$ cm$^{-3}$, preferably lower than or equal to $1 \times 10^{15}$ cm$^{-3}$, further preferably lower than or equal to $1 \times 10^{13}$ cm$^{-3}$, still further preferably lower than or equal to $1 \times 10^{11}$ cm$^{-3}$, yet further preferably lower than $1 \times 10^{10}$ cm$^{-3}$, and higher than or equal to $1 \times 10^{-9}$ cm$^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and thus has a low density of trap states in some cases.

Electric charge trapped by the trap states in the oxide semiconductor takes a long time to disappear and might behave like fixed electric charge. Thus, a transistor whose channel formation region is formed in an oxide semiconductor with a high density of trap states has unstable electrical characteristics in some cases.

Accordingly, in order to obtain stable electrical characteristics of a transistor, reducing impurity concentration in an oxide semiconductor is effective. In order to reduce the impurity concentration in the oxide semiconductor, it is preferable that the impurity concentration in an adjacent film be also reduced. Examples of impurities include hydrogen, nitrogen, an alkali metal, an alkaline earth metal, iron, nickel, and silicon.

<Impurity>

Here, the influence of each impurity in the oxide semiconductor is described.

When silicon or carbon, which is one of Group 14 elements, is contained in the oxide semiconductor, defect states are formed in the oxide semiconductor. Thus, the concentration of silicon or carbon in the oxide semiconductor and the concentration of silicon or carbon in the vicinity of an interface with the oxide semiconductor (the concentration obtained by secondary ion mass spectrometry (SIMS)) are each set lower than or equal to $2 \times 10^{18}$ atoms/cm$^3$, preferably lower than or equal to $2 \times 10^{17}$ atoms/cm$^3$.

When the oxide semiconductor contains an alkali metal or an alkaline earth metal, defect states are formed and carriers are generated in some cases. Accordingly, a transistor including an oxide semiconductor that contains an alkali metal or an alkaline earth metal tends to have normally-on characteristics. Thus, the concentration of an alkali metal or an alkaline earth metal in the oxide semiconductor, which is obtained by SIMS, is set lower than or equal to $1 \times 10^{18}$ atoms/cm$^3$, preferably lower than or equal to $2 \times 10^{16}$ atoms/cm$^3$.

An oxide semiconductor containing nitrogen easily becomes n-type by generation of electrons serving as carriers and an increase in carrier concentration. Thus, a transistor using an oxide semiconductor containing nitrogen as the semiconductor tends to have normally-on characteristics. When nitrogen is contained in the oxide semiconductor, a trap state is sometimes formed. This might make the electrical characteristics of the transistor unstable. Therefore, the concentration of nitrogen in the oxide semiconductor, which is obtained by SIMS, is set lower than $5 \times 10^{19}$ atoms/cm$^3$, preferably lower than or equal to $5 \times 10^{8}$ atoms/cm$^3$, further preferably lower than or equal to $1 \times 10^{18}$ atoms/cm$^3$, still further preferably lower than or equal to $5 \times 10^{17}$ atoms/cm$^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. Accordingly, hydrogen in the oxide semiconductor is preferably reduced as much as possible. Specifically, the hydrogen concentration in the oxide semiconductor, which is obtained by SIMS, is set lower than $1 \times 10^{20}$ atoms/cm$^3$, preferably lower than $1 \times 10^{19}$ atoms/cm$^3$, further preferably lower than $5 \times 10^{18}$ atoms/cm$^3$, still further preferably lower than $1 \times 10^{18}$ atoms/cm$^3$.

When an oxide semiconductor with sufficiently reduced impurities is used for the channel formation region of the transistor, stable electrical characteristics can be given.

At least part of this embodiment can be implemented in combination with the other embodiments described in this specification as appropriate.

Embodiment 4

In this embodiment, electronic devices of embodiments of the present invention will be described with reference to FIG. 30 to FIG. 32.

An electronic device in this embodiment includes the display device of one embodiment of the present invention. For example, the display device of one embodiment of the present invention can be used in a pixel portion of the electronic device. The display device of one embodiment of the present invention has a function of sensing light, and thus can perform biological authentication with the pixel portion or sense a touch operation (a contact or an approach), for example. Consequently, the electronic device can have improved functionality and convenience, for example.

Examples of electronic devices include a digital camera, a digital video camera, a digital photo frame, a mobile phone, a portable game console, a portable information terminal, and an audio reproducing device, in addition to electronic devices with a relatively large screen, such as a television device, a desktop or laptop personal computer, a monitor of a computer or the like, digital signage, and a large game machine such as a pachinko machine.

The electronic device in this embodiment may include a sensor (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays).

The electronic device in this embodiment can have a variety of functions. For example, the electronic device can have a function of displaying a variety of information (a still image, a moving image, a text image, and the like) on the pixel portion, a touch panel function, a function of displaying a calendar, date, time, and the like, a function of executing a variety of software (programs), a wireless communication function, and a function of reading out a program or data stored in a recording medium.

Figure 30A:
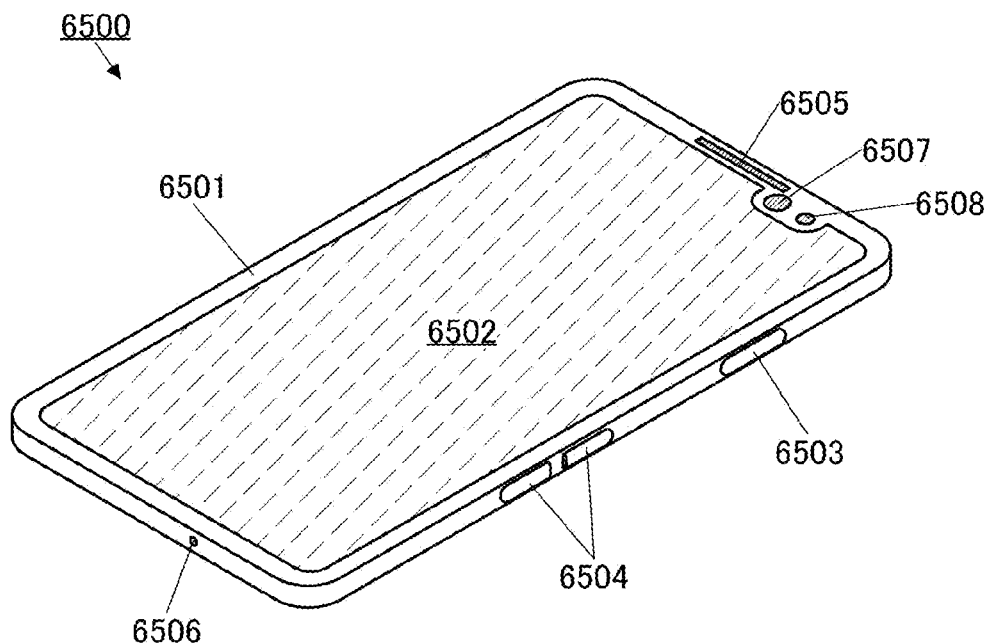
FIG. 30A and FIG. 30B are diagrams illustrating an example of an electronic device.

An electronic device 6500 illustrated in FIG. 30A is a portable information terminal that can be used as a smartphone.

The electronic device 6500 includes a housing 6501, a pixel portion 6502, a power button 6503, buttons 6504, a speaker 6505, a microphone 6506, a camera 6507, a light source 6508, and the like. The pixel portion 6502 has a touch panel function.

The display device of one embodiment of the present invention can be used in the pixel portion 6502.

Figure 30B:
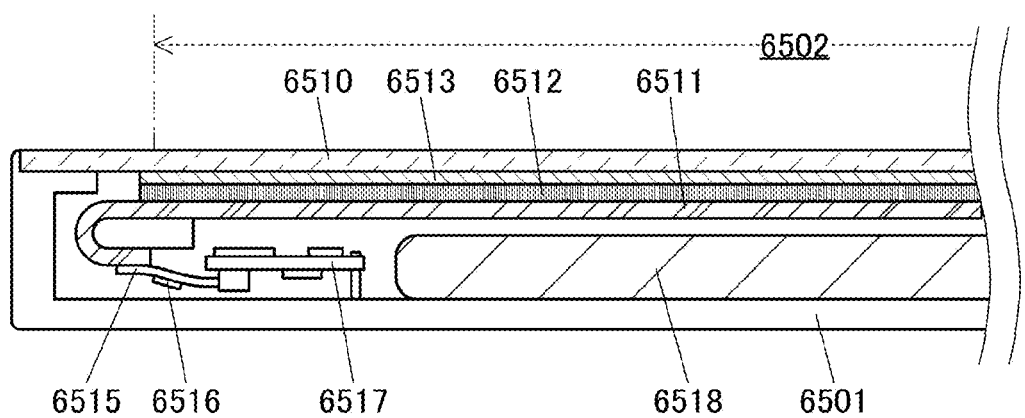

FIG. 30B is a schematic cross-sectional view including an end portion of the housing 6501 on the microphone 6506 side.

A protection member 6510 having a light-transmitting property is provided on the display surface side of the housing 6501, and a display panel 6511, an optical member 6512, a touch sensor panel 6513, a printed circuit board 6517, a battery 6518, and the like are provided in a space surrounded by the housing 6501 and the protection member 6510.

The display panel 6511, the optical member 6512, and the touch sensor panel 6513 are fixed to the protection member 6510 with an adhesive layer (not illustrated).

Part of the display panel 6511 is folded back in a region outside the pixel portion 6502, and an FPC 6515 is connected to the part that is folded back. An IC 6516 is mounted on the FPC 6515. The FPC 6515 is connected to a terminal provided on the printed circuit board 6517.

A flexible display of one embodiment of the present invention can be used as the display panel 6511. Thus, an extremely lightweight electronic device can be achieved. Since the display panel 6511 is extremely thin, the battery 6518 with high capacity can be mounted with the thickness of the electronic device controlled. An electronic device with a narrow frame can be achieved when part of the display panel 6511 is folded back so that the portion connected to the FPC 6515 is provided on the rear side of a pixel portion.

Using the display device of one embodiment of the present invention as the display panel 6511 allows image capturing on the pixel portion 6502. For example, an image of a fingerprint is captured by the display panel 6511; thus, fingerprint authentication can be performed.

By further including the touch sensor panel 6513, the pixel portion 6502 can have a touch panel function. A variety of types such as a capacitive type, a resistive type, a surface acoustic wave type, an infrared type, an optical type, and a pressure-sensitive type can be used for the touch sensor panel 6513. Alternatively, the display panel 6511 may function as a touch sensor; in such a case, the touch sensor panel 6513 is not necessarily provided.

Figure 31A:
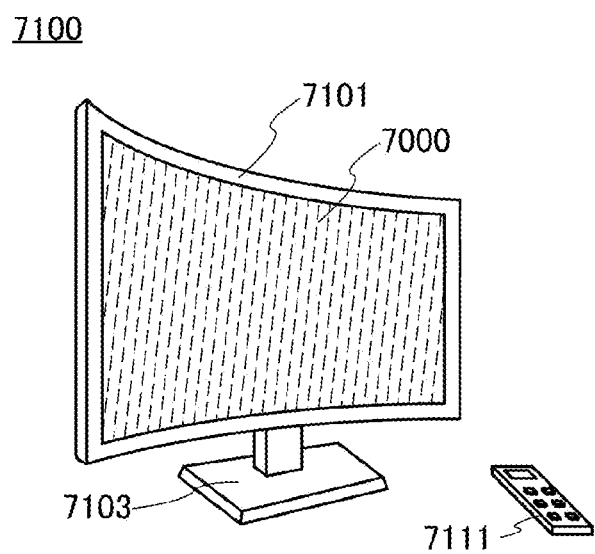
FIG. 31A to FIG. 31D are diagrams illustrating examples of electronic devices.

FIG. 31A illustrates an example of a television device. In a television device 7100, a pixel portion 7000 is incorporated in a housing 7101. Here, a structure in which the housing 7101 is supported by a stand 7103 is illustrated.

The display device of one embodiment of the present invention can be used in the pixel portion 7000.

Operation of the television device 7100 illustrated in FIG. 31A can be performed with an operation switch provided in the housing 7101 or a separate remote controller 7111. Alternatively, the pixel portion 7000 may include a touch sensor, and the television device 7100 may be operated by a touch on the pixel portion 7000 with a finger or the like. The remote controller 7111 may include a pixel portion for displaying information output from the remote controller 7111. With operation keys or a touch panel provided in the remote controller 7111, channels and volume can be controlled, and videos displayed on the pixel portion 7000 can be controlled.

Note that the television device 7100 has a structure in which a receiver, a modem, and the like are provided. A general television broadcast can be received with the receiver. When the television device is connected to a communication network with or without wires via the modem, one-way (from a transmitter to a receiver) or two-way (between a transmitter and a receiver or between receivers, for example) data communication can be performed.

Figure 31B:
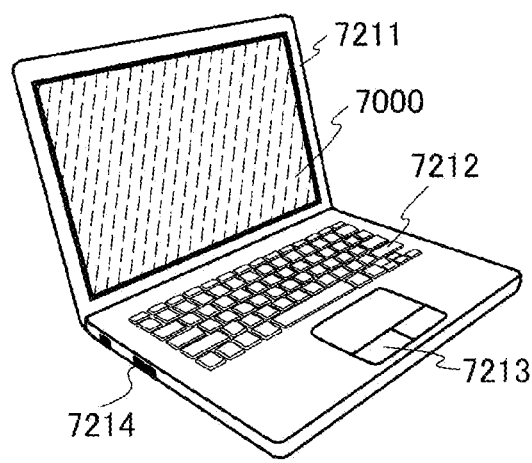

FIG. 31B illustrates an example of a laptop personal computer. A laptop personal computer 7200 includes a housing 7211, a keyboard 7212, a pointing device 7213, an external connection port 7214, and the like. The pixel portion 7000 is incorporated in the housing 7211.

The display device of one embodiment of the present invention can be used in the pixel portion 7000.

Figure 31C:
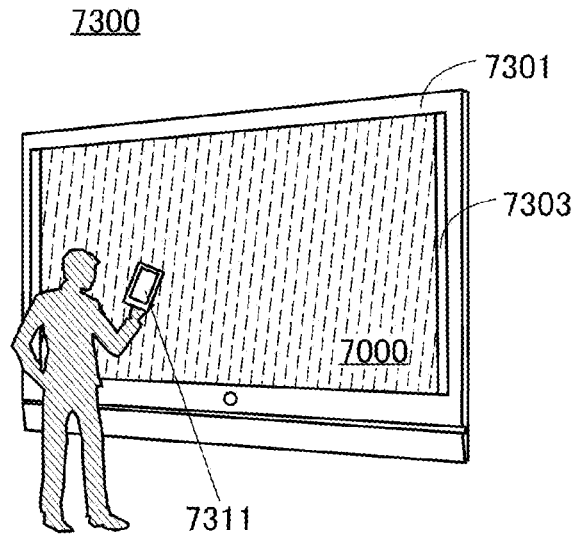
Figure 31D:
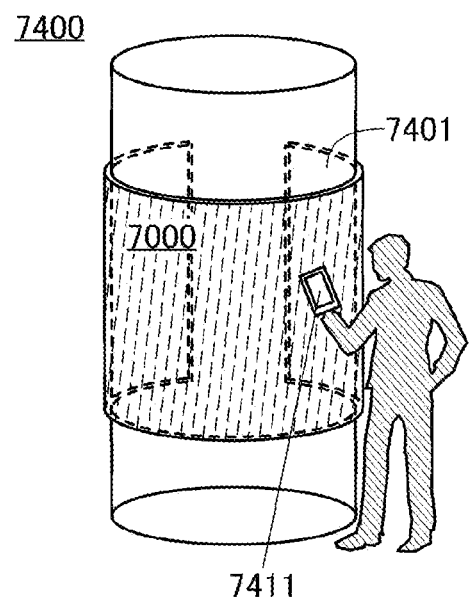

FIG. 31C and FIG. 31D illustrate examples of digital signage.

Digital signage 7300 illustrated in FIG. 31C includes a housing 7301, the pixel portion 7000, a speaker 7303, and the like. Furthermore, the digital signage can include an LED lamp, operation keys (including a power switch or an operation switch), a connection terminal, a variety of sensors, a microphone, and the like.

FIG. 31D shows digital signage 7400 attached to a cylindrical pillar 7401. The digital signage 7400 includes the pixel portion 7000 provided along a curved surface of the pillar 7401.

The display device of one embodiment of the present invention can be used in the pixel portion 7000 in FIG. 31C and FIG. 31D.

A larger area of the pixel portion 7000 can increase the amount of information that can be provided at a time. The larger pixel portion 7000 attracts more attention, so that the advertising effectiveness can be enhanced, for example.

The use of a touch panel in the pixel portion 7000 is preferable because in addition to display of a still image or a moving image on the pixel portion 7000, intuitive operation by a user is possible. Moreover, for an application for providing information such as route information or traffic information, usability can be enhanced by intuitive operation.

As illustrated in FIG. 31C and FIG. 31D, it is preferable that the digital signage 7300 or the digital signage 7400 can work with an information terminal 7311 or an information terminal 7411, such as a smartphone a user has, through wireless communication. For example, information of an advertisement displayed on the pixel portion 7000 can be displayed on a screen of the information terminal 7311 or the information terminal 7411. By operation of the information terminal 7311 or the information terminal 7411, display on the pixel portion 7000 can be switched.

It is possible to make the digital signage 7300 or the digital signage 7400 execute a game with use of the screen of the information terminal 7311 or the information terminal 7411 as an operation means (controller). Thus, an unspecified number of users can join in and enjoy the game concurrently.

Electronic devices illustrated in FIG. 32A to FIG. 32F include a housing 9000, a pixel portion 9001, a speaker 9003, an operation key 9005 (including a power switch or an operation switch), a connection terminal 9006, a sensor 9007 (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays), a microphone 9008, and the like.

The electronic devices illustrated in FIG. 32A to FIG. 32F have a variety of functions. For example, the electronic devices can have a function of displaying a variety of information (a still image, a moving image, a text image, and the like) on the pixel portion, a touch panel function, a function of displaying a calendar, date, time, and the like, a function of controlling processing with the use of a variety of software (programs), a wireless communication function, and a function of reading out and processing a program or data stored in a recording medium. Note that the functions of the electronic devices are not limited thereto, and the electronic devices can have a variety of functions. The electronic devices may include a plurality of pixel portions. The electronic devices may each include a camera or the like and have a function of taking a still image or a moving image and storing the taken image in a recording medium (an external recording medium or a recording medium incorporated in the camera), a function of displaying the taken image on the pixel portion, or the like.

The details of the electronic devices illustrated in FIG. 32A to FIG. 32F are described below.

Figure 32A:
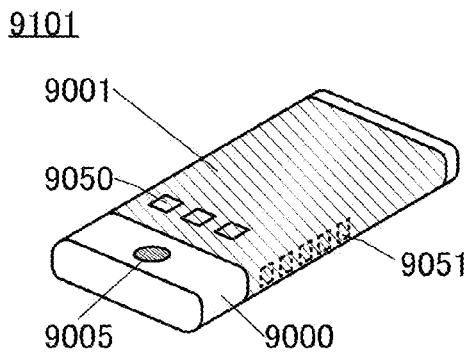
FIG. 32A to FIG. 32F are diagrams illustrating examples of electronic devices.

FIG. 32A is a perspective view illustrating a portable information terminal 9101. The portable information terminal 9101 can be used as a smartphone, for example. Note that the portable information terminal 9101 may be provided with the speaker 9003, the connection terminal 9006, the sensor 9007, or the like. The portable information terminal 9101 can display letters or image information on its plurality of surfaces. FIG. 32A illustrates an example where three icons 9050 are displayed. Information 9051 indicated by dashed rectangles can be displayed on another surface of the pixel portion 9001. Examples of the information 9051 include notification of reception of an e-mail, SNS, an incoming call, or the like, the title of an e-mail, the title of SNS, a name of a sender, the date, the time, remaining battery, and the reception strength of an antenna. Alternatively, the icon 9050 or the like may be displayed at the position where the information 9051 is displayed.

Figure 32B:
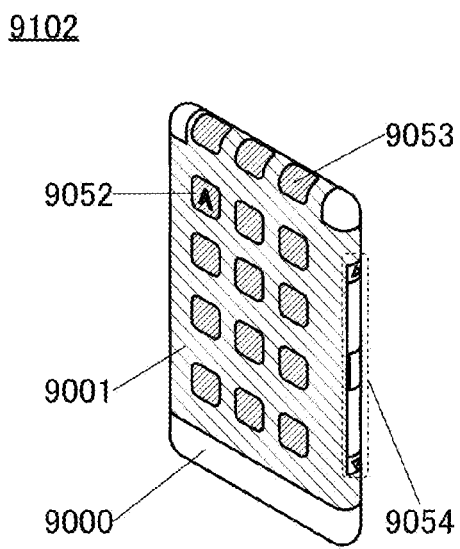

FIG. 32B is a perspective view illustrating a portable information terminal 9102. The portable information terminal 9102 has a function of displaying information on three or more surfaces of the pixel portion 9001. Here, an example in which information 9052, information 9053, and information 9054 are displayed on different surfaces is illustrated. For example, a user can check the information 9053 displayed at a position that can be observed from above the portable information terminal 9102, with the portable information terminal 9102 put in a breast pocket of his/her clothes. The user can seethe display without taking out the portable information terminal 9102 from the pocket and decide whether to answer the call, for example.

Figure 32C:
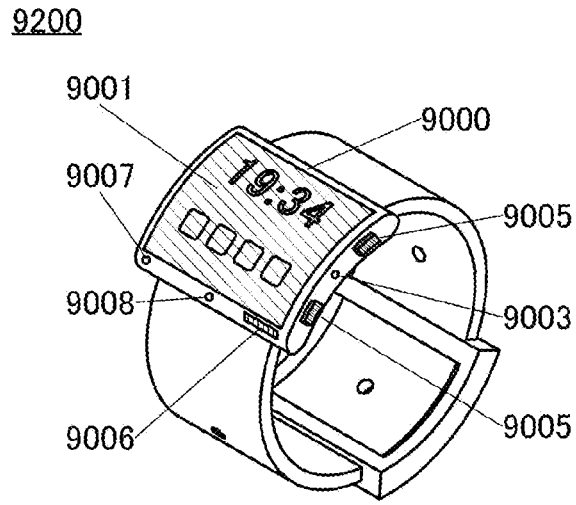

FIG. 32C is a perspective view illustrating a watch-type portable information terminal 9200. The pixel portion 9001 is provided such that its display surface is curved, and display can be performed along the curved display surface. Mutual communication between the portable information terminal 9200 and, for example, a headset capable of wireless communication enables hands-free calling. With the connection terminal 9006, the portable information terminal 9200 can perform mutual data transmission with another information terminal or charging. Note that the charging operation may be performed by wireless power feeding.

Figure 32D:
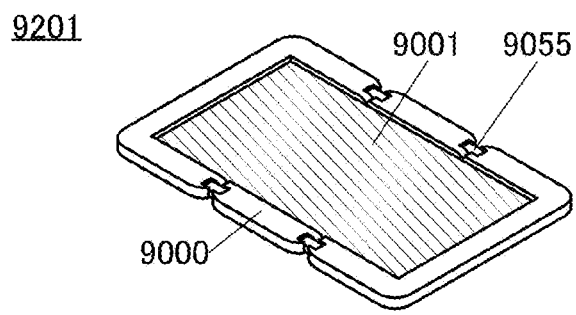
Figure 32E:
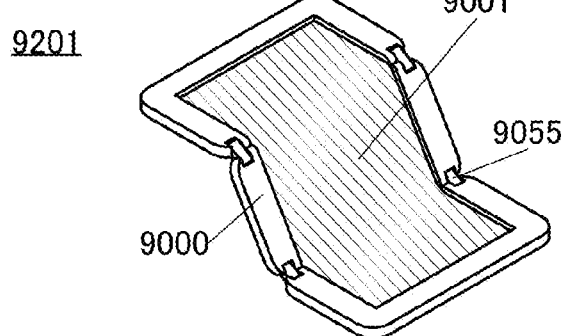
Figure 32F:
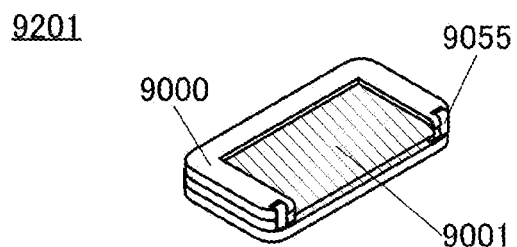

FIG. 32D to FIG. 32F are perspective views illustrating a foldable portable information terminal 9201. FIG. 32D is a perspective view of an opened state of the portable information terminal 9201, FIG. 32F is a perspective view of a folded state thereof, and FIG. 32E is a perspective view of a state in the middle of change from one of FIG. 32D and FIG. 32F to the other. The portable information terminal 9201 is highly portable in the folded state and is highly browsable in the opened state because of a seamless large display region. The pixel portion 9001 of the portable information terminal 9201 is supported by three housings 9000 joined by hinges 9055. For example, the pixel portion 9001 can be curved with a radius of curvature greater than or equal to 0.1 mm and less than or equal to 150 mm.

At least part of this embodiment can be implemented in combination with the other embodiments described in this specification as appropriate.

REFERENCE NUMERALS

BM: light-blocking layer, 100A: display device, 100B: display device, 100C: display device, 100D: display device, 112: common layer, 114: common layer, 115: common electrode, 142: adhesive layer, 143: space, 151: substrate, 152: substrate, 153: substrate, 154: substrate, 155: adhesive layer, 162: pixel portion, 164: circuit, 165: wiring, 166: conductive layer, 172: FPC, 173: IC, 180: first electrode, 181: hole-injection layer, 182: hole-transport layer, 182B: hole-transport layer, 182G: hole-transport layer, 182R: hole-transport layer, 183: active layer, 184: electron-transport layer, 185: electron-injection layer, 186: layer, 189: second electrode, 190B: light-emitting element, 190G: light-emitting element, 190SR: light-emitting and light-receiving element, 191: pixel electrode, 192: buffer layer, 192B: buffer layer, 192G: buffer layer, 192R: buffer layer, 193: light-emitting layer, 193B: light-emitting layer, 193G: light-emitting layer, 193R: light-emitting layer, 194: buffer layer, 194B: buffer layer, 194G: buffer layer, 194R: buffer layer, 195: protective layer, 201: transistor, 202: transistor, 204: connection portion, 205: transistor, 206: transistor, 207: transistor, 208: transistor, 209: transistor, 210: transistor, 210A: transistor, 211: insulating layer, 212: insulating layer, 213: insulating layer, 214: insulating layer, 215: insulating layer, 216: partition, 217: insulating layer, 218: insulating layer, 219: insulating layer, 221: conductive layer, 222*a*: conductive layer, 222*b*: conductive layer, 223: conductive layer, 225: insulating layer, 228: region, 231: semiconductor layer, 231*i*: channel formation region, 231*n*: low-resistance region, 242: connection layer, 310A: display device, 310B: display device, 310C: display device, 311B: subpixel, 311G: subpixel, 311SR: subpixel, 311W: subpixel, 321B: light, 321G: light, 321R: light, 322: light, 323: light, 324: reflected light, 342: transistor, 347B: light-emitting element, 347G:

light-emitting element, 347SR: light-emitting and light-receiving element, 350A: display device, 350B: display device, 351: substrate, 352: finger, 353: layer, 355: layer, 357: layer, 359: substrate, 400: display device, 400A: display device, 401: control portion, 402: pixel portion, 403: sensor portion, 404: memory portion, 405: display element, 406: light-receiving element, 407: authentication portion, 408: touch sensor, 420: electronic device, 420A: electronic device, 421: housing, 422: pixel portion, 425: first region, 426: image, 427: second region, 428: image, 429: display, 430: finger, 441: layer, 443: layer, 445: space, 451: first authentication information, 453: second authentication information, 6500: electronic device, 6501: housing, 6502: pixel portion, 6503: power button, 6504: button, 6505: speaker, 6506: microphone, 6507: camera, 6508: light source, 6510: protection member, 6511: display panel, 6512: optical member, 6513: touch sensor panel, 6515: FPC, 6516: IC, 6517: printed circuit board, 6518: battery, 7000: pixel portion, 7100: television device, 7101: housing, 7103: stand, 7111: remote controller, 7200: laptop personal computer, 7211: housing, 7212: keyboard, 7213: pointing device, 7214: external connection port, 7300: digital signage, 7301: housing, 7303: speaker, 7311: information terminal, 7400: digital signage, 7401: pillar, 7411: information terminal, 9000: housing, 9001: pixel portion, 9003: speaker, 9005: operation key, 9006: connection terminal, 9007: sensor, 9008: microphone, 9050: icon, 9051: information, 9052: information, 9053: information, 9054: information, 9055: hinge, 9101: portable information terminal, 9102: portable information terminal, 9200: portable information terminal, 9201: portable information terminal

The invention claimed is:

1. An electronic device comprising:
a pixel portion;
a sensor portion; and
an authentication portion,
wherein the pixel portion comprises a display element and a light-receiving element,
wherein the pixel portion comprises a first region,
wherein the pixel portion is configured to make the display element of the first region emit light,
wherein the pixel portion is configured to obtain first authentication information by capturing an image of an object that is in contact with the first region with the use of the light-receiving element,
wherein the sensor portion comprises a second region,
wherein the sensor portion is configured to obtain second authentication information by capturing an image of an object that is in contact with the second region,
wherein the authentication portion is configured to perform first authentication processing using the first authentication information, and
wherein the authentication portion is configured to perform second authentication processing using the second authentication information,
wherein the first region is provided so as not to overlap with the second region, and
wherein the sensor portion is an ultrasonic sensor.

2. The electronic device according to claim 1,
wherein the second region is on the same surface as that of the pixel portion.

3. The electronic device according to claim 1,
wherein the second region is on a surface opposite to the pixel portion.

4. The electronic device according to claim 1,
wherein the first region comprises a region overlapping with the second region.

5. The electronic device according to claim 1,
wherein the first region does not comprise a region overlapping with the second region.

6. The electronic device according to claim 1,
wherein the pixel portion comprises a touch sensor,
wherein the touch sensor is configured to sense a position of an object that is in contact with the pixel portion, and
wherein the position and a vicinity of the position are the first region.

7. The electronic device according to claim 1,
wherein the object is a finger.

8. An authentication method of an electronic device comprising a pixel portion, a sensor portion, and an authentication portion, the pixel portion comprising a display element and a light-receiving element, the method comprising:
a step in which the pixel portion makes the display element of a first region emit light;
a step in which the light-receiving element obtains first authentication information by capturing an image of an object that is in contact with the first region;
a step in which the authentication portion performs first authentication processing using the first authentication information;
a step in which the sensor portion obtains second authentication information by capturing an image of an object that is in contact with the sensor portion; and
a step in which the authentication portion performs second authentication processing using the second authentication information,
wherein the sensor portion is provided so as not to overlap with the light receiving element, and
wherein the sensor portion is an ultrasonic sensor.

9. An authentication method of an electronic device comprising a pixel portion, a sensor portion, and an authentication portion, the pixel portion comprising a display element, a light-receiving element, and a touch sensor, the method comprising:
a step in which the touch sensor senses a position of an object that is in contact with the pixel portion;
a step in which the pixel portion makes the display element at and in a vicinity of the position emit light;
a step in which the light-receiving element obtains first authentication information by capturing an image of the object that is in contact with the position and the vicinity;
a step in which the authentication portion performs first authentication processing using the first authentication information;
a step in which the sensor portion obtains second authentication information by capturing an image of an object that is in contact with the sensor portion; and
a step in which the authentication portion performs second authentication processing using the second authentication information,
wherein the sensor portion is provided so as not to overlap with the light receiving element, and
wherein the sensor portion is an ultrasonic sensor.

* * * * *